US011409070B2

(12) United States Patent
Scheele et al.

(10) Patent No.: US 11,409,070 B2
(45) Date of Patent: Aug. 9, 2022

(54) SHAPE MEMORY ALLOY WIRE ATTACHMENT STRUCTURES WITH ADHESIVE FOR A SUSPENSION ASSEMBLY

(71) Applicant: Hutchinson Technology Incorporated, Hutchinson, MN (US)

(72) Inventors: Bryan J. Scheele, Hutchinson, MN (US); Dean E. Myers, Stewart, MN (US); Michael W. Davis, Rockford, MN (US); Erich W. Bierbrauer, Hutchinson, MN (US); Mark A. Miller, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 149 days.

(21) Appl. No.: 15/618,917

(22) Filed: Jun. 9, 2017

(65) Prior Publication Data

US 2017/0357076 A1    Dec. 14, 2017

Related U.S. Application Data

(60) Provisional application No. 62/348,084, filed on Jun. 9, 2016.

(51) Int. Cl.
*G02B 7/02* (2006.01)
*G02B 27/64* (2006.01)

(52) U.S. Cl.
CPC ............. *G02B 7/023* (2013.01); *G02B 7/026* (2013.01); *G02B 7/025* (2013.01); *G02B 27/646* (2013.01)

(58) Field of Classification Search
CPC ...... G02B 27/646; G02B 7/023; G02B 7/025; G02B 7/026
See application file for complete search history.

(56) References Cited

U.S. PATENT DOCUMENTS

| | | |
|---|---|---|
| 3,587,432 A | 6/1971 | Koch |
| 3,734,386 A | 5/1973 | Hazel |
| 3,776,447 A | 12/1973 | Simmons et al. |
| 4,140,265 A | 2/1979 | Morino |
| 4,437,603 A | 3/1984 | Kobayashi et al. |
| 4,781,319 A | 11/1988 | Deubzer et al. |

(Continued)

FOREIGN PATENT DOCUMENTS

| | | |
|---|---|---|
| CN | 1764239 A | 4/2006 |
| CN | 1914555 A | 2/2007 |

(Continued)

OTHER PUBLICATIONS

Adhesion 12 By K. W. Allen, 1988, p. 98 (Year: 1988).*

(Continued)

*Primary Examiner* — Joseph P Martinez
*Assistant Examiner* — Vipin Patel
(74) *Attorney, Agent, or Firm* — DLA Piper LLP (US)

(57) ABSTRACT

Embodiments of the disclosure include a suspension assembly having a support member, a moving member movably coupled to the support member, and shape metal alloy wires coupled between the support and moving members by attachment structures. According to various embodiments, the attachment structures include at least one of: an adhesive disposed proximate to a side of the attachment structures and between the attachment structures.

50 Claims, 36 Drawing Sheets

(56) References Cited

U.S. PATENT DOCUMENTS

| | | |
|---|---|---|
| 4,984,581 A | 1/1991 | Stice |
| 5,269,810 A * | 12/1993 | Hull .................... A61N 1/0587 |
| | | 600/395 |
| 5,477,463 A | 12/1995 | Tamura |
| 5,513,917 A | 5/1996 | Ide et al. |
| 5,831,820 A | 11/1998 | Huang |
| 5,840,417 A | 11/1998 | Bolger |
| 6,149,742 A | 11/2000 | Carpenter et al. |
| 6,279,215 B1 | 8/2001 | Nomoto |
| 6,916,115 B1 | 7/2005 | Vallance et al. |
| 7,384,531 B1 | 6/2008 | Peltoma et al. |
| 7,388,733 B2 | 6/2008 | Swanson et al. |
| 7,679,647 B2 | 3/2010 | Stavely et al. |
| 7,929,252 B1 | 4/2011 | Hentges et al. |
| 8,144,430 B2 | 3/2012 | Hentges et al. |
| 8,169,746 B1 | 5/2012 | Rice et al. |
| 8,175,449 B2 | 5/2012 | Kubo et al. |
| 8,218,958 B2 | 7/2012 | Sato |
| 8,350,959 B2 | 1/2013 | Topliss et al. |
| 8,388,773 B2 | 3/2013 | Luntz et al. |
| 8,421,908 B2 | 4/2013 | Kosaka et al. |
| 8,570,384 B2 | 10/2013 | Brown |
| 8,602,665 B2 | 12/2013 | Kamatani et al. |
| 8,848,064 B2 | 9/2014 | Topliss et al. |
| 8,885,299 B1 | 11/2014 | Bennin et al. |
| 9,175,671 B2 | 11/2015 | Howarth |
| 9,366,879 B1 | 6/2016 | Miller |
| 9,454,016 B1 | 9/2016 | Ladwig et al. |
| 9,479,699 B2 | 10/2016 | Brown et al. |
| 9,541,769 B2 | 1/2017 | Ladwig et al. |
| 10,036,897 B2 | 7/2018 | Ladwig et al. |
| 10,067,357 B2 | 9/2018 | Ladwig et al. |
| 10,139,647 B2 | 11/2018 | Miller |
| 10,670,878 B2 | 6/2020 | Miller et al. |
| 10,775,638 B2 | 9/2020 | Miller et al. |
| 10,969,602 B2 | 4/2021 | Ladwig et al. |
| 11,073,702 B2 | 7/2021 | Miller |
| 2004/0036479 A1 | 2/2004 | Thomsen |
| 2004/0093610 A1* | 5/2004 | Suzuki .................... G02B 7/025 |
| | | 720/672 |
| 2005/0115235 A1 | 6/2005 | Mernoe |
| 2005/0190683 A1* | 9/2005 | Ando .................... G02B 5/04 |
| | | 369/121 |
| 2008/0183257 A1 | 7/2008 | Imran et al. |
| 2008/0231955 A1 | 9/2008 | Otsuka |
| 2009/0295986 A1 | 12/2009 | Topliss et al. |
| 2010/0074607 A1 | 3/2010 | Topliss et al. |
| 2010/0074608 A1 | 3/2010 | Topliss |
| 2010/0119863 A1 | 5/2010 | Bogursky et al. |
| 2011/0249131 A1 | 10/2011 | Topliss et al. |
| 2012/0151913 A1 | 6/2012 | Foshansky |
| 2012/0154614 A1 | 6/2012 | Moriya et al. |
| 2012/0174574 A1 | 7/2012 | Kotanagi et al. |
| 2013/0016427 A1 | 1/2013 | Sugawara |
| 2013/0169092 A1 | 7/2013 | Neuhaus et al. |
| 2013/0221071 A1 | 8/2013 | Kim et al. |
| 2013/0222685 A1 | 8/2013 | Topliss et al. |
| 2013/0278785 A1 | 10/2013 | Nomura et al. |
| 2013/0292856 A1 | 11/2013 | Braun et al. |
| 2013/0300880 A1 | 11/2013 | Brown et al. |
| 2013/0338730 A1 | 12/2013 | Shiroff et al. |
| 2014/0055630 A1 | 2/2014 | Gregory et al. |
| 2015/0068013 A1 | 3/2015 | Galu, Jr. |
| 2015/0135703 A1 | 5/2015 | Eddington et al. |
| 2015/0304561 A1* | 10/2015 | Howarth .................... G02B 27/646 |
| | | 348/374 |
| 2015/0346507 A1 | 12/2015 | Howarth |
| 2015/0365568 A1 | 12/2015 | Topliss et al. |
| 2016/0154252 A1 | 6/2016 | Miller et al. |
| 2016/0227088 A1 | 8/2016 | Brown et al. |
| 2016/0258425 A1 | 9/2016 | Ladwig et al. |
| 2016/0259178 A1 | 9/2016 | Miller |
| 2016/0263889 A1* | 9/2016 | Hamaguchi .................... B41J 2/14201 |
| 2016/0294141 A1 | 10/2016 | Davis et al. |
| 2017/0131562 A1 | 5/2017 | Ladwig et al. |
| 2017/0160559 A1 | 6/2017 | Ladwig et al. |
| 2017/0219842 A1 | 8/2017 | Howarth et al. |
| 2017/0336646 A1 | 11/2017 | Miller et al. |
| 2018/0284475 A1 | 10/2018 | Howarth et al. |
| 2018/0321503 A1 | 11/2018 | Brown |
| 2018/0373056 A1 | 12/2018 | Ladwig et al. |
| 2019/0162982 A1 | 5/2019 | Miller |
| 2021/0223564 A1 | 7/2021 | Ladwig et al. |
| 2021/0356759 A1 | 11/2021 | Miller |

FOREIGN PATENT DOCUMENTS

| | | |
|---|---|---|
| CN | 100410690 C | 8/2008 |
| CN | 101246248 A | 8/2008 |
| CN | 101300831 A | 11/2008 |
| CN | 101408655 A | 4/2009 |
| CN | 101416090 A | 4/2009 |
| CN | 101668947 A | 3/2010 |
| CN | 101876742 A | 11/2010 |
| CN | 102089695 A | 6/2011 |
| CN | 102150073 A | 8/2011 |
| CN | 103376613 A | 10/2013 |
| CN | 203365875 U | 12/2013 |
| CN | 104956254 A | 9/2015 |
| EP | 1 870 962 A2 | 12/2007 |
| EP | 2140138 A2 | 1/2010 |
| EP | 2 732 331 A1 | 5/2014 |
| EP | 2920955 A1 | 9/2015 |
| JP | 2002-130114 A | 5/2002 |
| JP | 2002367204 A * | 12/2002 |
| JP | 2003-507625 A | 2/2003 |
| JP | 2006-031026 A | 2/2006 |
| JP | 2007-092556 A | 4/2007 |
| JP | 2008-233526 A | 10/2008 |
| JP | 2009-37059 A | 2/2009 |
| JP | 2009-103861 A | 5/2009 |
| JP | 2009-531729 A | 9/2009 |
| JP | 2010-128262 A | 6/2010 |
| JP | 2010192036 A * | 9/2010 |
| JP | 2011-022250 A | 2/2011 |
| JP | 2011-065140 A | 3/2011 |
| JP | 2011-107413 A | 6/2011 |
| JP | 2011-175160 A | 9/2011 |
| JP | 2012-502323 A | 1/2012 |
| JP | 2012-517611 A | 8/2012 |
| JP | 2013-178457 A | 9/2013 |
| JP | 2013-546023 A | 12/2013 |
| JP | 2015-518977 A | 7/2015 |
| JP | 2015-537247 A | 12/2015 |
| KR | 10-2009-0081855 A | 7/2009 |
| KR | 10-2015-0013017 A | 2/2015 |
| WO | WO 94/00186 A1 | 1/1994 |
| WO | WO 01/12985 A1 | 2/2001 |
| WO | WO 2007/113478 A1 | 10/2007 |
| WO | WO 2008/099155 A1 | 8/2008 |
| WO | WO 2008/129291 A2 | 10/2008 |
| WO | WO 2010/004993 A1 | 1/2010 |
| WO | 2010/089526 A2 | 8/2010 |
| WO | WO 2012/066285 A1 | 5/2012 |
| WO | WO 2013/153400 A2 | 10/2013 |
| WO | WO 2013/175197 A1 | 11/2013 |
| WO | WO 2014/076463 A1 | 5/2014 |
| WO | WO 2014/083318 A1 | 6/2014 |
| WO | WO 2015/132571 A1 | 9/2015 |
| WO | WO 2016/009200 A1 | 1/2016 |

OTHER PUBLICATIONS

International Search Report and Written Opinion in International Application No. PCT/US2015/062576, dated Mar. 2, 2016.
International Preliminary Report on Patentability in International Application No. PCT/US2015/062576, dated Jun. 15, 2017.
Extended European Search Report in European Application No. 15866032.4, dated Mar. 22, 2018.
International Search Report and Written Opinion in International Application No. PCT/US2015/062713, dated Mar. 2, 2016.
International Preliminary Report on Patentability in International Application No. PCT/US2015/062713, dated Jun. 15, 2017.

(56) References Cited

OTHER PUBLICATIONS

Extended European Search Report in European Application No. 15864743.8, dated Mar. 22, 2018.
International Search Report and Written Opinion in International Application No. PCT/US2015/063363, dated Feb. 12, 2016.
International Preliminary Report on Patentability in International Application No. PCT/US2015/063363, dated Jun. 15, 2017.
Extended European Search Report in European Application No. 15865383.2, dated Mar. 22, 2018.
International Search Report and Written Opinion in International Application No. PCT/US2016/021230, dated Jun. 3, 2016.
International Preliminary Report on Patentability in International Application No. PCT/US2016/021230, dated Sep. 21, 2017.
International Search Report and Written Opinion in International Application No. PCT/US2017/033517, dated Aug. 4, 2017.
International Search Report and Written Opinion in International Application No. PCT/US2017/036884, dated Oct. 19, 2017.
International Search Report and Written Opinion in International Application No. PCT/US2015/066939, dated Mar. 14, 2016.
International Search Report and Written Opinion in International Application No. PCT/US2016/025194, dated Jun. 30, 2016.
International Search Report and Written Opinion in International Application No. PCT/US2016/054274, dated Dec. 13, 2016.
Office Action in U.S. Appl. No. 14/956,612, dated Jan. 4, 2018.
Office Action in U.S. Appl. No. 15/063,151, dated Feb. 21, 2018.
Office Action in U.S. Appl. No. 15/156,545, dated May 8, 2017.
Office Action in U.S. Appl. No. 15/156,545, dated Dec. 26, 2017.
Office Action in U.S. Appl. No. 15/276,115, dated Sep. 18, 2017.
Notice of Allowance in U.S. Appl. No. 15/276,115, dated Mar. 26, 2018.
Office Action in U.S. Appl. No. 15/400,516, dated Sep. 21, 2017.
Office Action in U.S. Appl. No. 15/400,516, dated Dec. 15, 2017.
Notice of Allowance in U.S. Appl. No. 15/400,516, dated May 4, 2018.
Office Action in U.S. Appl. No. 15/599,449, dated Jan. 25, 2018.
Extended European Search Report in European Application No. 16762309.9, dated Aug. 1, 2018.
Office Action in Chinese Application No. 201680025323.3, dated Dec. 28, 2018.
International Preliminary Report on Patentability in International Application No. PCT/US2017/033517, dated Nov. 29, 2018.
International Preliminary Report on Patentability in International Application No. PCT/US2017/036884, dated Dec. 20, 2018.
Office Action in U.S. Appl. No. 14/956,612, dated Aug. 9, 2018.
Office Action in U.S. Appl. No. 15/063,151, dated Jul. 26, 2018.
Notice of Allowance in U.S. Appl. No. 15/156,545, dated Jul. 26, 2018.
Corrected Notice of Allowance in U.S. Appl. No. 15/276,115, dated Jul. 3, 2018.
Office Action in U.S. Appl. No. 15/599,449, dated Oct. 31, 2018.
Office Action in Chinese Application No. 201580065890.7, dated Mar. 27, 2019.
Office Action in Chinese Application No. 201580065332.0, dated Mar. 18, 2019.
Office Action in U.S. Appl. No. 15/599,449, dated Apr. 17, 2019.
Communication pursuant to Article 94(3) EPC in European Application No. 16762309.9, dated Apr. 4, 2019.
Office Action in Chinese Application No. 201580065775.X, dated Mar. 27, 2019.
Office Action in U.S. Appl. No. 14/956,612, dated May 31, 2019.
Office Action in U.S. Appl. No. 15/063,151, dated May 29, 2019.
Extended European Search Report in European Patent Application No. 17811132.4, dated Jan. 23, 2020.
Third Office Action in Chinese Patent Application No. 201580065890.7 dated Feb. 18, 2020.
Decision to Grant for Japanese Patent Application No. 2017-529039 dated Mar. 17, 2020.
Notice of Reasons for Refusal for Japanese Patent Application No. 2017-546796 dated Mar. 31, 2020.
Second Office Action in Chinese Application No. 201580065890.7, dated Sep. 29, 2019.
Notice of Reasons for Refusal in Japanese Patent Application No. 2017-529018 dated Jan. 7, 2020.
Decision to Grant for Japanese Patent Application No. 2017-529018 dated May 26, 2020.
Second Office Action in Chinese Patent Application No. 201580065775.X, dated Dec. 25, 2019.
Notice of Reasons for Refusal in Japanese Patent Application No. 2017-529039 dated Dec. 3, 2019.
Extended European Search Report in European Application No. 19193083.3, dated Oct. 29, 2019.
Second Office Action in Chinese Patent Application No. 201580065332.0, dated Dec. 16, 2019.
Notice of Reasons for Refusal in Japanese Patent Application No. 2017-529044 dated Jan. 7, 2020.
Decision to Grant for Japanese Patent Application No. 2017-529044 dated May 26, 2020.
Office Action in Chinese Application No. 201680025323.3, dated Sep. 30, 2019.
Extended European Search Report in European Application No. 19173490.4, dated Jul. 12, 2019.
Extended European Search Report in European Patent Application No. 17800231.7, dated Dec. 9, 2019.
Office Action in Chinese Application No. 201780047685.7, dated Jun. 15, 2020.
Notice of Allowance in U.S. Appl. No. 14/956,612, dated May 14, 2020.
Office Action in U.S. Appl. No. 15/063,151, dated Nov. 27, 2019.
Office Action in U.S. Appl. No. 15/063,151, dated Jul. 27, 2020.
Office Action in U.S. Appl. No. 16/119,619, dated May 5, 2020.
Office Action in U.S. Appl. No. 16/119,619, dated Jul. 17, 2020.
Office Action in U.S. Appl. No. 16/200,570, dated Dec. 9, 2019.
Office Action in U.S. Appl. No. 16/200,570, dated Jul. 2, 2020.
Notice of Allowance in U.S. Appl. No. 15/599,449, dated Jan. 27, 2020.
Notice of Decision of Refusal in Japanese Application No. 2017-546796, dated Dec. 15, 2020.
Office Action in Chinese Application No. 201780044616.0, dated Jul. 24, 2020.
Notice of Allowance in U.S. Appl. No. 16/119,619, dated Dec. 2, 2020.
Office Action in U.S. Appl. No. 16/200,570, dated Dec. 9, 2020.
Notice of Reasons for Refusal in Japanese Application No. 2018-564209, dated Jan. 26, 2021.
Office Action in U.S. Appl. No. 15/063,151, dated Feb. 12, 2021.
Notice of Reasons for Refusal in Japanese Application No. 2020-072465, dated Mar. 9, 2021.
Notice of Allowance in U.S. Appl. No. 16/200,570, dated Mar. 25, 2021.
Office Action in Chinese Application No. 201780044616.0, dated Apr. 9, 2021.

* cited by examiner

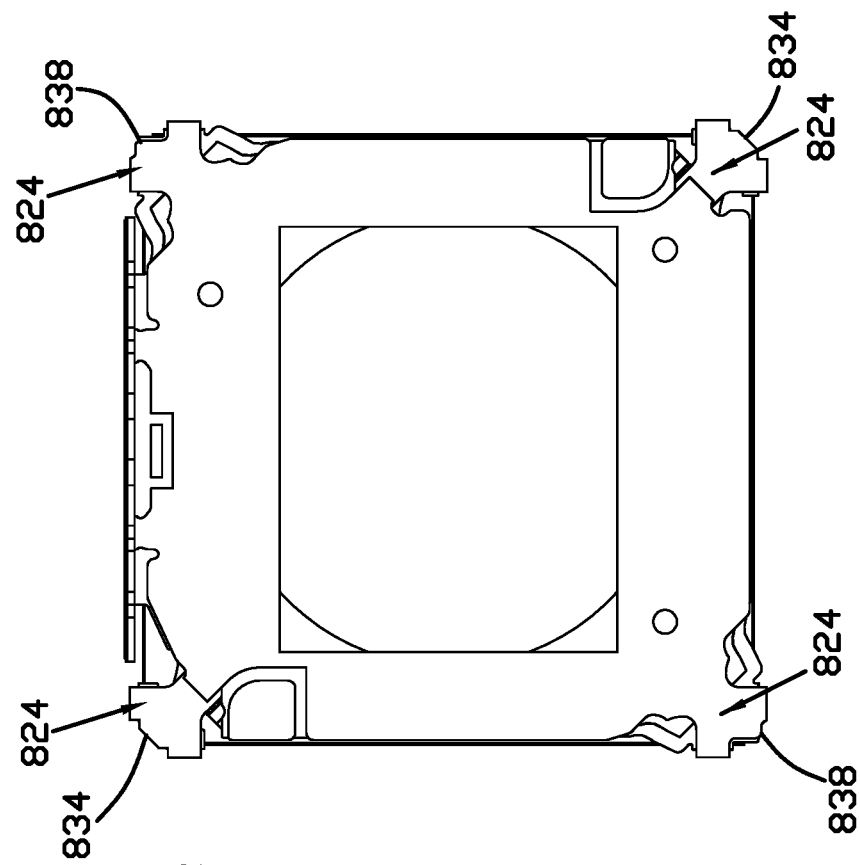
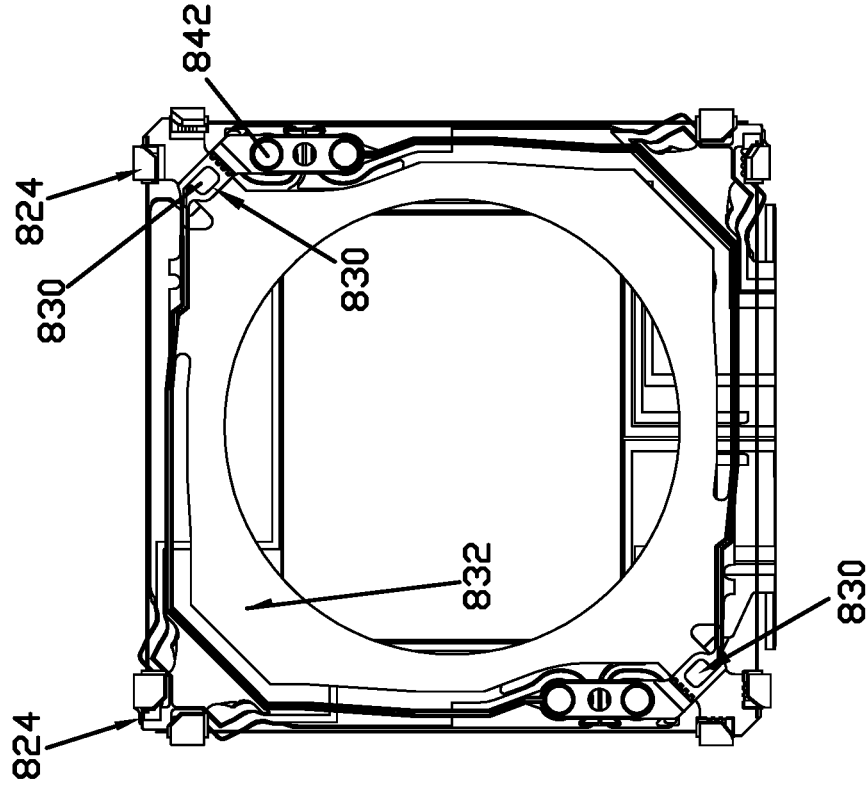
Figure 12

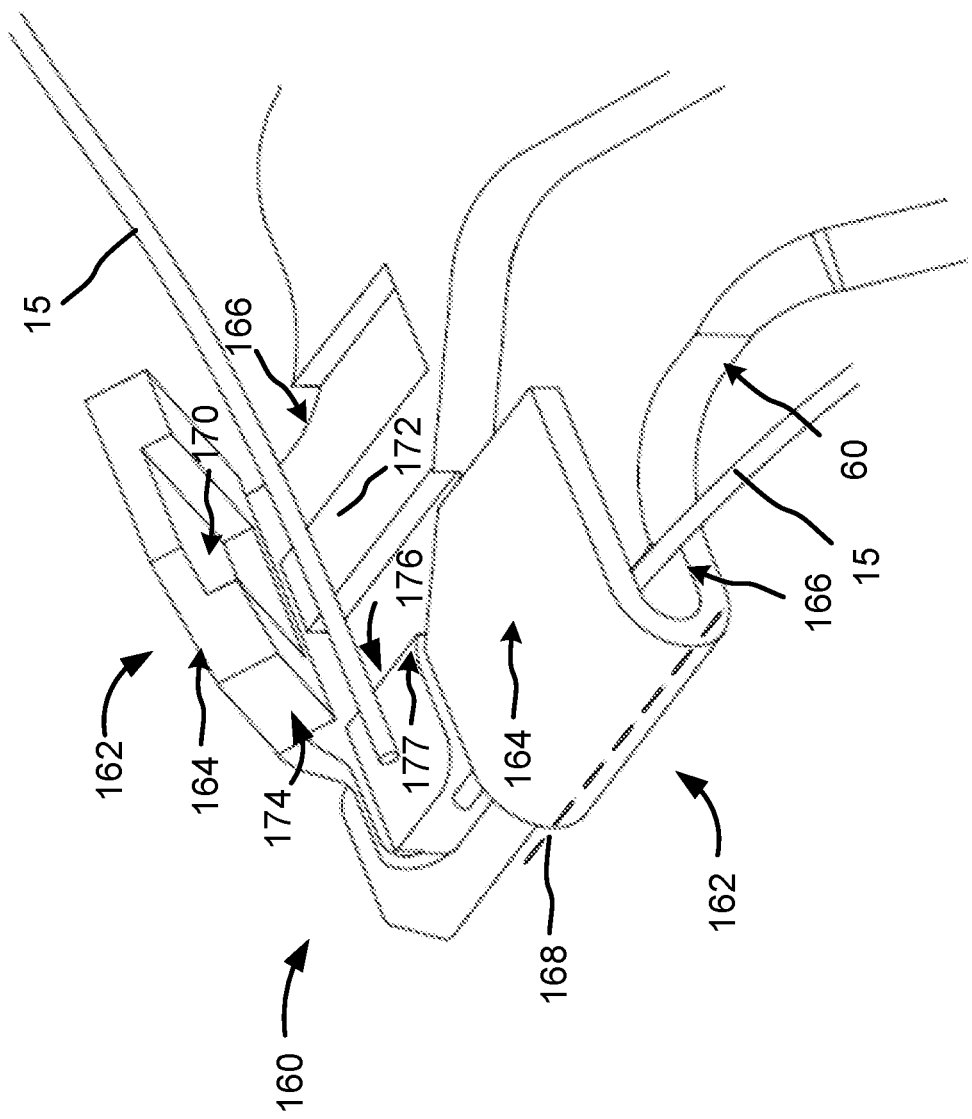

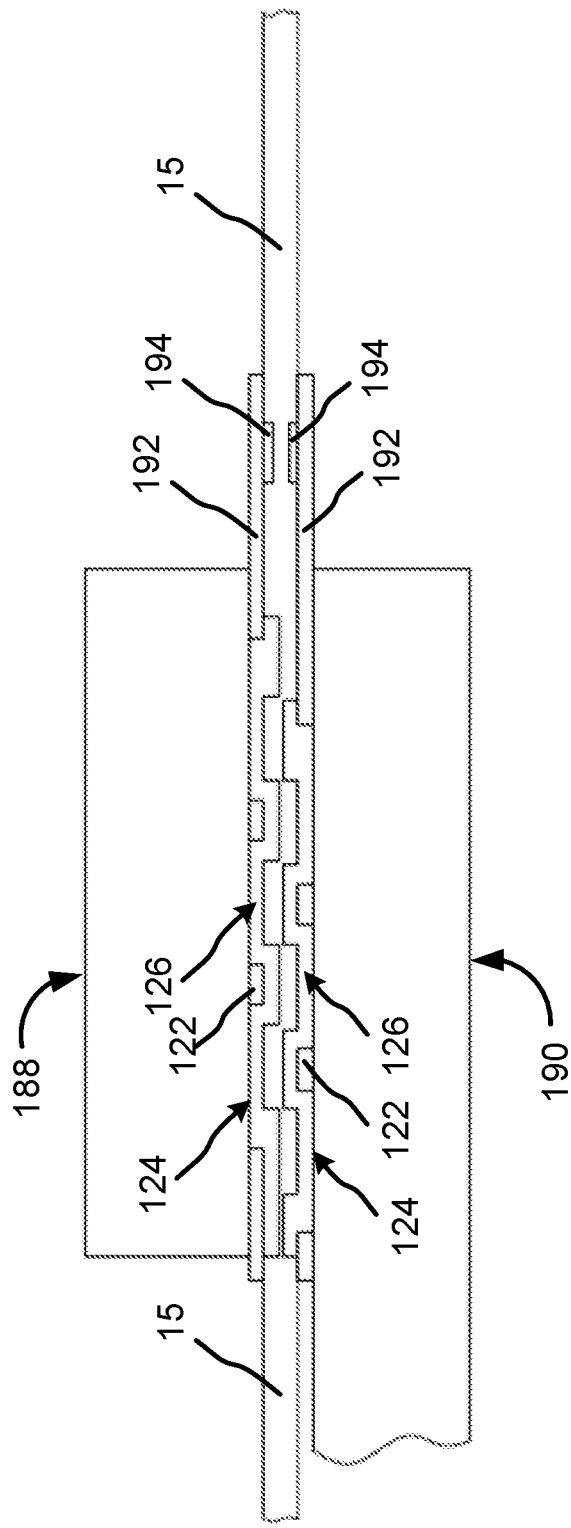

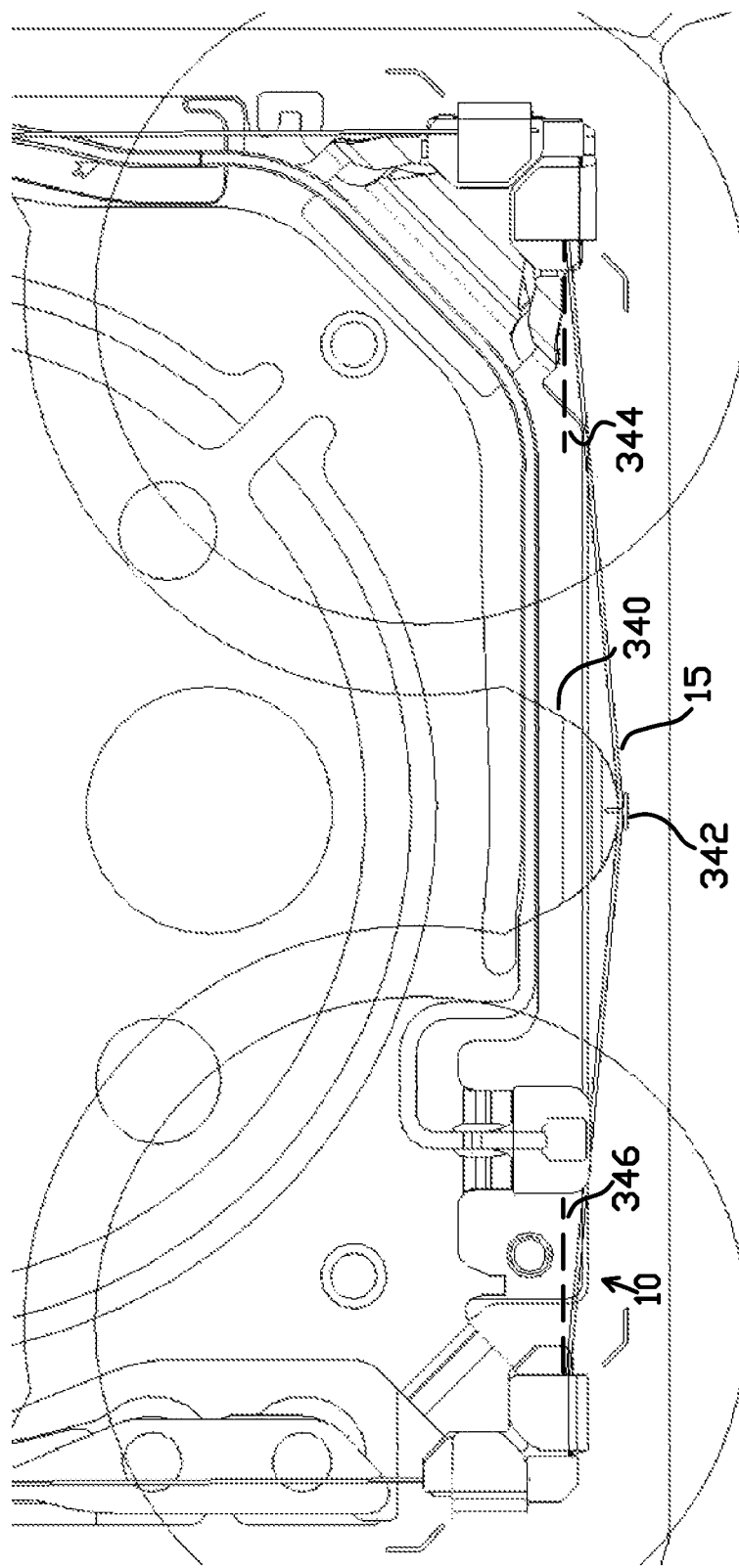

SHAPE MEMORY ALLOY WIRE ATTACHMENT STRUCTURES WITH ADHESIVE FOR A SUSPENSION ASSEMBLY

CROSS-REFERENCE TO RELATED APPLICATIONS

This application claims priority from U.S. Provisional Patent Application No. 62/348,084, filed on Jun. 9, 2016, which is hereby incorporated by reference in its entirety.

TECHNICAL FIELD

Embodiments relate generally to suspension assemblies using shape-memory alloy (SMA) wires. In particular, embodiments relate to an attachment structure with adhesive that crimps an SMA wire, which couples a support member of a suspension assembly to a moving member of a suspension assembly.

BACKGROUND

Various suspension assemblies use SMA wires to couple a support member of a suspension assembly to a moving member of the suspension assembly. For example, suspensions using SMA wires can be found in camera lens suspension systems. PCT International Application Publication Nos. WO 2014/083318 and WO 2013/175197 disclose a camera lens optical image stabilization (OIS) suspension system that has a moving assembly (to which a camera lens element can be mounted) supported by a flexure element or spring plate on a stationary support assembly. The flexure element, which is formed from metal such as phosphor bronze, has a moving plate and flexures. The flexures extend between the moving plate and the stationary support assembly and function as springs to enable the movement of the moving assembly with respect to the stationary support assembly. In addition to this mechanical function, the flexures provide electrical connections from the support assembly to structures such as the camera lens element mounted to the moving assembly. The moving assembly and support assembly are coupled by shape memory alloy (SMA) wires extending between the assemblies. Each of the SMA wires has one end attached to the support assembly, and an opposite end attached to the moving assembly. The suspension is actuated by applying electrical drive signals to the SMA wires. The above-identified PCT publications are incorporated herein by reference for all purposes.

There remains a continuing need for improved lens suspensions. In particular, there is a need for such suspension structures with improved structures for coupling electrical signals on the suspensions that do not damage the SMA wires and/or are less susceptible to the SMA wires being damaged when the suspensions are in use. Suspension structures of these types that are highly functional, robust and efficient to manufacture would be particularly desirable.

SUMMARY

Embodiments relate to improved suspensions having integrated electrical traces that couple the SMA wires in a manner that may reduce the likelihood of damaging the SMA wires. The suspension is functional, robust and efficient to manufacture.

In an example, a suspension assembly comprises: a support member including one or more first wire attach structures; a moving member including one or more second wire attach structures; an adhesive disposed between portions of at least one of: the one or more first wire attach structures and the one or more second wire attach structures; and a shape-memory alloy wire extending between the one or more first wire attach structures and the one or more second wire attach structures, wherein the shape-memory alloy wire is coupled to the one or more first wire attach structures, the one or more second wire attach structures and the adhesive.

In another example, a suspension assembly comprises: a support member including a one or more first wire attach structures; a moving member including one or more second wire attach structures; a shape-memory alloy wire extending between and coupled to the one or more first wire attach structures and the one or more second wire attach structures; and an adhesive disposed on a portion of the shape-memory alloy wire that is proximate to a side of at least one of: the one or more first wire attach structures and the one or more second wire attach structures.

In another example, a suspension assembly comprises: a support member including one or more first wire attach structures; a moving member including one or more second wire attach structures; a platform portion extending from at least one side of: the one or more first wire attach structures and the one or more second wire attach structures; an adhesive disposed on the platform portion; and a shape-memory alloy wire extending between the one or more first wire attach structures and the one or more second wire attach structures, and coupled to the one or more first wire attach structures, the one or more second wire attach structures and the adhesive.

In another example, a method of manufacturing a suspension assembly that includes an adhesive comprises: receiving a support member comprising: a support member including one or more first wire attach structures; a moving member including one or more second wire attach structures; and a shape-memory alloy wire coupled to and extending between the one or more first wire attach structures and the one or more second wire attach structures; disposing an adhesive proximate to a side of at least one of: the one or more first wire attach structures and the one or more second wire attach structures; applying electrical drive signals to the shape-memory alloy wire; and curing the adhesive.

In another example, a method of manufacturing a suspension assembly that includes an adhesive comprises: receiving a support member comprising: a support member including one or more first wire attach structures; a moving member including one or more second wire attach structures; an uncured adhesive disposed between portions at least one of: the one or more first wire attach structures and the one or more second wire attach structures; and a shape-memory alloy wire extending between and coupled to the one or more first wire attach structures and the one or more second wire attach structures; applying electrical drive signals to the shape-memory alloy wire; and curing the adhesive.

In another example, a method of manufacturing a suspension assembly that includes an adhesive comprises: receiving a support member comprising: a support member including one or more first wire attach structures; a moving member including one or more second wire attach structures; a first uncured adhesive disposed between portions of at least one of: the one or more first wire attach structures and the one or more second wire attach structures; a second uncured adhesive disposed proximate to at least one of: the one or more first wire attach structures and the one or more second wire attach structures; and a shape-memory alloy wire extending between and coupled to the one or more first wire attach structures and the one or more second wire attach structures; curing the second uncured adhesive; and curing the first uncured adhesive.

BRIEF DESCRIPTION OF THE DRAWINGS

FIGS. 8-14 are annotated illustrations of embodiments of the suspension.

FIGS. 25A-25C illustrate an attachment structure that can be incorporated into the moving member.

FIGS. 27A-27C illustrate another embodiment of a crimp that can be incorporated into the attachment structures disclosed herein.

FIG. 34 illustrates a suspension assembly in a fixture according to an embodiment.

DETAILED DESCRIPTION

Figure 1A:
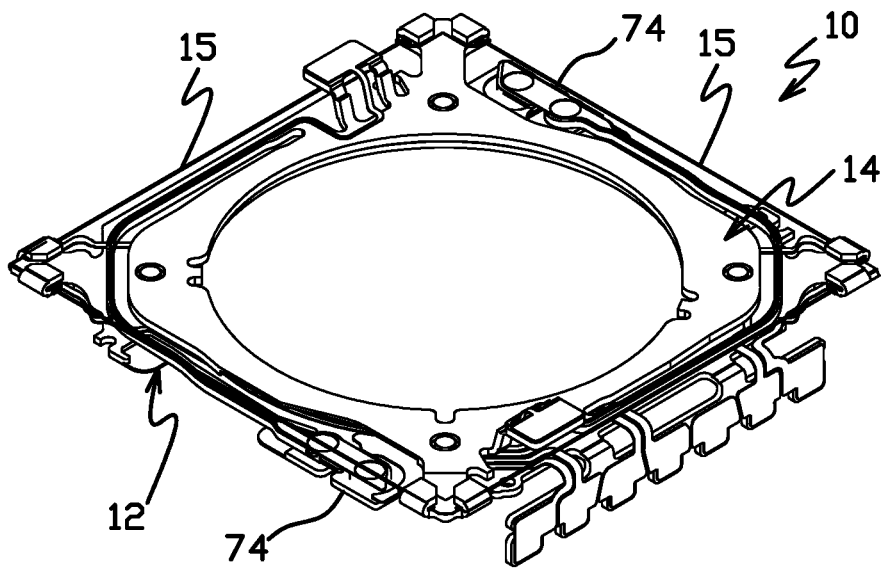
FIG. 1A is a top isometric view of a suspension according to an embodiment.
Figure 1B:
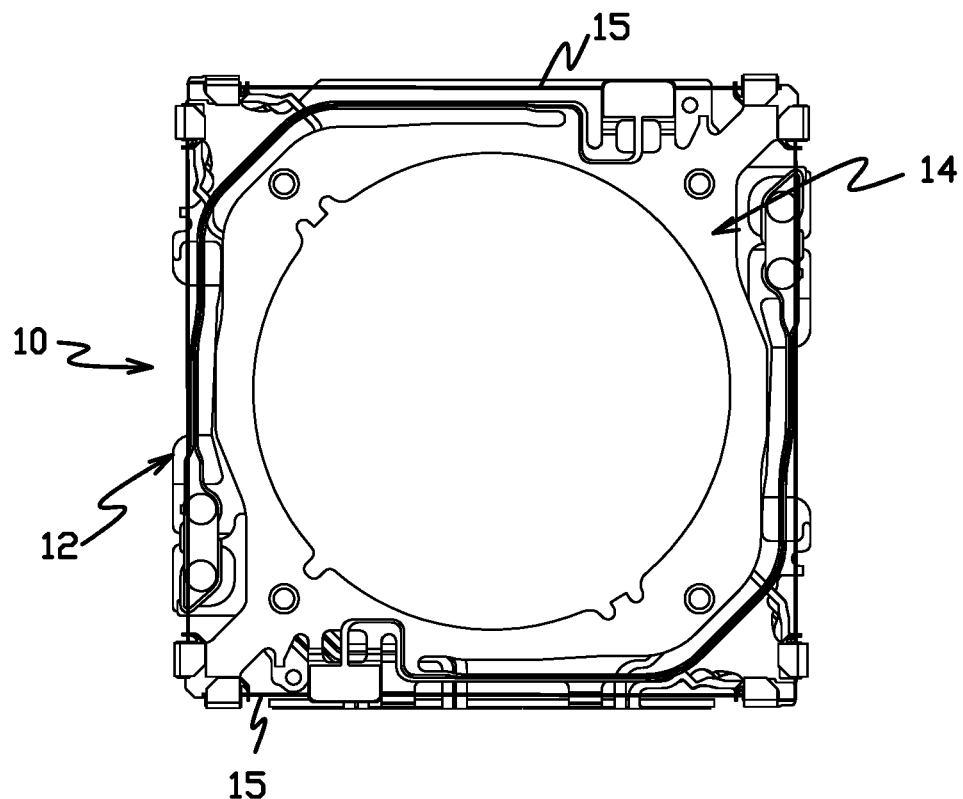
FIG. 1B is a top plan view of the suspension shown in FIG. 1A.
Figure 2A:
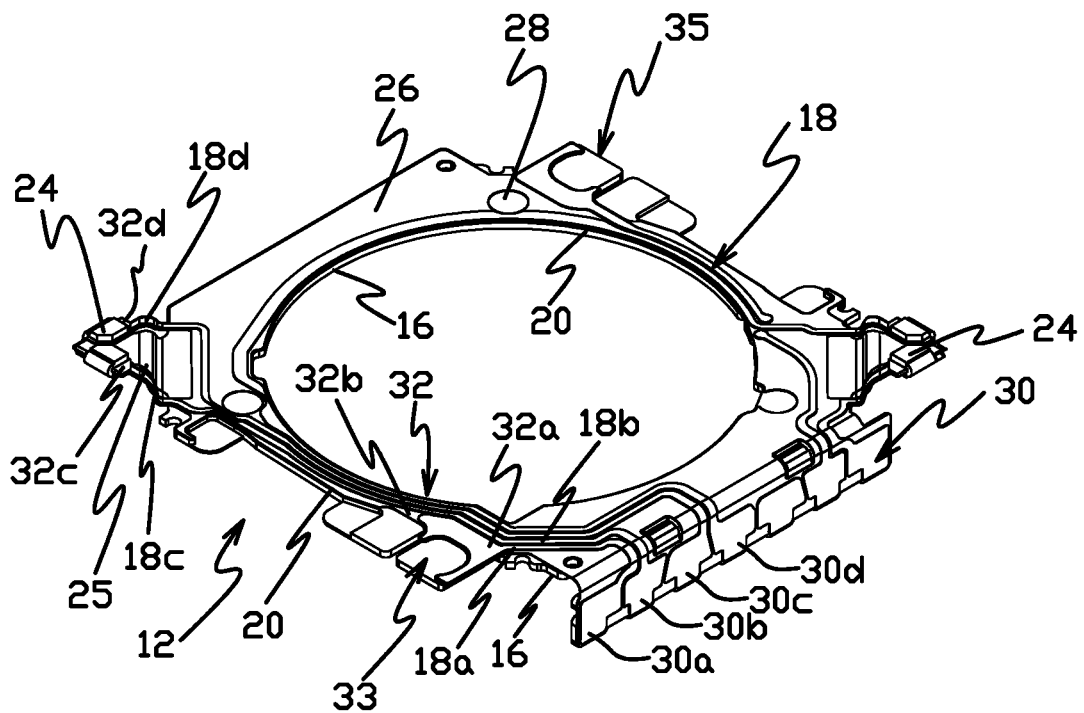
FIG. 2A is a top isometric view of the support member of the suspension shown in FIG. 1A.
Figure 2B:
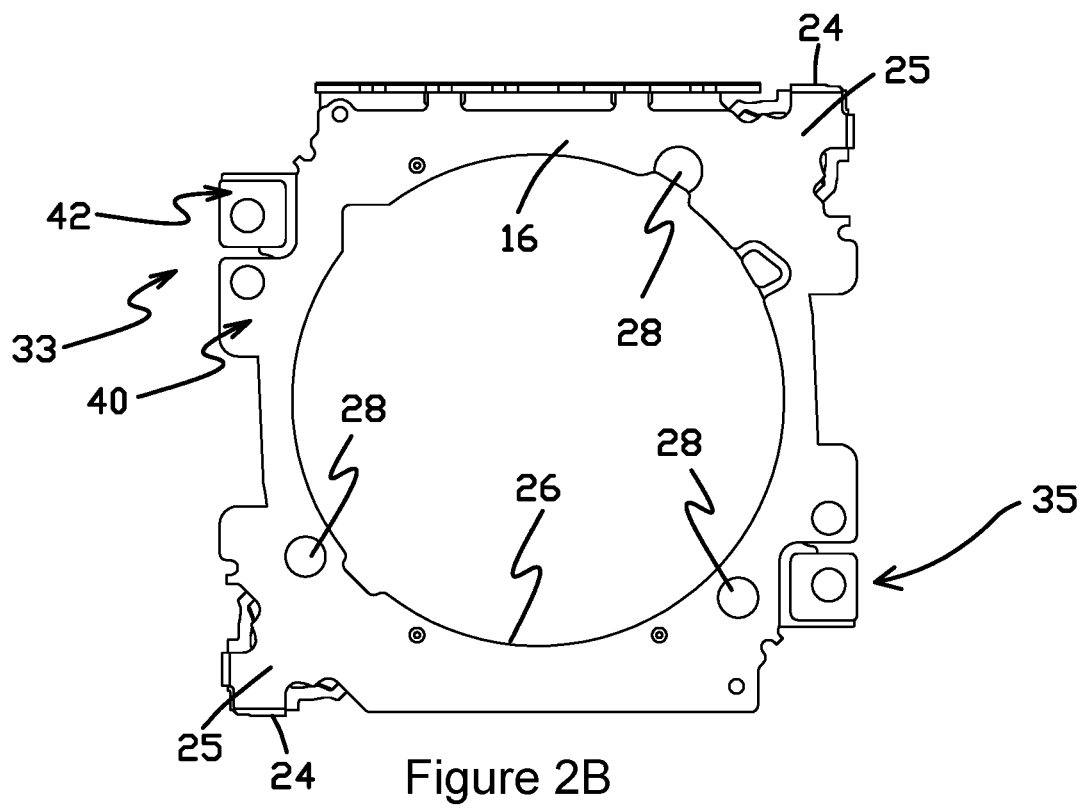
FIG. 2B is a bottom plan view of the support member shown in FIG. 2A.

FIGS. 1A and 1B illustrate a suspension assembly 10 according to an embodiment. As shown, the suspension assembly 10 includes a flexible printed circuit (FPC) or support member 12 and a spring crimp circuit or moving member 14 that is coupled to the support member. Shape memory alloy (SMA) wires 15 extend between the support member 12 and the moving member 14, and can be electrically actuated to move and control the position of the moving member with respect to the support member. According to various embodiments, the suspension assembly 10 is a camera lens optical image stabilization (OIS) device that can be incorporated, for example, into mobile phones, tablets, laptop computers.

FIGS. 2A, 2B, 3A and 3B illustrate the support member 12 in greater detail. As shown, the support member 12 includes a base layer 16 and a plurality of conductive traces 18 such as traces 18a-18d on the base layer 16. According to various embodiments, the plurality of conductive traces 18 are in a conductor layer of the support member 12. A layer of dielectric 20 is located between the conductive traces 18 and the base layer 16 to electrically insulate the traces from the base layer 16. A plurality of wire attach structures such as crimps 24. According to various embodiments, such as that illustrated in FIGS. 2A, 2B, 3A, and 3B, four crimps 24 configured as static crimps are located on the base layer 16. According to the illustrated embodiment, the crimps 24 are organized as two pairs of adjacent structures that are integrally formed on a ledge 25 in the base layer 16 at a level spaced (e.g., in a z-direction) from a major planar surface portion 26 of the base layer 16. Other embodiments include those using wire attach structures including, but not limited to, solder pads, and other mechanical structures used to affix a wire. According to other embodiments, the wire attach structures are organized in other arrangements, such as a single wire attach structure on a ledge 25 of a base layer 16 rather than in pairs. According to various embodiments, bearing-retaining recesses 28 are formed in the portion 26 of base layer 16. Bearings (not shown) in the recesses 28 are configured to engage the moving member 14 and movably support the moving member 14 with respect to the support member 12. Traces 18 include terminals 30 and contact pads 32 in the conductor layer on the base layer 16. Each of the traces 18 couples a terminal 30 to a contact pad 32. For example, contact pads 32a and 32b are at a first mount region 33 of the support member 12, and traces 18a and 18b couple terminals 30a and 30b to pads 32a and 32b, respectively. Contact pads 32 at a second mount region 35 are similarly coupled to terminal 30 by traces 18. A contact pad 32 is located at each of the crimps 24 according to the illustrated embodiment, and each of the contact pads is coupled by a separate trace to a separate terminal 30 (e.g., trace 18d couples terminal 30d to pad 32d). The portion of the base layer 16 on which the terminals 30 are located is formed out of the plane of the major surface portion 26 (e.g., perpendicular to the plane of the major surface portion according to the illustrated embodiment).

Figure 3A:
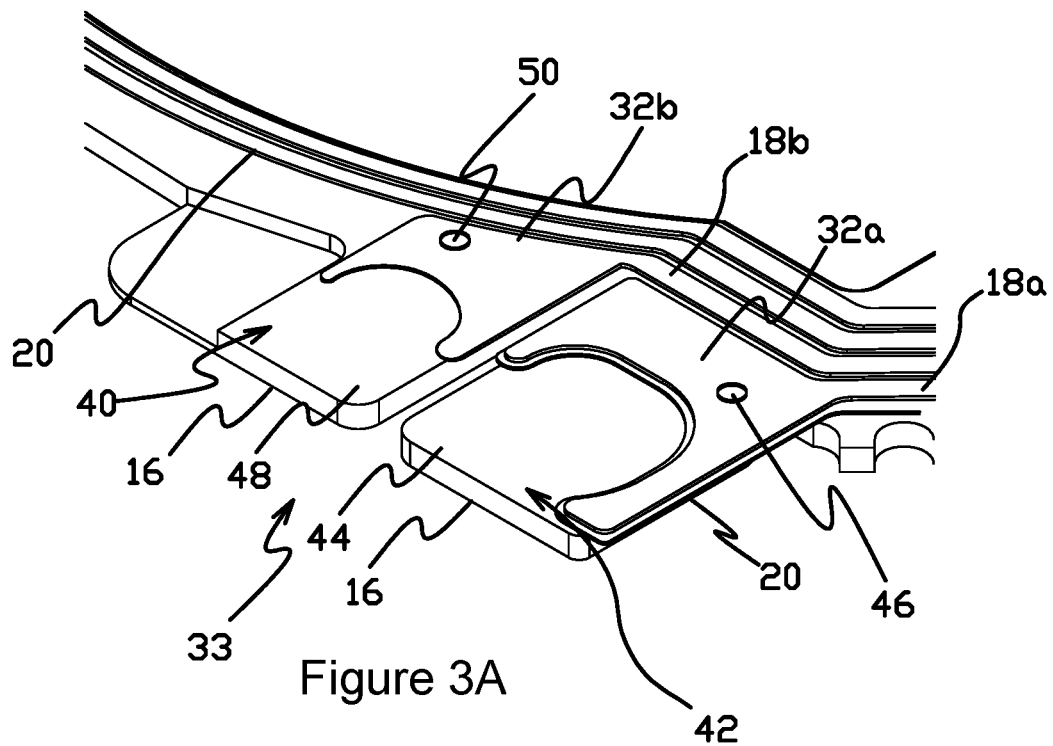
FIG. 3A is a detailed top isometric view of a mount region of the support member shown in FIG. 2A.
Figure 3B:
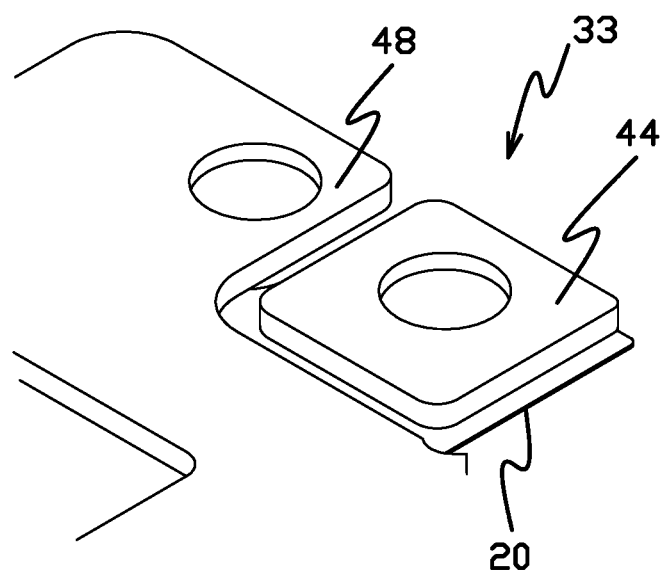
FIG. 3B is a detailed bottom isometric view of the mount region of the support member shown in FIG. 2A.

FIGS. 3A and 3B illustrate in greater detail embodiments of the mount region 33 of the support member 12. As shown, the mount region 33 includes a first mounting pad 40 and a second mounting pad 42. Mounting pad 42 includes an island or pad portion 44 in the base layer 16 that is electrically isolated from other portions of the base layer. The island pad portion 44 can be supported in part from adjacent portions of the base layer 16 by areas of dielectric 20 that extend between the island pad portion 44 and adjacent portions of the base layer 16. Trace 18a and contact pad 32a extend to the island pad portion 44, and in embodiments are electrically connected to the island pad portion 44 by an electrical connection such as a plated or other type of via 46 that extends through the dielectric 20 at the mounting pad 42. Other embodiments include other electrical connections in place of or in addition to via 46, such as, for example, conductive adhesive that extends between the contact pad 32a and island pad portion 44 over the edges of the dielectric 20. Mounting pad 40 is adjacent to mounting pad 42, and includes a pad portion 48 in the base layer 16, and an electrical connection such as a via 50 that connects the contact pad 32b to the pad portion 48. According to various embodiments, a pad portion 48 is configured to functions as an electrical ground or a common structure. The mount region 35 can be similar to mount region 33.

FIGS. 4A, 4B, 5, 6 and 7 illustrate embodiments of the moving member 14 in greater detail. As shown, the moving member 14 includes a plate 60 and spring or flexure arms 62 extending from the plate 60. According to the illustrated embodiments, the plate 60 is a rectangular member, and each flexure arm 62 is an elongated member having a first portion 64 and a second portion 66 that extend along two sides of the periphery of the plate 60. According to various embodiments, the plate 60 and flexure arms 62 are formed in a spring metal base layer 68 such as stainless steel. Moving member 14 also includes wire attach structures such as crimps 70. According to various embodiments, such as that illustrated in FIGS. 4A, 4B, 5, 6, and 7, four crimps 70, such as moving crimps, are organized in pairs. According to the illustrated embodiment, the crimps 70 are unitary with and formed from the same spring metal base layer 68 as the plate 60 on the ends of arms 72 extending from the plate 60. Moving member 14 is configured differently in other embodiments. For example, in other embodiments the flexure arms 62 can be shaped differently, be different in number, organized differently, and/or can extend from other locations on the plate 60. In still other embodiments, the crimps 70 can be formed as separate structures that are attached to the plate 60 (i.e., not unitary with the plate). Other embodiments include those using wire attach structures including, but not limited to, solder pads, and other mechanical structures used to affix a wire. According to other embodiments, the wire attach structures are organized in other arrangements, such as a single wire attach structure on the end of an arm 72 rather than in pairs.

The end portions of the flexure arms 62 have mount regions 74 that are configured to be mounted to the mount regions 33 and 35 of the support member 12. Conductive traces 76 on the base layer 68 extend on the flexure arms 62 from the mount regions 74. According to various embodiments, the traces 76 also extend on the base layer 68 over portions of the plate 60. According to the illustrated embodiment, the traces 76 on the arms 72 also extend to contact pads 77 on the plate 60. According to the illustrated embodiment, the contact pads 77 are on platforms 73 extending out of the major planar surface of the plate 60. The contact pads 77 are at other locations (e.g., on the plate 60) in other embodiments. A layer of dielectric 78 is located between the conductive traces 76 and the base layer 68 to electrically insulate the traces 76 from the base layer 68. Mount regions 74 include a first mounting pad 80 and a second mounting pad 82. Each mounting pad 82 includes an island or pad portion 84 in the base layer 68 that is electrically isolated from other portions of the base layer 68. Each trace 76 extends from the mounting pad 82, over (and electrically insulated from) the mounting pad 80. According to the illustrated embodiment, the portions of traces 76 extending between the mounting pads 80 and 82 are enlarged over the portions of the traces on the flexure arms 62 to provide support for the island pad portions 84 in the base layer 68. The traces 76 extend to the island pad portions 84, and in embodiments are electrically connected to the island pad portions by electrical connections such as a plated or other type of via 86 that extends through the dielectric 78 at the mounting pad 82. Other embodiments include other electrical connections in place of or in addition to vias 86, such as conductive adhesive that extends between the trace 76 and island pad portion 84 over the edges of the dielectric 78. Mounting pad 80 includes a pad portion 90 in the base layer 68 that is electrically isolated from the trace 76 by the dielectric 78. According to the illustrated embodiments, the portions of the traces 76 over the mounting pads 80 and 82 are circular and open in the center, but take other forms in other embodiments.

Figure 7:
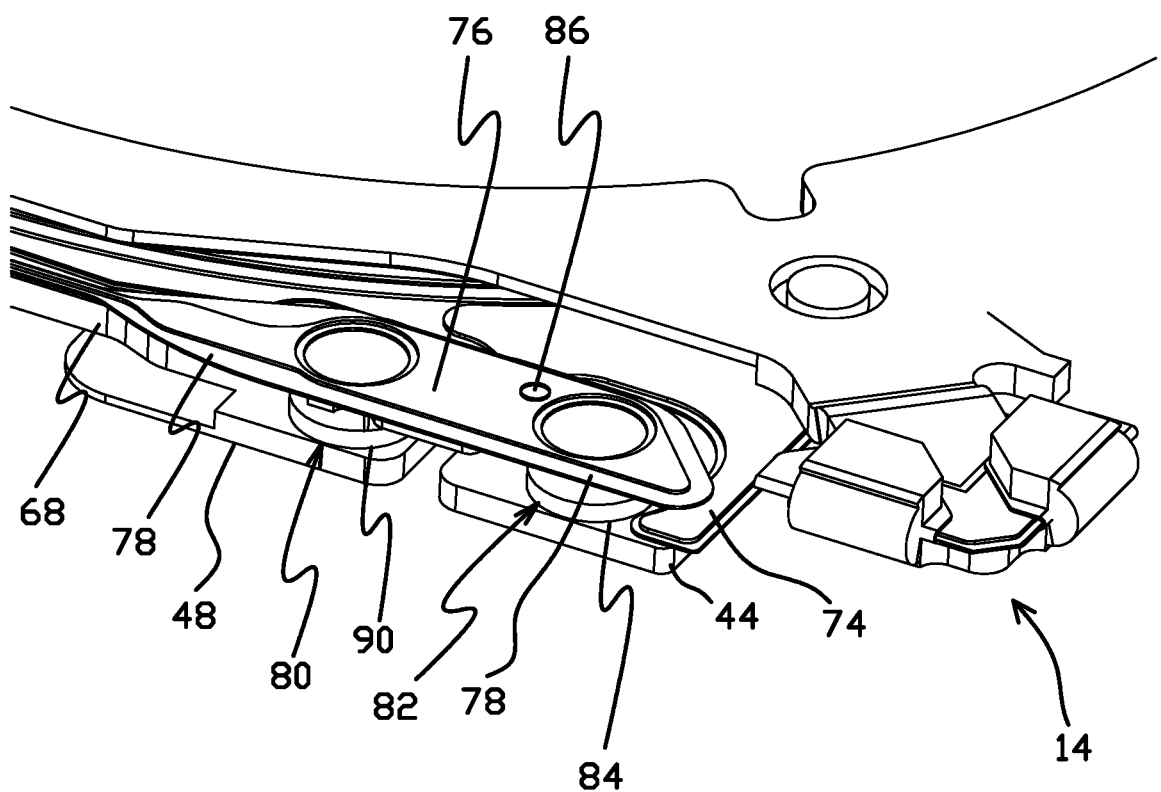
FIG. 7 is a detailed top isometric view of a support member mount region and a flexure arm mount region of the suspension shown in FIG. 1A.
Figure 8:
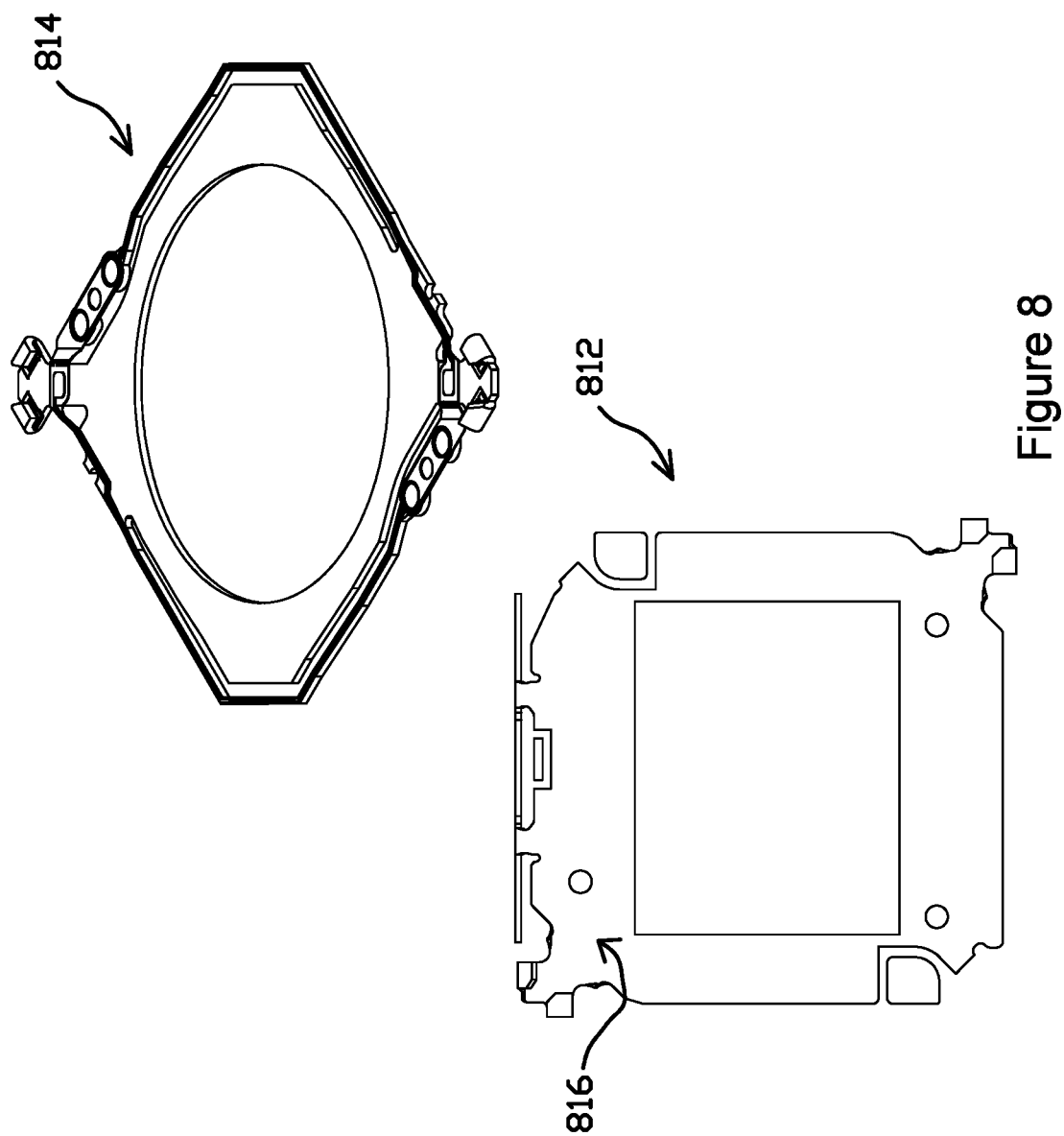
Figure 9:
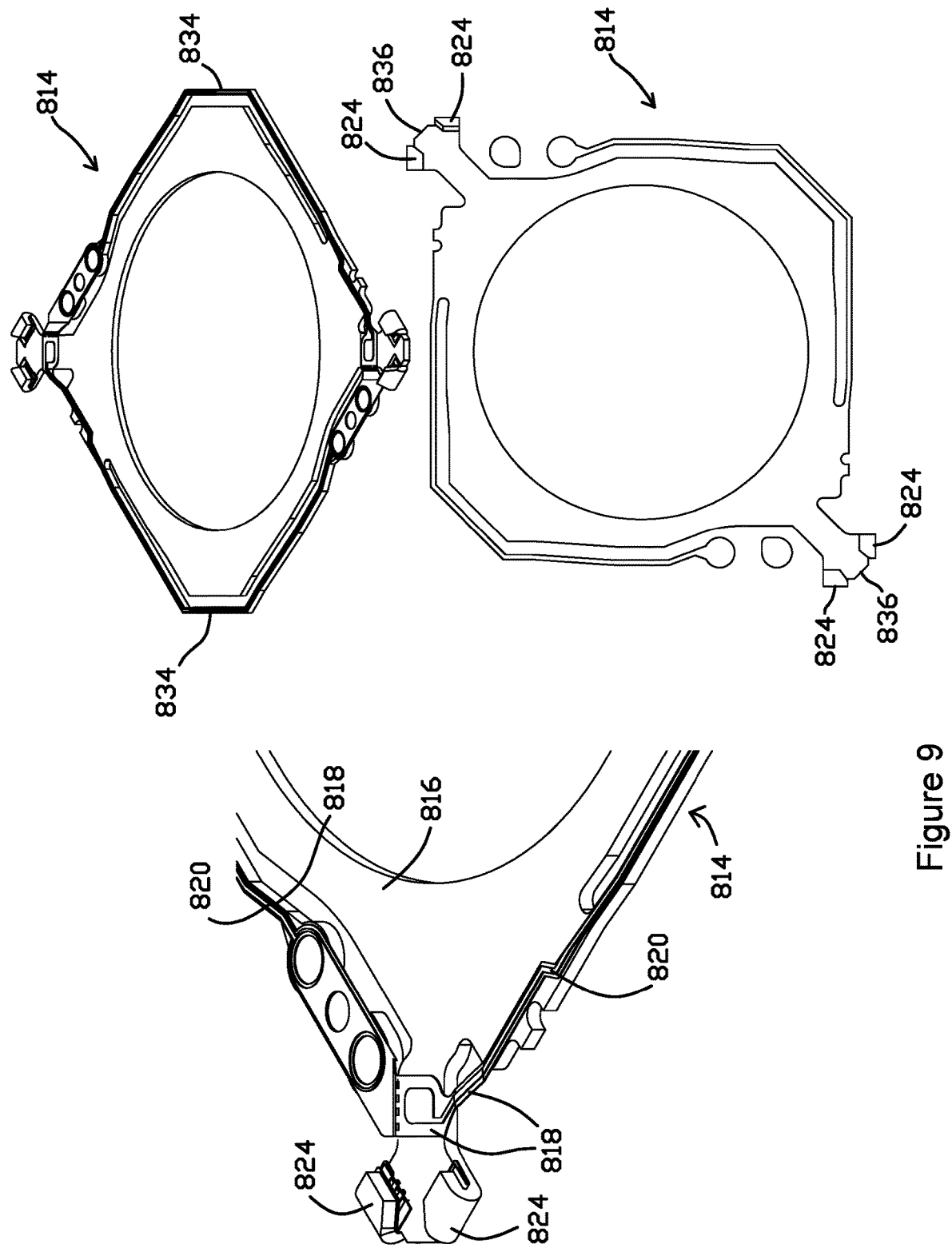
Figure 10:
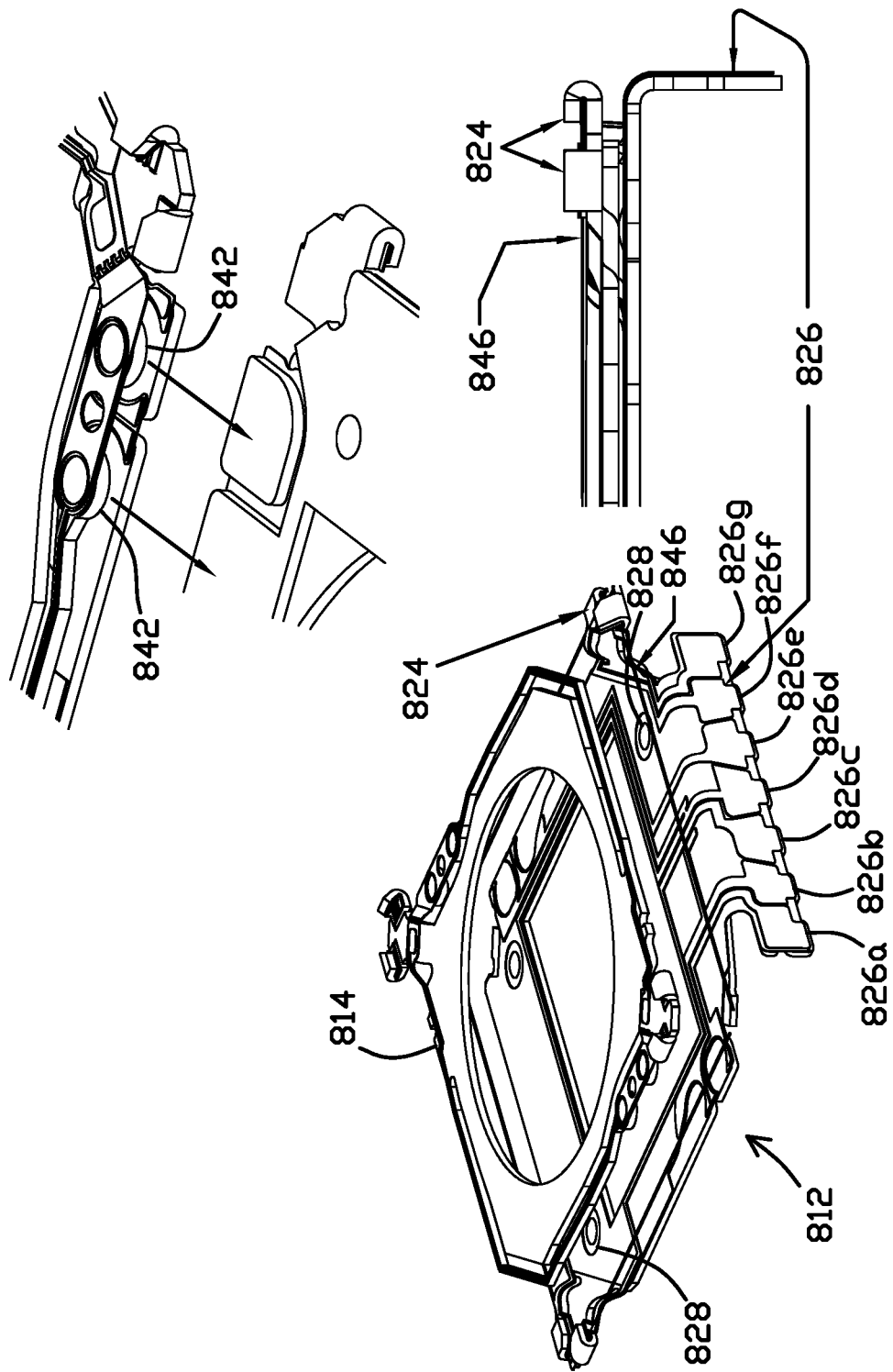
Figure 11:
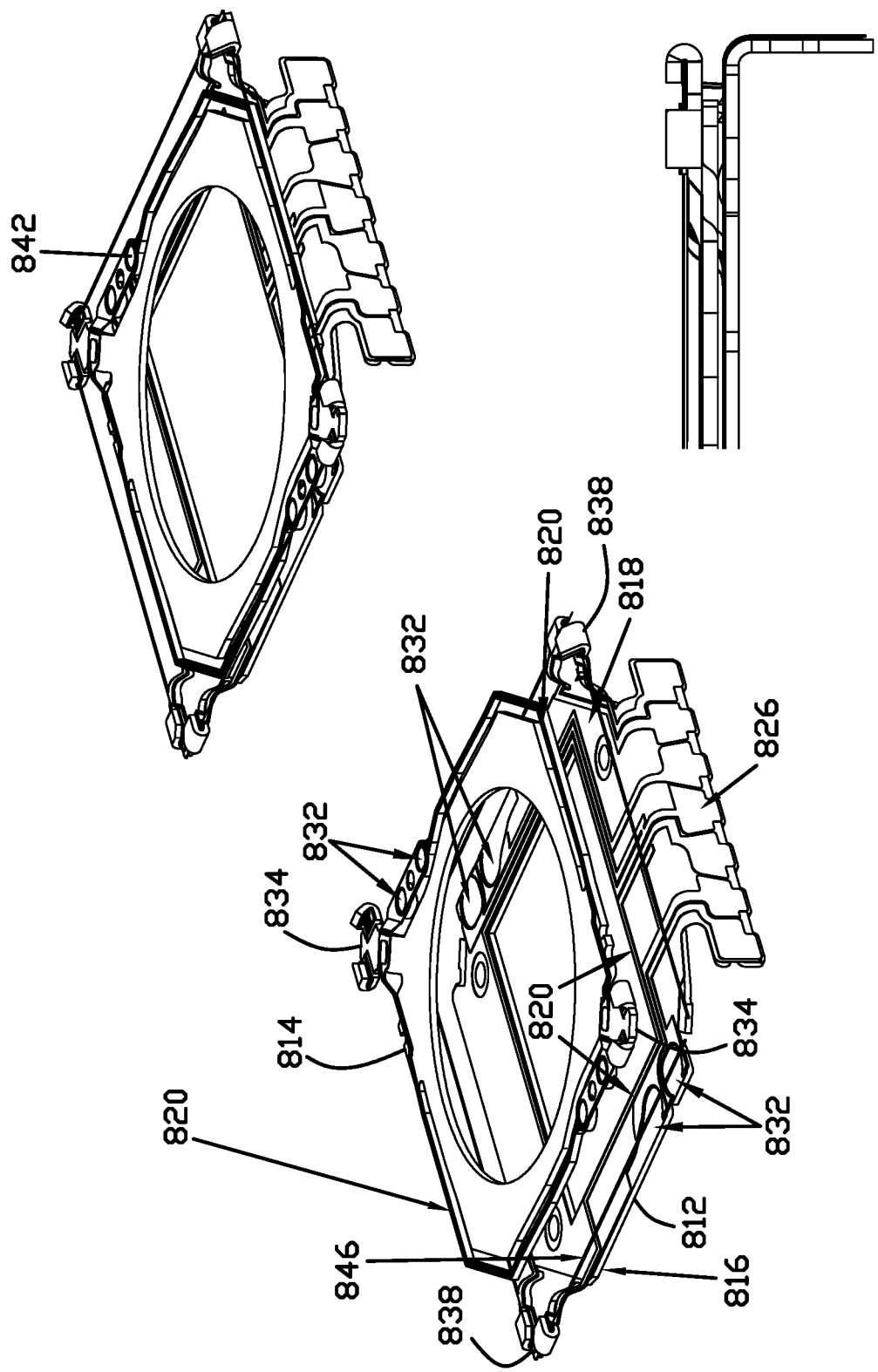
Figure 13:
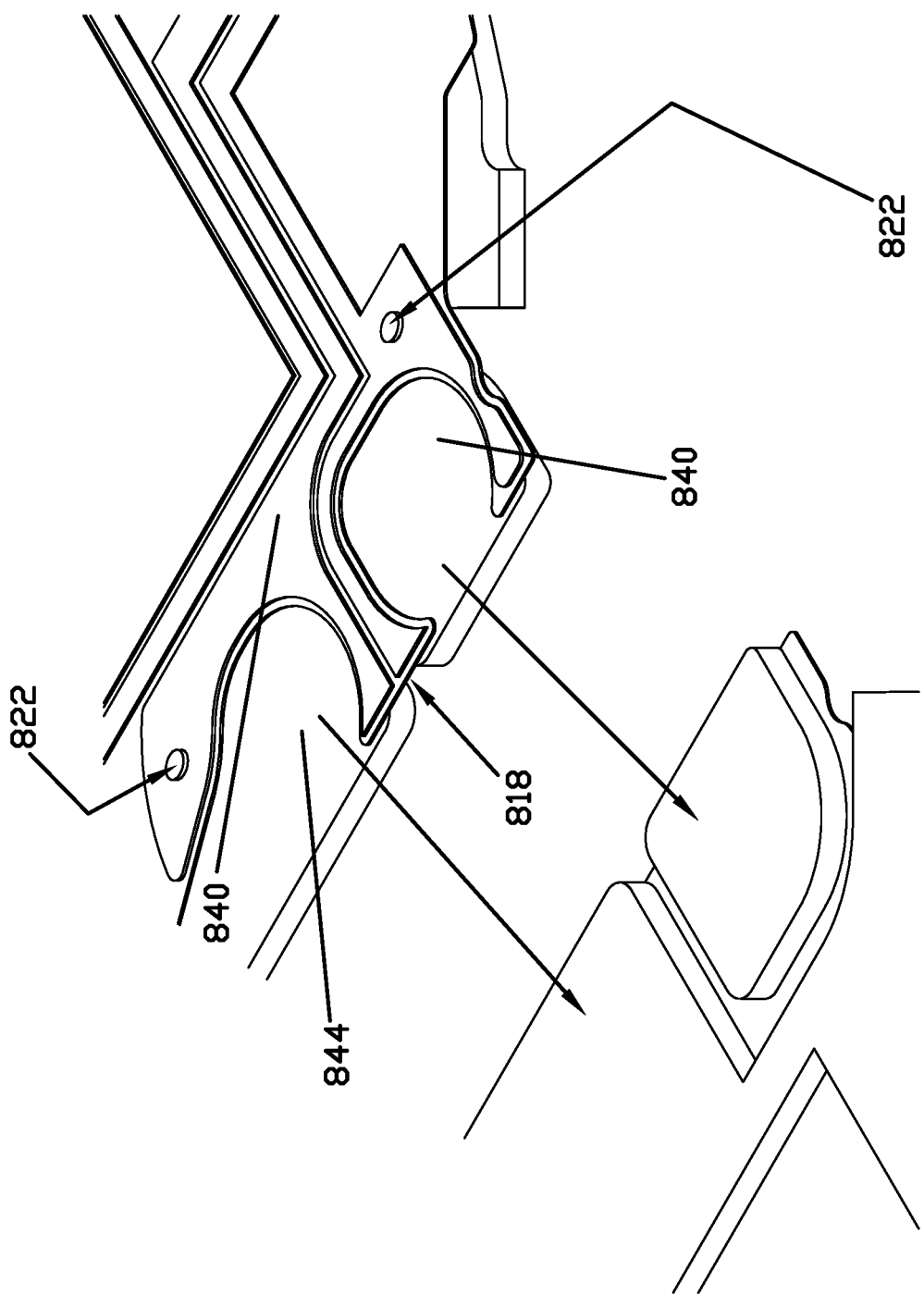
Figure 14:
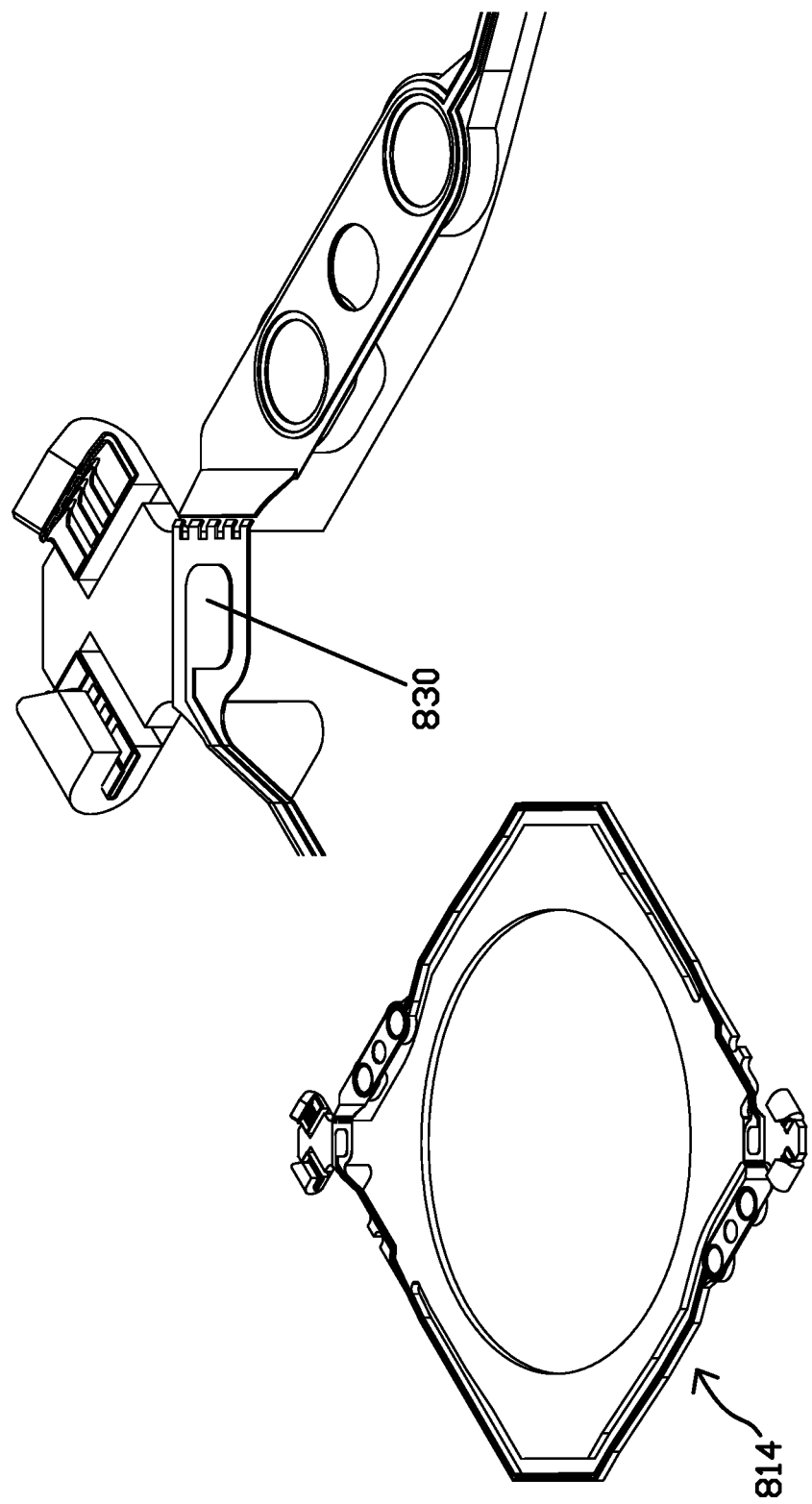

As perhaps best shown in FIGS. 1A and 7, the mount regions 74 of the moving member flexure arms 62 are mechanically attached to the mount regions 33 and 35 of the support member 12. The traces 76 on the flexure arms 62 are electrically connected to the associated traces 18 on the support member 12. According to various embodiments, the mechanical connections are made by welds between the pad portions 84 and 90 in the base layer 68 of the moving member 14 and the corresponding pad portions 44 and 48 in the base layer 16 of the support member 12. The welds can, for example, be made through the openings in the traces 76 at the pad portions 84 and 90. The welds also enable electrical connections between the pad portions 84 and 90 of the moving member 14 and the corresponding pad portions 44 and 48 of the support member 12. By these electrical connections, the metal base layer 68 of the moving member 14, and thereby the crimps 70, such as moving crimps, are electrically connected in common to an associated trace 18, for example trace 18b through via 50. Similarly, each flexure arm trace 76 is electrically connected to an associated trace 18, for example trace 18a through via 46. Other embodiments have other structures for mechanically mounting the flexure arms 62 to the support member 12, and/or for electrically connecting the traces 76 on the flexure arms to the associated traces 18 on the support member 12. According to the illustrated embodiment, conductive metal regions 94 are located directly on the metal base layer 68 of the moving member 14 at the crimps 70 (i.e., there is no dielectric or other insulating material between the conductive metal regions 94 and the metal base layer 68) to enhance the electrical connections between the metal base layer 68 and the SMA wires 15 engaged by the crimps 70.

As described in greater detail below, the support member 12 and moving member 14 can be formed from additive and/or subtractive processes. Base layers 16 and/or 68 are stainless steel according to various embodiments. For other embodiments the base layers 16 and/or 68 are other metals or materials such as phosphor-bronze. Traces 18 and 76, terminals 30 and contact pads 32 can be formed from copper, copper alloys or other conductive materials. Polyimide or other insulating materials can be used as the dielectric 20 and 78. Other embodiments of the support member 12 and/or moving member 14 have more or fewer traces 18 and 76, and the traces 18 can be arranged in different layouts. Structures other than crimps 24, such as welds, can be used to attach the SMA wires 15 to the base layer 16. Other embodiments have more or fewer crimps 24 and 70, and the crimps can be at different locations on the support member 12 and moving member 14, respectively.

Figure 4A:
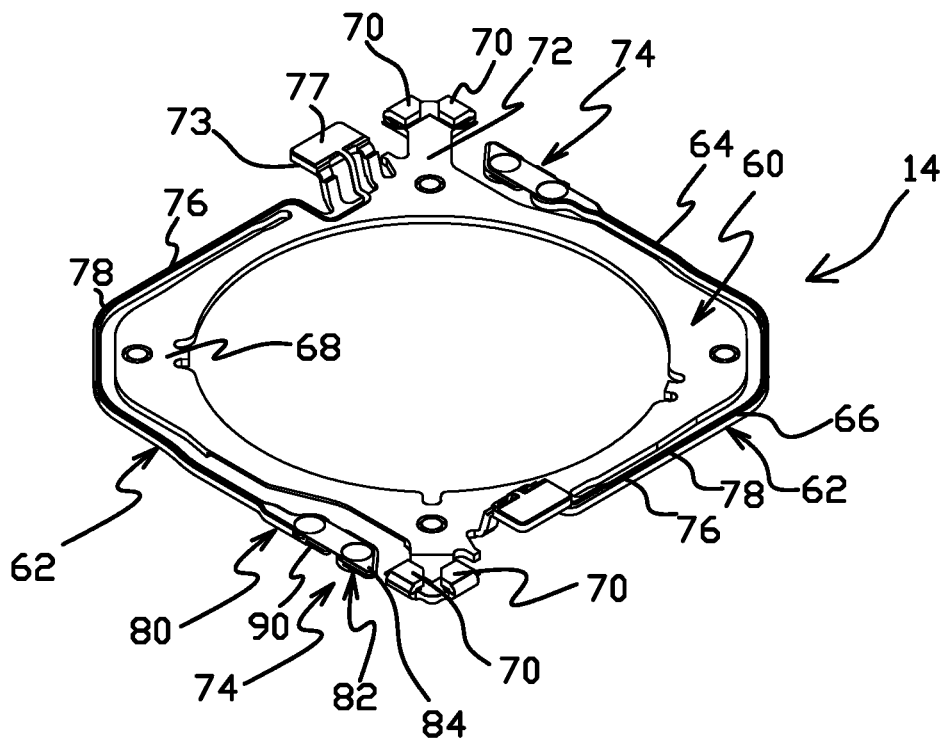
FIG. 4A is a top isometric view of the moving member of the suspension shown in FIG. 1A.
Figure 4B:
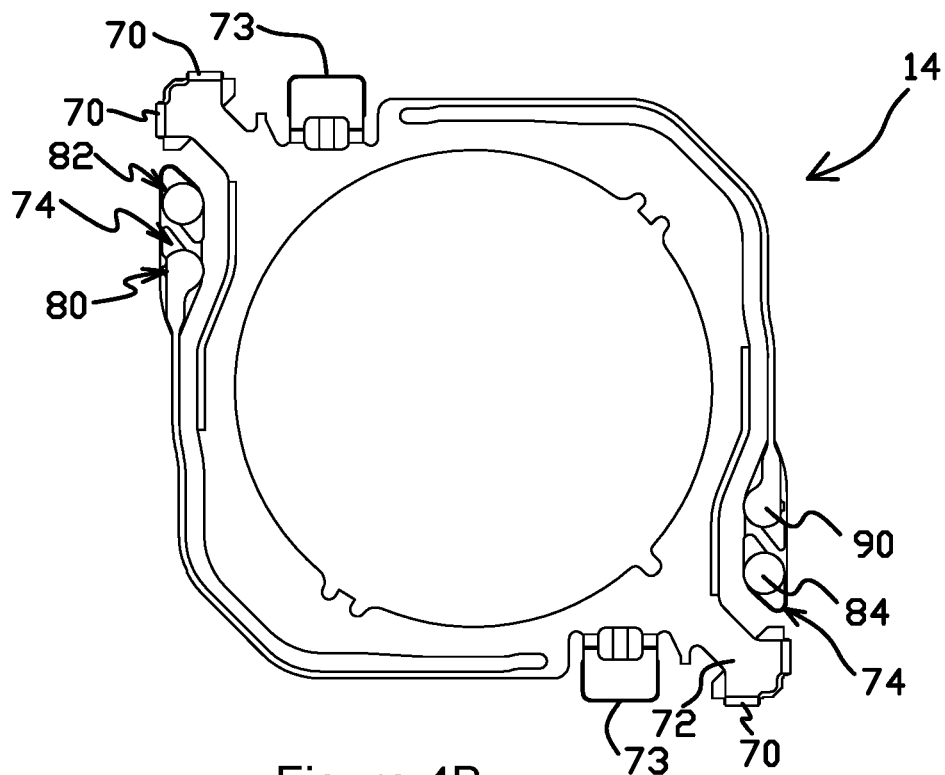
FIG. 4B is a bottom plan view of the moving member shown in FIG. 4A.
Figure 5:
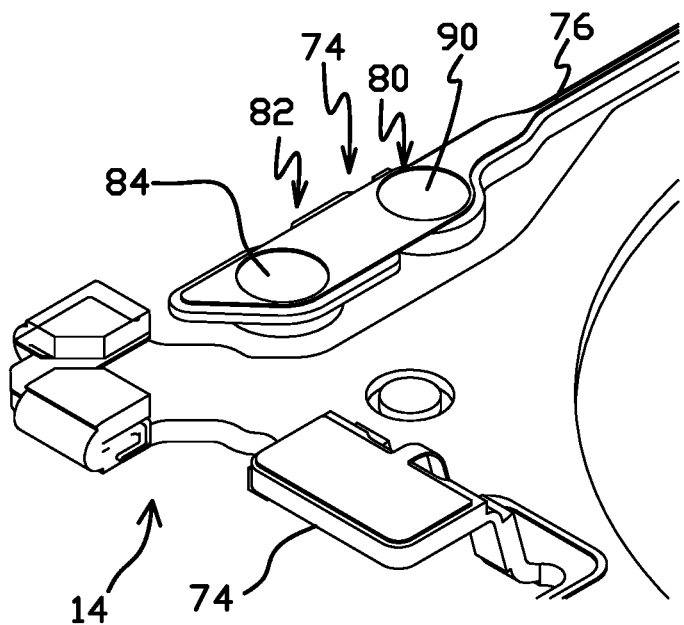
FIG. 5 is a detailed top isometric view of a flexure arm mount region and a wire attach of the moving member shown in FIG. 4A.
Figure 6:
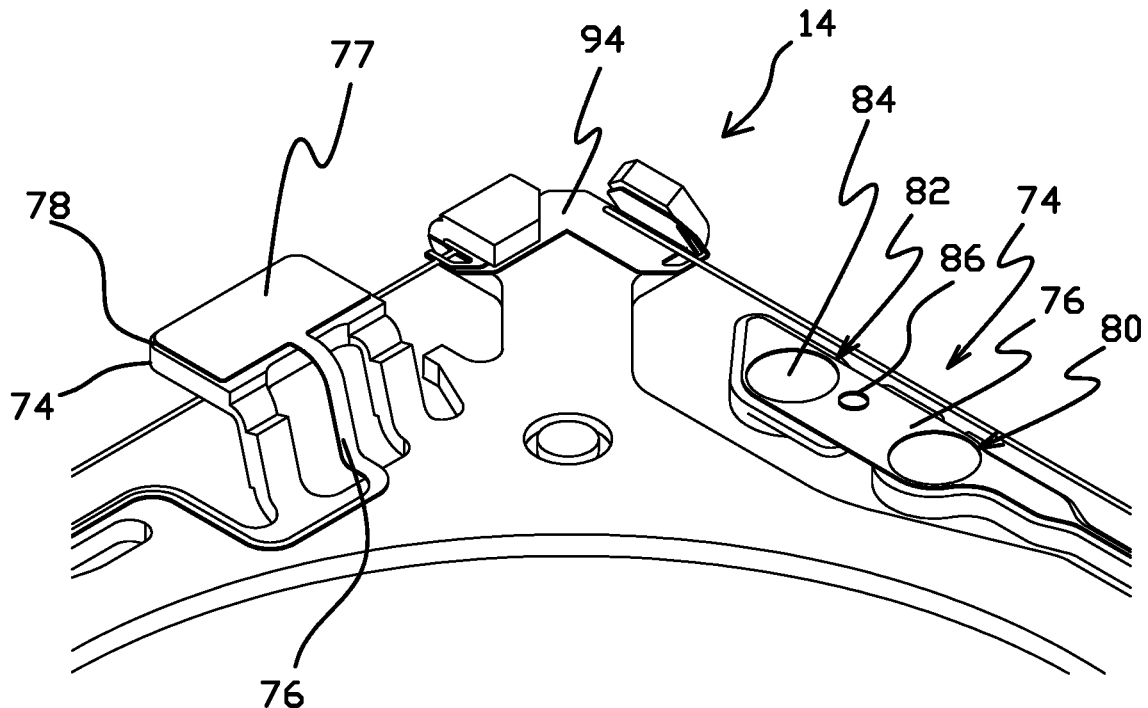
FIG. 6 is a detailed top isometric view of a flexure arm mounting region and a wire attach of the moving member shown in FIG. 4A.

As stated above, the suspension assembly 10 includes SMA wires 15 that extend between the support member 12 and the moving member 14. The SMA wires 15 are coupled to the support member 12 and the moving member 14 using attachment structures. The attachment structures may include crimps, for example, the crimps 24, 70 depicted in FIGS. 2A-2B and 4A-4B, respectively. According to various embodiments, the support member 12 and the moving member 14 each include attachment structures on two ledges 25 on diagonal corners, as shown in FIGS. 1B and 4B, respectively.

FIGS. 8-14 illustrate an improved camera lens suspension assembly according to an embodiment. The suspension assembly has two primary components—a base or support member 812 (also referred to as a static FPC (flexible printed circuit)), and a moving/spring member 814 (also referred to as a spring crimp circuit). Both the static FPC (base member 812) and the spring crimp circuit (moving member 814) are integrated lead structures according to the illustrated embodiments, in that they have electrical structures such as leads, contact pads and terminals (e.g. in a copper "Cu" or copper alloy layer) formed on the base metal 816 (e.g. stainless steel (SST)) according to the illustrated embodiments). A layer of insulator 818 (e.g., polyimide or "poly") separates the portions of the electrical structures that are to be electrically isolated from the base metal 816 (for various embodiments, other portions of the Cu layer are connected to or directly on the base metal 816). At some locations, the electrical structures, such as one or more traces 820, can be electrically connected to the base metal 816 by electrical connections (e.g., "vias" 822) extending from a trace 820 or lead layer to the base metal 816 through openings in the layer of insulation 818. According to various embodiments, a lens can be mounted to the moving member 814. According to other embodiments, an autofocus system supporting the lens can be mounted to the moving member 814.

As noted above, the static member 812 and moving member 814 can be formed from overlaying layers of base metal 816 (e.g., a spring metal such as SST), an insulating layer 818 and the trace layer, for example including one or more traces 820. An insulating covercoat can be applied over all or portions of the trace layer. Corrosion resistant metals such as gold (Au) and/or nickel (Ni) can be plated or otherwise applied to portions of the trace layer to provide corrosion resistance. Conventional additive deposition and/or subtractive processes such as wet (e.g., chemical) and dry (e.g., plasma) etching, electro plating and electroless plating and sputtering processes in connection with photolithography (e.g., use of patterned and/or unpatterned photoresist masks), as well as mechanical forming methods (e.g., using punches and forms) can be used to manufacture the static member 812 and moving member 814 according to an embodiment. Additive and subtractive processes of these types are, for example, known and used in connection with the manufacture of disk drive head suspensions, and are disclosed generally in the following U.S. patents, all of which are incorporated herein by reference for all purposes: Bennin et al. U.S. Pat. No. 8,885,299 entitled Low Resistance Ground Joints for Dual Stage Actuation Disk Drive Suspensions, Rice et al. U.S. Pat. No. 8,169,746 entitled Integrated Lead Suspension with Multiple Trace Configurations, Hentges et al. U.S. Pat. No. 8,144,430 entitled Multi-Layer Ground Plane Structures for Integrated Lead Suspensions, Hentges et al. U.S. Pat. No. 7,929,252 entitled Multi-Layer Ground Plane Structures for Integrated Lead Suspensions, Swanson et al. U.S. Pat. No. 7,388,733 entitled Method for Making Noble Metal Conductive Leads for Suspension Assemblies, Peltoma et al. U.S. Pat. No. 7,384,531 entitled Plated Ground Features for Integrated Lead Suspensions.

The static member 812 is a one-piece member according an embodiment, and has two attachment structures 824, for example static crimps, (attachment structures) on each of two diagonal corners 838 of the static member 816 (4 static crimps in total according to the embodiment illustrated). A terminal pad section 826 includes terminal pads 826a-g in the trace layer that are connected to traces 820 that extend over the surface of the static member 812. According to the embodiment illustrated in FIGS. 8-14, a separate trace 820 extends to each of the four attachment structures 824, such as four static crimps. At each of the attachment structures 824 is an electrical contact or terminal 830 formed by the trace 820 and one or more insulating layers 818. Formed dimples 828 on the upper surface of the static member 812 engage the back surface of the moving member 814, and function as sliding interface bearings to enable low friction movement of the moving member 814 with respect to the static member 812. The traces 820 on the static member 812 also couple terminal pads 828a-g to electrical pad locations 832 on the static member 812 that are electrically and mechanically coupled to the moving member 814 (e.g., to provide electrical signals to an auto focus (AF) assembly and to provide a common or ground signal path to the base layer 816 of the moving member 814. Vias 822 couple the respective traces 840 on the static member 814 to portions of the base layer 816 that are connected to the feet 842.

The moving member 814 is a one-piece member according to the embodiment illustrated in FIGS. 8-14 and includes a central member 832 for supporting a lens or auto focus system, and one or more spring arms 834 (two according to the illustrated embodiment) extending from the central member 832. The moving member 814 has two attachment structures 824, such as two moving crimps, on each of two diagonal corners 836 of the moving member 814 (according to the illustrated embodiment there are 4 moving crimps in all). Pedestals or feet 842 in the base layer 818 (on the ends of the spring arms 834 opposite the central member 832 according to the embodiment illustrated in FIGS. 8-14) are configured to be welded or otherwise attached to corresponding locations 844 on the static member 812. Traces 820 on the moving member 814 are configured to be electrically coupled to traces 840 on the static member 812 (e.g., through the feet 842) and couple signals with terminal pads 830, which according to an embodiment are auto focus (AF) terminal pads. According to the embodiment illustrated in FIGS. 8-14, the base layer 816 of the moving member 814 is used as a signal path to the ends of the SMA wires 846 attached to the attachment structures 824, for example moving crimps, on the moving member 814. Electrical connection between the corresponding terminal pad 830 and trace 840 on the static member 812 to the base layer 818 of the moving member 814 is provided by the connection between the feet 842 of the spring arms 820 and the base layer 818 of the static member 812 (according to embodiments, the SST layers of the two members 812, 814 are electrically coupled, and are at a common ground potential in embodiments).

Suspensions, according to various embodiments, having traces on the moving member flexure arms offer important advantages. They can for example, be efficiently fabricated and assembled. The traces are effective structures for coupling electrical signals to structures mounted to the plate or other portions of the moving member.

Figure 15A:
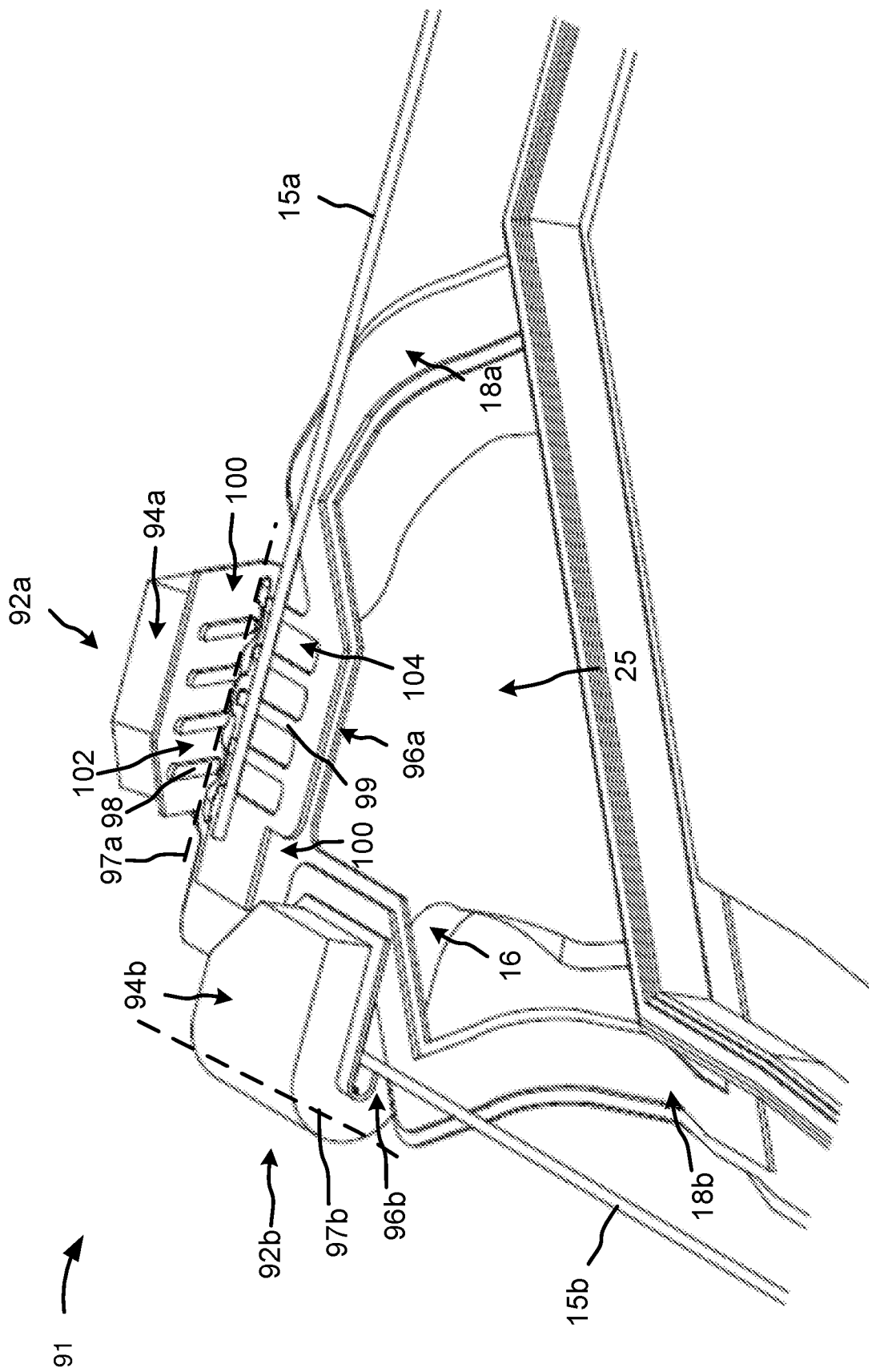
FIG. 15A is a top isometric view of an attachment structure that can be incorporated into the support member, according to an embodiment.
Figure 15B:
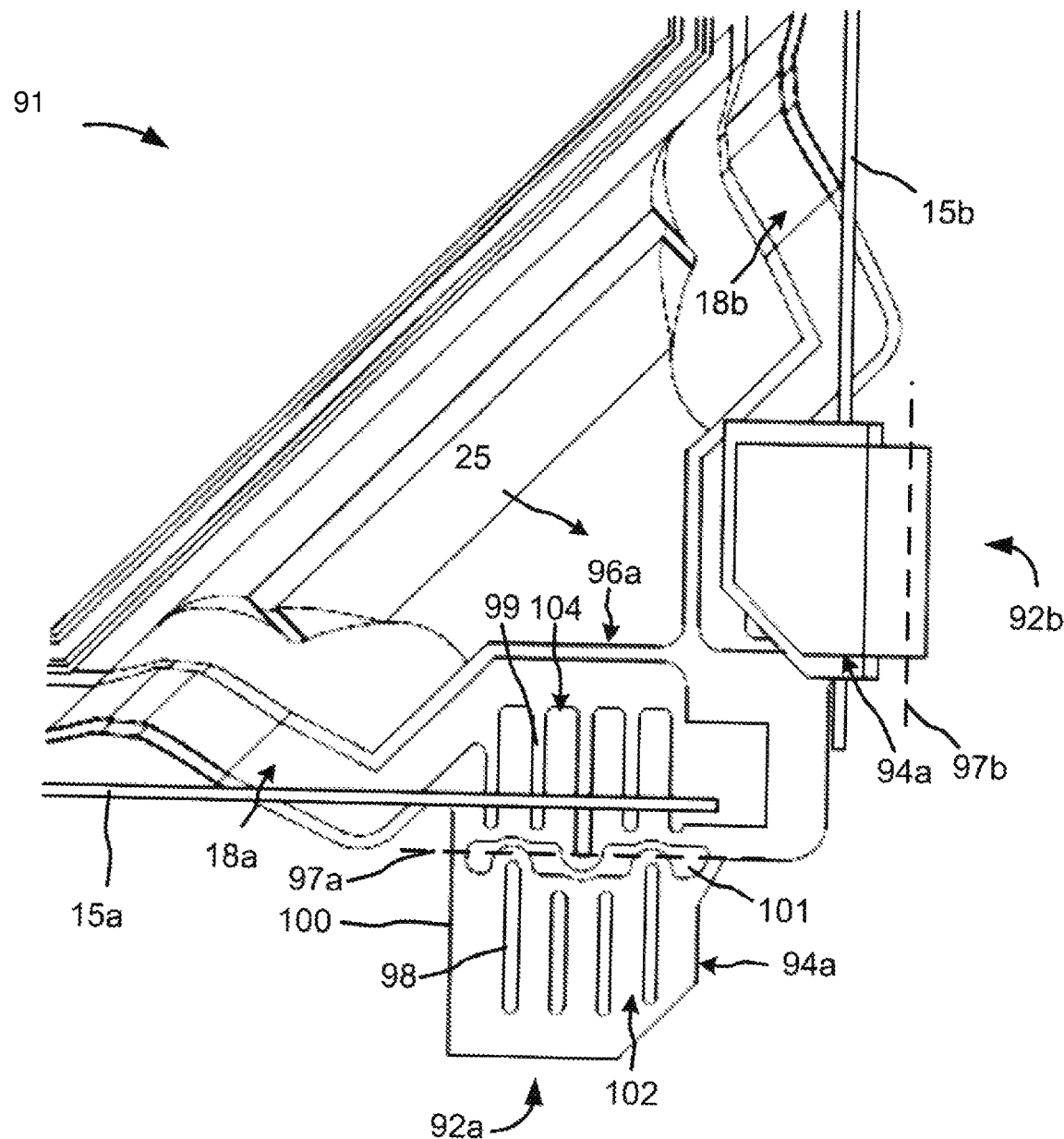
FIG. 15B is a top plan view of the attachment structure shown in FIG. 15A.

FIGS. 15A-15B illustrate an attachment structure 91, according to an embodiment. According to various embodiments, the attachment structure 91 is incorporated into one or more diagonal corners of the support member 12. For example, the attachment structure 91 may be incorporated into two diagonal corners of the support member 12. Furthermore, the attachment structure 91 is configured to crimp one or more SMA wires 15 such as SMA wires 15a and 15b using one or more crimps 92a, 92b.

As illustrated, the attachment structure 91 is unitary with the base layer 16 and includes two crimps 92a, 92b. The two crimps 92a, 92b are formed on a ledge 25 in the base layer 16 at a level spaced (e.g., in a z-direction) from the major planar surface portion 26 (shown in FIGS. 2A and 2B). As illustrated, each crimp 92a, 92b includes a first portion 94a, 94b and a second portion 96a, 96b. The first portions 94a, 94b are configured to be folded substantially along respective axes 97a, 97b to crimp the first portions 94a, 94b and second portions 96a, 96b together. Once crimped together, the first portions 94a, 94b and second portions 96a, 96b hold SMA wires 15a, 15b in place as illustrated by crimp 92b and SMA wire 15b. As illustrated above in FIGS. 1A and 1B, the other ends of the SMA wires 15 are coupled to the moving member 14.

As illustrated, the first portions 94a, 94b and second portions 96a, 96b are a unitary piece of material. However, according to some embodiments, the first portions 94a, 94b and second portions 96a, 96b may be non-unitary and coupled together using an adhesive, a weld, a solder joint and/or the like, as depicted in FIGS. 30A-30B below.

As illustrated by crimp 92a, the first portion 94a of crimp 92a includes a set of conductive traces 98 and the second portion 96a includes a set of conductive traces 99. According to various embodiments, the conductive traces 99 project from the conductive trace 18a. Crimp 92b may have a similar configuration. As described above, the conductive traces 18a and 18b may be coupled to a separate terminal pad 30a and 30b, respectively. Furthermore, one or more layers of dielectric 100 are located between the conductive traces 98, 99 and the base layer 16 to electrically insulate the traces 98, 99 from the base layer 16. According to various embodiments, the dielectric 100 located between the conductive traces 98, 99 may be a single piece of dielectric; or, alternatively, the dielectric 100 located between the conductive traces 98, 99 may have a break along the axes 97a, 97b, respectively, (as shown in FIG. 15B for crimp 92a) to aid in folding the first portions 94a, 94b along the axes 97a, 97b. Furthermore, in embodiments, the length of the traces 98, 99 may be staggered, as shown in FIG. 15B. Staggering the lengths of the traces 98, 99 may reduce the likelihood that the SMA wire 15 contacts the bend between the first and second portions 98, 99 which may short the SMA wire 15 to the base layer 16. According to various embodiments, the traces 98, 99 may be formed from copper, copper alloys or other conductors. According to various embodiments, an insulating covercoat can be applied over all or portions of traces 98, 99. Corrosion resistant metals such as gold (Au) and/or nickel (Ni) can be plated or otherwise applied to portions of the traces 98, 99 to provide corrosion resistance. Polyimide or other insulating materials may be used as the dielectric 100.

Since the layer of dielectric 100 isolates the traces 98, 99 from the base layer 16 and since the conductive traces 18a and 18b may be coupled to separate terminal pads 30a and 30b, respectively, each SMA wires 15a and 15b may be actuated independently in order to move and control the moving member 14. Due to this configuration, the base layer 16 may be one piece. In contrast, conventional embodiments may require a base layer that is split into four pieces so that each SMA wire 15 can be actuated independently of one another. Since the base layer 16 may be made of one piece for some embodiments, the base layer 16 may have more structural integrity and rigidity than a base layer that not made of one piece.

As illustrated, the traces 98 include spaces 102 therebetween and the traces 99 also include spaces 104 therebetween. According to various embodiments, one or more of the spaces 102 align with one or more of the traces 99 and one or more the spaces 104 align with one or more of the traces 98. According to various embodiments, the traces 98, 99 may include elongate features, for example, fingers, slices, members and/or the like. The traces 98 and traces 99 are offset with respect to each other, for example, in an interwoven, interleaved, staggered and/or the like relationship so that the traces 98 are located in the spaces 104 and the traces 99 are located in the spaces 102 when the first and second portions 94a, 96a are crimped together. Crimp 92b may include a similar configuration of traces and spaces as crimp 92a. As stated above, in embodiments, the conductive traces 99 may project from the conductive trace 18a, as illustrated in FIG. 15A. As such, when the first portions 94a, 94b are crimped together with the second portions 96a, 96b, the SMA wires 15 are bent around the conductive traces 98, 99, as shown in FIG. 16.

Figure 16:
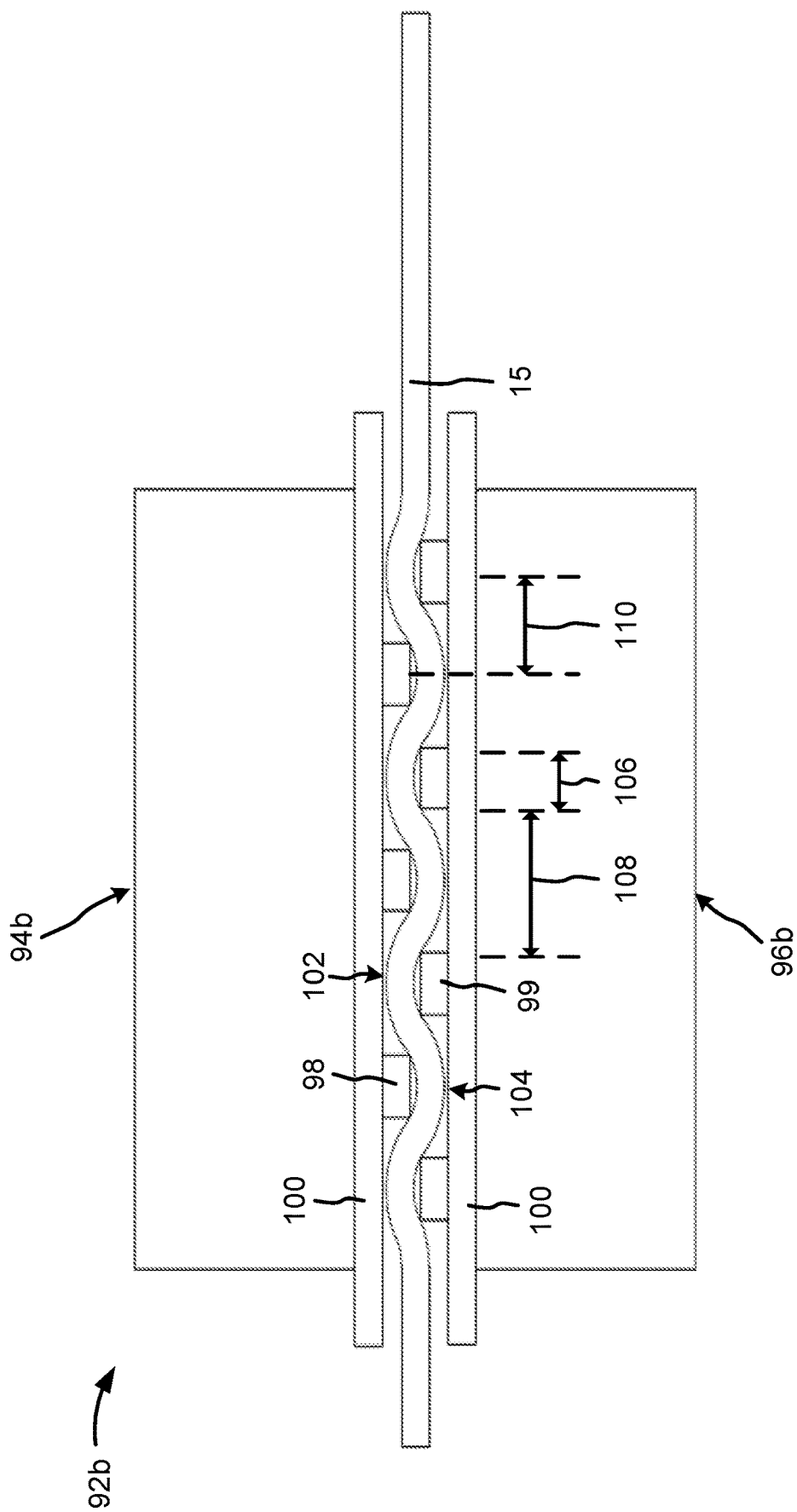
FIG. 16 illustrates a cross-sectional view of a crimp that can be incorporated into the attachment structure shown in FIGS. 15A-15B.

FIG. 16 illustrates a cross-sectional view of crimp 92b. According to various embodiments, crimp 92a may have a similar configuration when the first and second portions 94a, 96a of crimp 92a are crimped together. As shown, the conductive traces 98, 99 provide a force perpendicular to the longitudinal axis of the SMA wire 15 when the first portion 94b and second portion 96b are crimped together. As such, the SMA wire 15 is deformed into the spaces 102, 104 by the traces 98, 99. Due to this configuration, the SMA wire 15 may be held more securely in place by the crimp 92b than if the SMA wire 15 was held in place by two flat pieces of material.

According to various embodiments, the width 106 of the conductive traces 98, 99, the width 108 of the spaces 102, 104 and the distance 110 between a conductive trace 98 and a conductive trace 99 may vary, depending on the flexibility of the SMA wire 15. For example, if a first SMA wire 15 is stiffer than a second SMA wire 15 and the first SMA wire 15 is being used, then the width 108 of the spaces 104 and the distance 110 between the conductive traces 98, 99 may be greater than if the second SMA wire 15 was being used. As another example, if the first SMA wire 15 is being used then the width 106 of the traces 98 may be smaller than if the second SMA wire 15 is being used, in order to provide a more localized perpendicular force on the SMA wire 15.

According to various embodiments, after the one or more SMA wires 15 are crimped between a crimp 92a, 92b, the SMA wire 15 may need to be cut from a spool of SMA wire 15. Additionally or alternatively, excess SMA wire 15 that may extend beyond an edge of a crimp 92a, 92b may need to be removed. According to various embodiments, the SMA wire 15 may be sheared using a tool that presses the wire in the base layer 16 and/or the dielectric 100 that separates the traces 18 from the base layer 16. In some cases, however, this may cause the SMA wire 15 to contact, and short to, the base layer 16. As such, according to various embodiments, a pad may be placed on top of the dielectric 100 and under the SMA wire 15.

Figure 17:
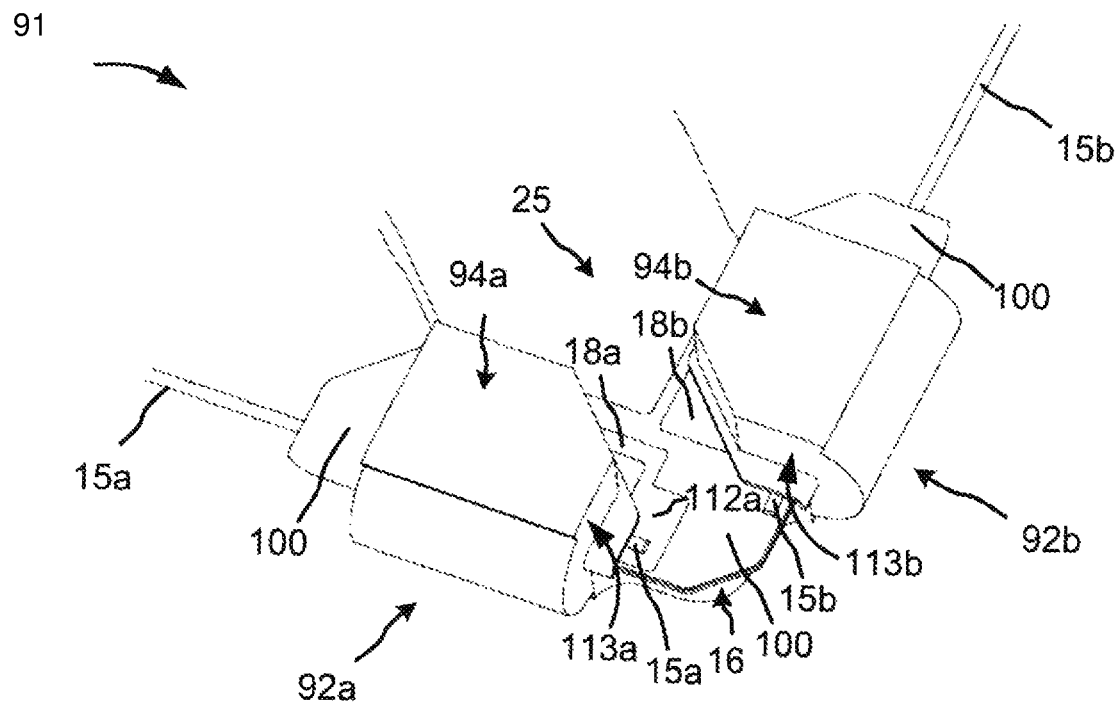
FIG. 17 illustrates a top isometric view of an attachment member including an illustrative cutting pad.
Figure 18:
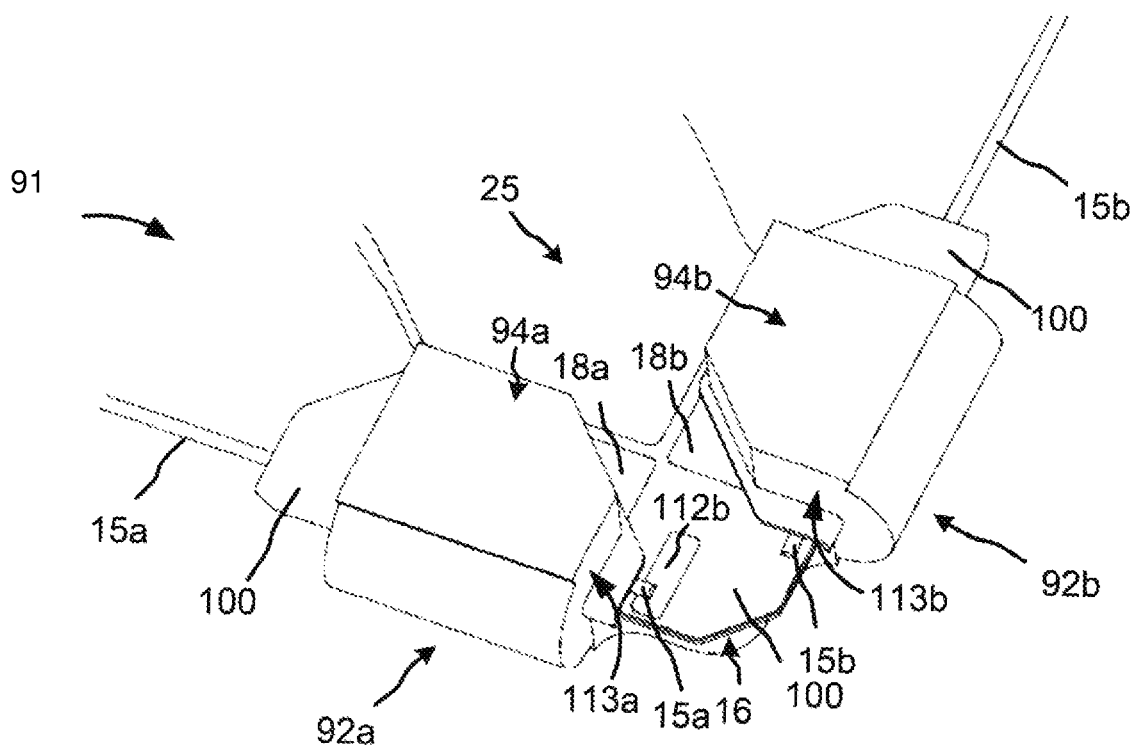
FIG. 18 illustrates a top isometric view of an attachment member including another illustrative cutting pad.

FIGS. 17 and 18 illustrate an attachment structure 91 including illustrative cutting pads 112a, 112b, respectively, according to an embodiment. As stated above, the cutting pads 112a, 112b may be used to cut the SMA wire 15 from a spool and/or cut any excess SMA wire 15 that is not needed. This may reduce the likelihood that the SMA wire 15 is shorted to the base layer 16. According to various embodiments, the pads 112a, 112b may be located on the ledge 25 in a position proximal to edges 113a, 113b of the crimps 92a, 92b, respectively. The pads 112a, 112b may be positioned outside of the crimps 92a, 92b so that the pads 112a, 112b are exposed when the crimps 92a, 92b are crimped and/or the pads 112a, 112b may include a portion that extends beyond the edges 113a, 113b of the crimps 92a, 92b so that the pads 112a, 112b are exposed when the crimps 92a, 92b are crimped.

According to various embodiments, the pads 112a, 112b may be made of a metal. For example, the pads 112a, 112b may be made of the same material as the traces 18, such as copper, copper alloys or other conductors. As such, the pad 112a may be coupled to the traces 18, as shown in FIG. 17. Alternatively, the pad 112b may be decoupled from the traces 18, as shown in FIG. 18. According to other embodiments, the pads 112a, 112b may be made of a non-metal material and/or include a cover coat over the pad 112a, 112b.

Figure 19:
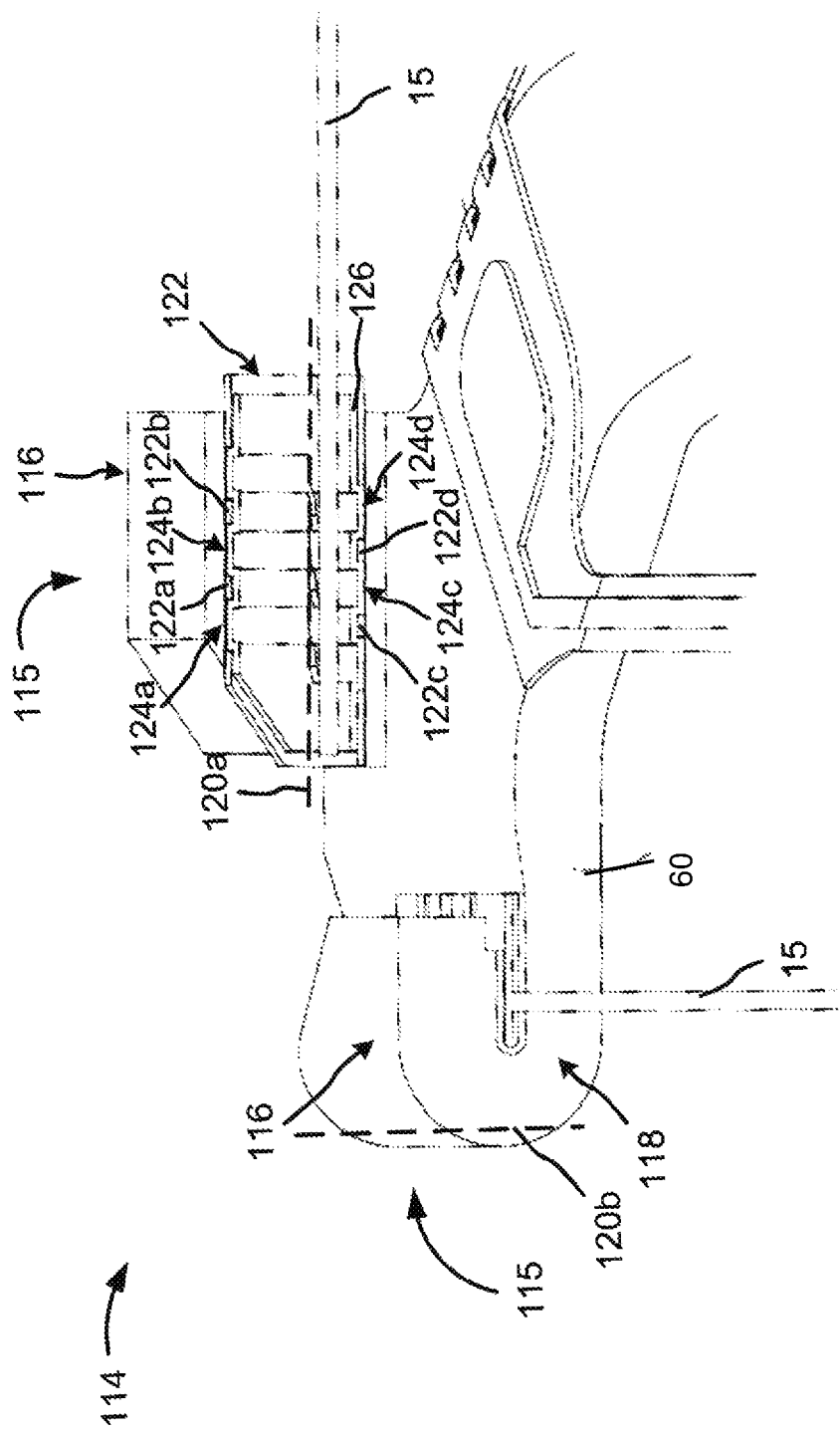
FIG. 19 illustrates an attachment structure that can be incorporated into the moving member.

FIG. 19 illustrates an attachment structure 114 that can be incorporated into the moving member 14, according to an embodiment. As illustrated, the attachment structure 114 includes two crimps 115. The two crimp 115 are unitary with the plate 60 and each crimp 115 includes a first portion 116 and a second portion 118. The first portions 116 are configured to be folded substantially along a respective axis 120a, 120b, in order to crimp the first portions 116 and the second portions 118 together. When the first and second portions 116, 118 are crimped together, they hold an SMA wire 15 in place. As illustrated above in FIGS. 1A and 1B, the other ends of the SMA wire 15 is coupled to the support member 12.

The first and second portions 116, 118 include elongate features 122a-122d disposed on the plate 60. Furthermore, the elongate features 122a-122d include spaces 124a-124d therebetween. According to various embodiments, one or more of the spaces 124a-124d align with one or more of the elongate features 122a-122d. According to various embodiments, the elongate features 122a-122d may be, for example, fingers, slices, members and/or the like. The elongate features 122a, 122b and elongate features 122c, 122d are offset with respect to each other, for example, in an interwoven, interleaved, staggered and/or the like relationship so that the elongate features 122a, 122b are located in the spaces 124c, 124d and the elongate features 122c, 122d are located in the spaces 124a, 124b when the first and second portions 116, 118 are crimped together. As such, when the first portion 116 is crimped together with the second portions 118, the elongate features 122a-122d provide a force perpendicular to the longitudinal axis of the SMA wire 15. As such, the SMA wire 15 is deformed into the spaces 124a-124d by the elongate features 122a-122d. Due to this configuration, the SMA wire 15 may be held more securely in place by the crimp 115 than if the SMA wire 15 was held in place by two flat pieces of material.

According to various embodiments, the elongate features 122a-122d may be made of a conductive material or a dielectric. For example, the elongate features 122a-122d may be formed from copper, copper alloys or other conductors, or a polyimide or other insulating materials.

According to various embodiments, a conductive layer 126 may be disposed on the elongate features 122. However, since portions of the elongate features 122 include spaces 124a-124, the SMA wire 15 may be electrically coupled to the plate 60 via the conductive layer 126 when the elongate features 122a-122d are made of a dielectric. Similar to the width 108 of the spaces 104 and the distance 110 between the conductive traces 98, 99 discussed above, the width of the elongate features 122a-122d and the wide of the spaces 124a-124d may be varied, depending on the flexibility of the SMA wire 15. According to various embodiments, the conductive layer 126 may be formed from copper, copper alloys or other conductors. According to various embodiments, an insulating covercoat can be applied over all or portions of the conductive layer 126. Corrosion resistant metals such as gold (Au) and/or nickel (Ni) can be plated or otherwise applied to portions of the conductive layer 126 to provide corrosion resistance. Polyimide or other insulating materials may be used as the elongate features 122.

Figure 20A:
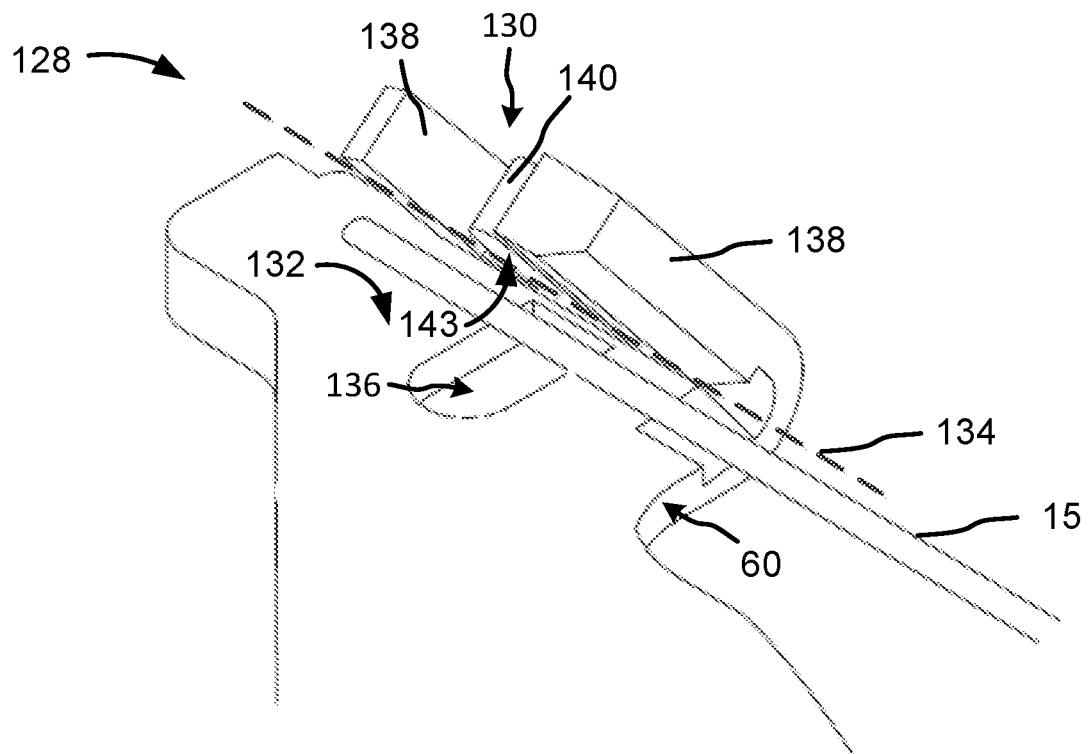
FIGS. 20A-20C illustrate an embodiment of a crimp that can be incorporated into attachment structure disclose herein.
Figure 20B:
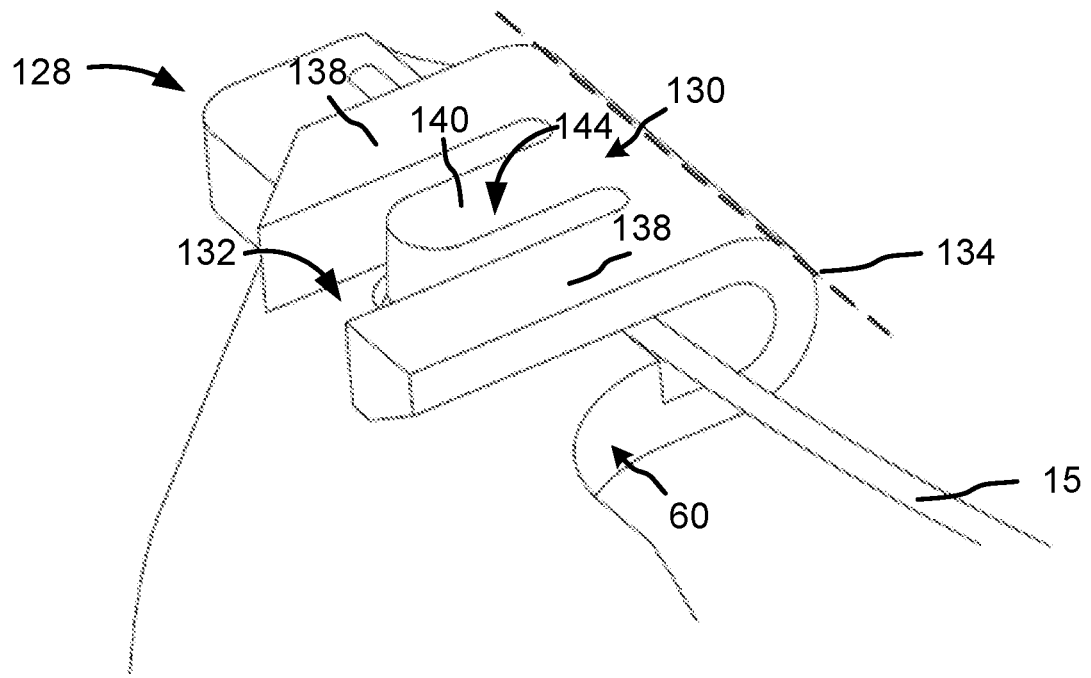
Figure 20C:
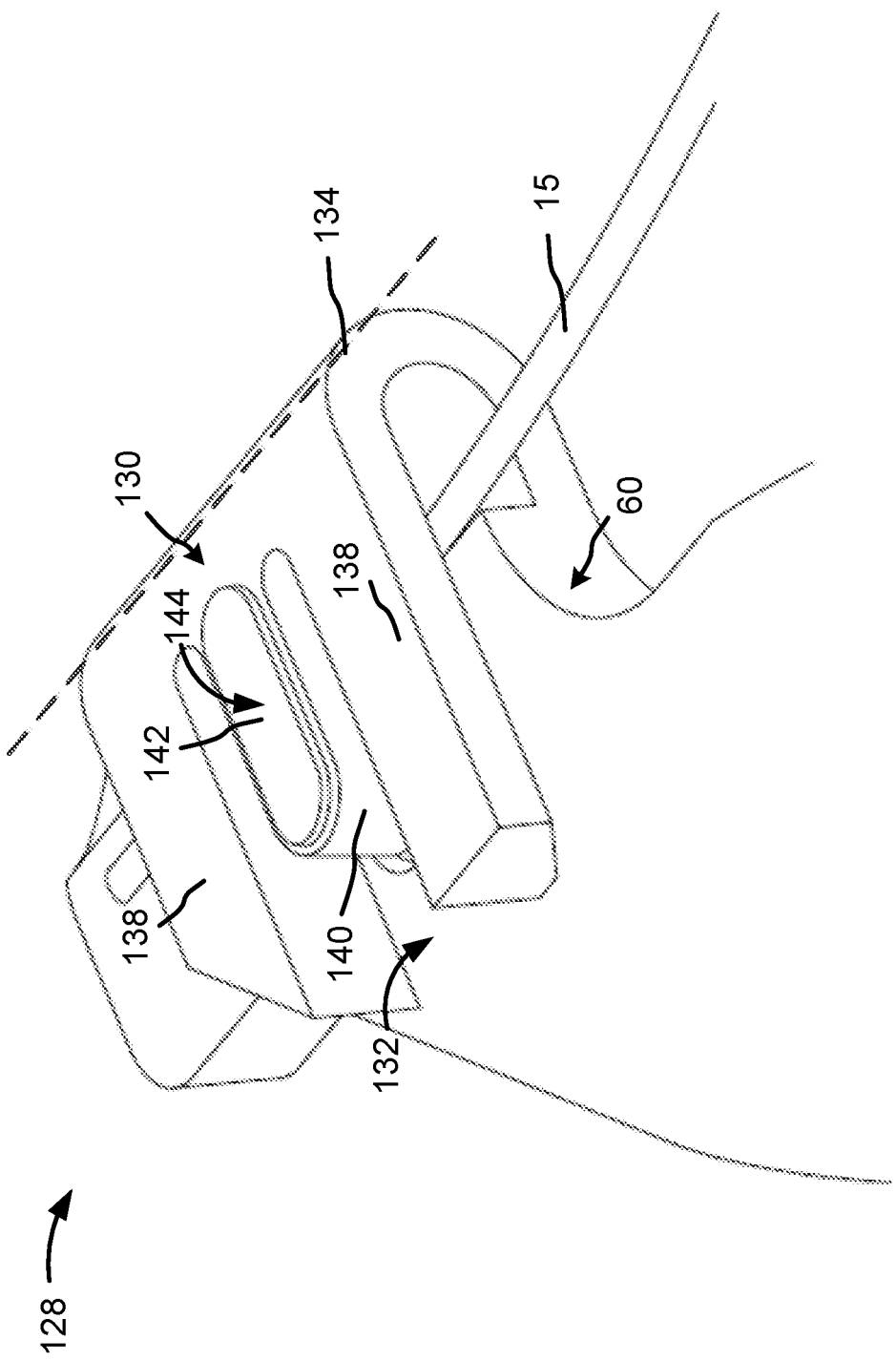
Figure 21:
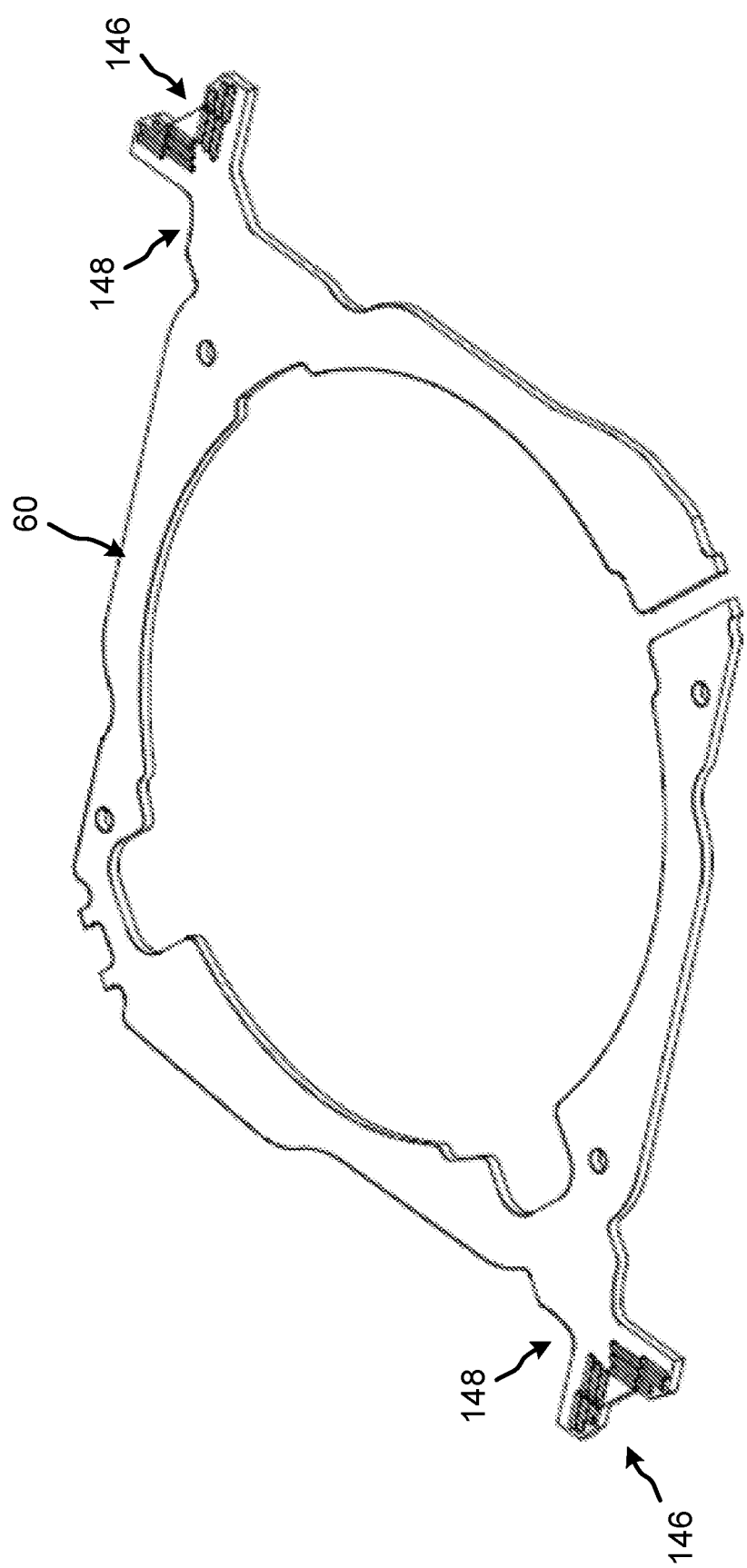
FIG. 21 depicts a base layer of a moving member, in accordance with the embodiments of the disclosure.

FIGS. 20A-20C illustrate another embodiment of a crimp 128 that can be incorporated into one or more of the attachment structures discussed herein. According to various embodiments, multiple crimps 128 may be incorporated into each of one or more diagonal corners of the moving member 14. For example, four crimps 128, two crimps 128 for each diagonal corner, may be incorporated into two diagonal corners of the moving member 14, as shown in FIG. 21.

As illustrated, the crimp 128 is unitary with the plate 60 and includes a first portion 130 and a second portion 132. The first portion 130 is configured to be folded substantially along an axis 134 in order to crimp the first and second portions 130, 132 together. When the first and second portions 130, 132 are crimped together, they hold an SMA wire 15 in place as illustrated in FIGS. 20B and 20C. As illustrated above in FIGS. 1A and 1B, the other ends of the SMA wire 15 is coupled to the support member 12.

In the embodiment, the crimp 128 includes a recess 136. The recess 136 may be etched out of the second portion 132 of the plate 60, as illustrated in FIG. 20A. Furthermore, the first portion 130 may include a plurality of elongate members 138, 140 which include spaces therebetween. While three elongate members 138, 140 are illustrated, alternative embodiments may include more or fewer elongate members 138, 140. When the first and second portions 130, 132 are crimped together, at least one of the elongate members, for example, elongate member 140, extends into the recess 136. While only one elongate member 140 is shown extending into a recess 136, in other embodiments, other elongate members may extend into respective recesses or into the same recess. Furthermore, when the first and second portions 130, 132 are crimped together, the elongate members 138 may contact the top of the second portion 132, as shown in FIGS. 20B and 20C. According to various embodiments, the edges of the recess 136 and the edges of the elongate members 138, 140 may be rounded so that the SMA wire 15 is less likely to be damaged when the SMA wire 15 is forced into the recess 136 by the elongate member 140.

Since the elongate member 140 extends into the recess 136, the elongate member 140 provides a force perpendicular to the longitudinal axis of the SMA wire 15 when the first and second portions 130, 132 are crimped together. As such, the SMA wire 15 is deformed into the recess 136 by the elongate member 140. Due to this configuration, the SMA wire 15 may be held more securely in place by the crimp 128 than if the SMA wire 15 was held in place by two flat pieces of material.

According to various embodiments, the elongate member 140 may include an additional layer of material 142 on the bottom side 143 and/or the top side 144 (shown in FIG. 20C) of the elongate member 140 so that the elongate member 140 extends into the recess 136 and/or the elongate member 140 extends further into the recess 136 than the elongate member 140 otherwise would. Accordingly, a flat crimping tool may be used to crimp the first and second portions 130, 132 together.

FIG. 21 depicts a base layer 60 of a moving member 14, accordance to various embodiments. As illustrated, the base layer 60 may be substantially planar and include attachment structures 146. According to various embodiments, two diagonal corners 148 of the plate 60 may include two attachment structures 146. Each attachment structure 146 may include crimps, for example, the crimps 115, 128, depicted in FIGS. 19 and 20A-20C, respectively. Additionally or alternatively, attachment structures 146 of the plate 60 may include one or more recesses, for example, an array of plural recesses, one or more etch patterns and/or an array of partial etch patterns. The one or more recesses included in the attachment structures 146 may hold the SMA wire 15 more securely than if the SMA wire 15 was held in place by two flat pieces of material. One or more of the etching methods described above in relation to FIGS. 8-14 may be used to create the etch patterns. According to various embodiments, a dielectric and conductive layer may be disposed over the etch patterns. After the etch patterns are made, the corners of the partial etch patterns may be rounded to reduce the likelihood of damaging an SMA wire 15.

FIGS. 22A-24B depict embodiments of partial etch patterns that may be etched into the attachment structures 146. In each of the embodiments shown in FIGS. 22A-24B, an SMA wire 15 secured to the attachment structures 146 may be deformed by the partial etch patterns. As such, an SMA wire 15 may be held more securely in place by the attachment structure 146 than if the SMA wire 15 was held in place by two flat pieces of material.

Figure 22A:
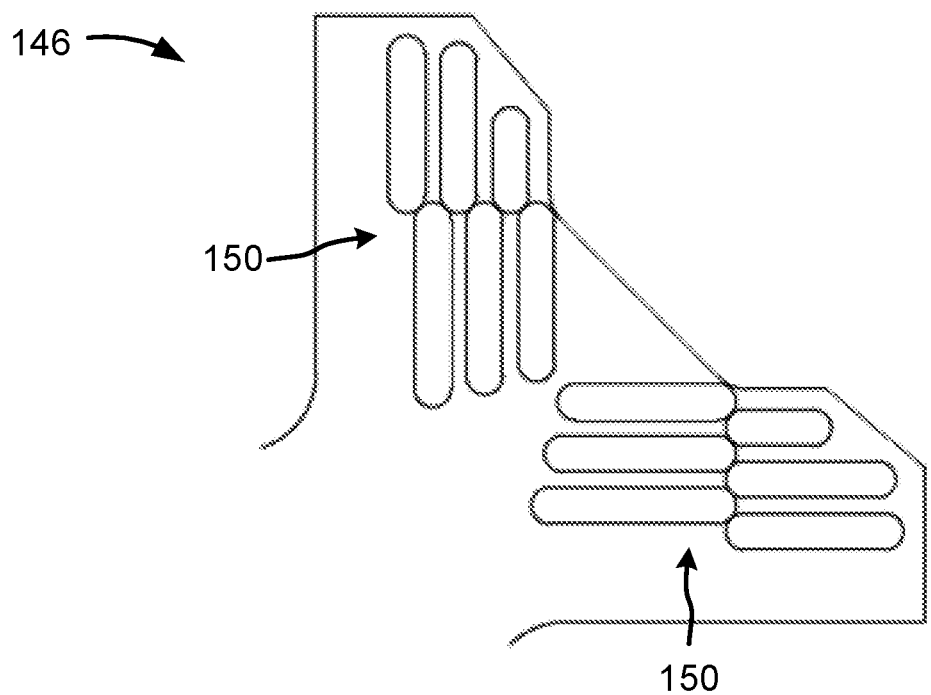
FIGS. 22A-24B illustrate embodiments of partial etch patterns that can be etched into the attachment structures disclosed herein.
Figure 22B:
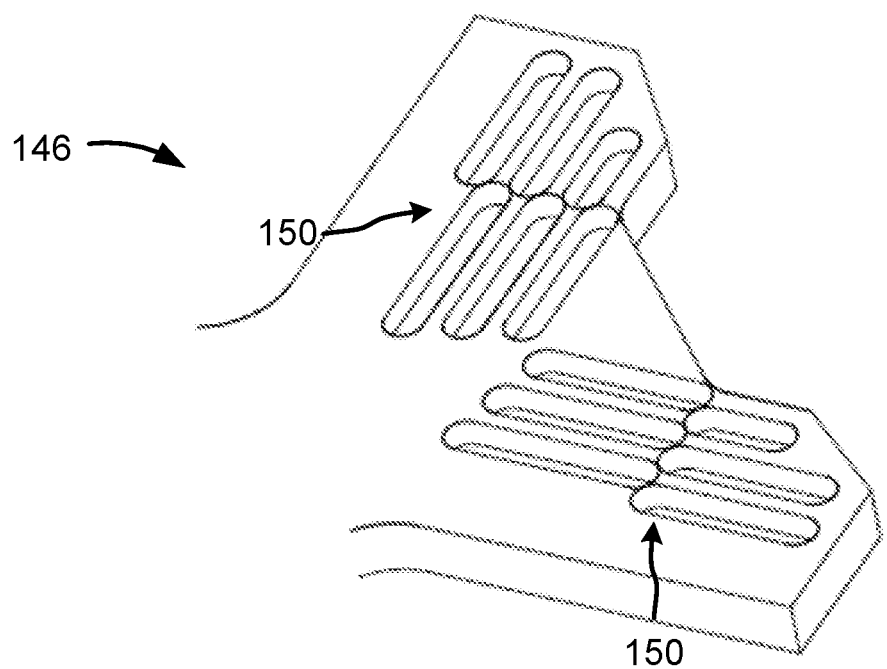
Figure 23A:
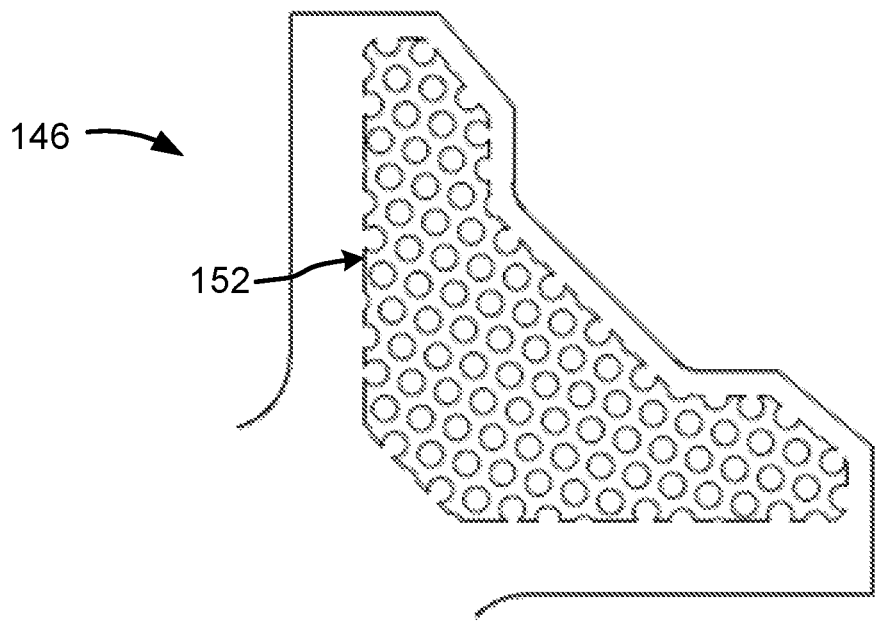
Figure 23B:
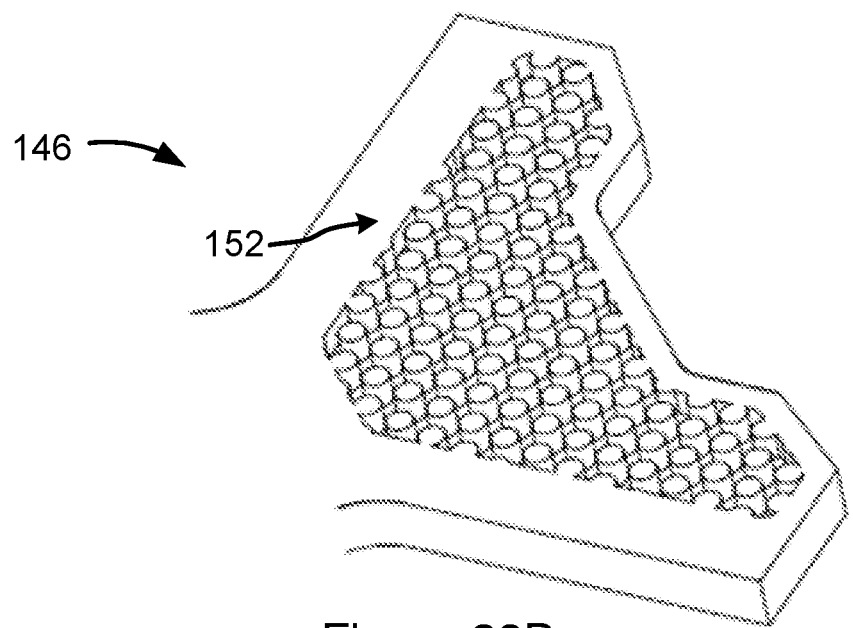
Figure 24A:
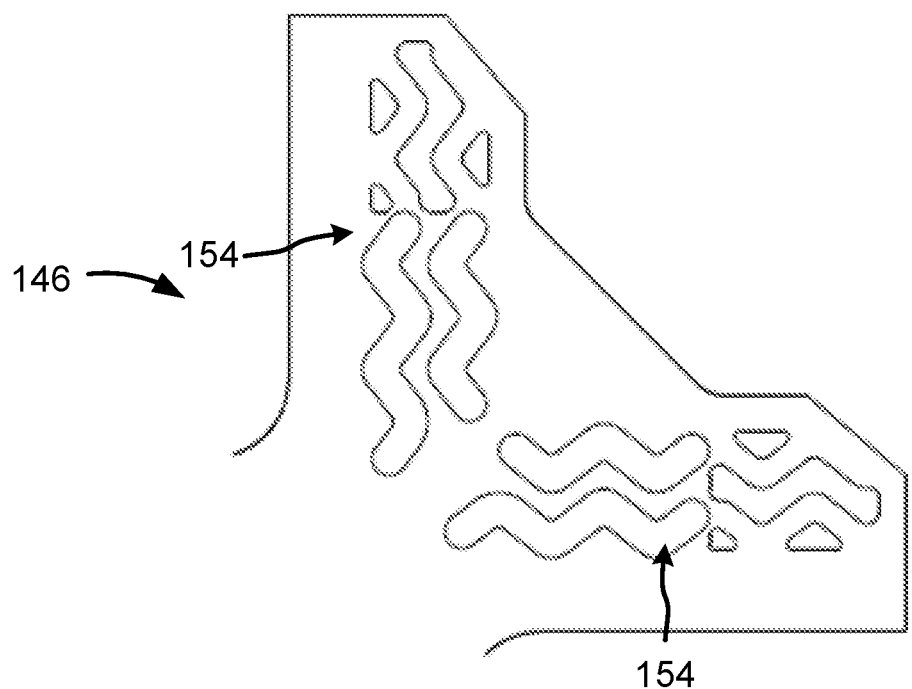
Figure 24B:
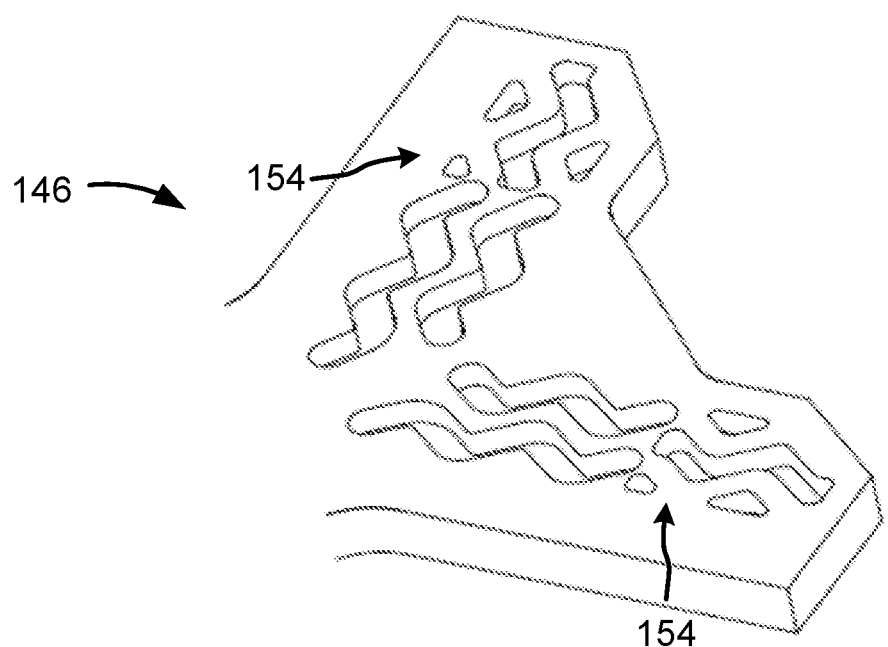

As an example, the partial etch patterns 150 may be staggered linear recesses, as depicted in FIGS. 22A-22B. According to various embodiments, the partial etch patterns 150 may be offset with respect to each other, for example, in an interwoven, interleaved, staggered and/or the like when the crimps included in the attachment structure 146 is crimped. As another example, the partial etch patterns 152 may be an array of recesses, as depicted in FIGS. 23A-23B. As even another example, the partial etch patterns 154 may be parallel zig-zags, as depicted in FIGS. 24A-24B.

Figure 25B:
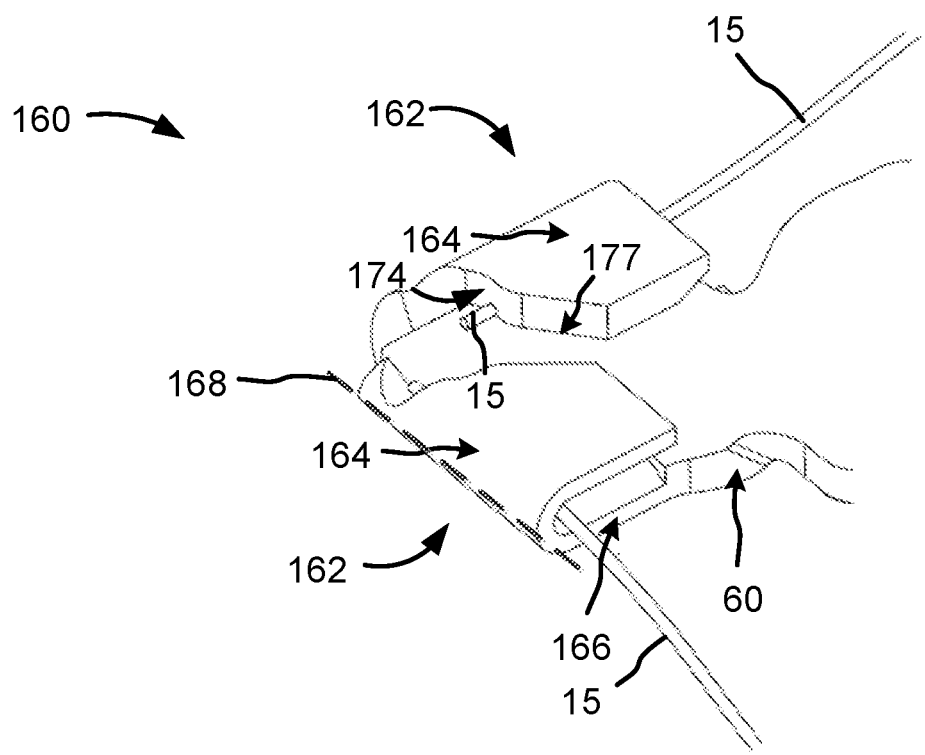
Figure 25C:
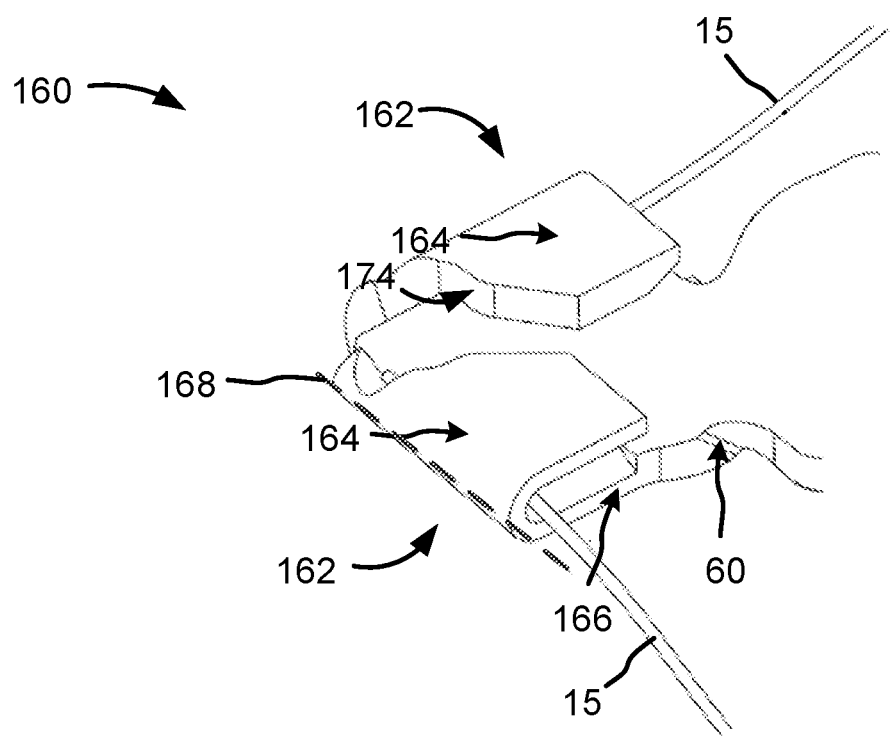

FIGS. 25A-25C illustrate another attachment structure 160 that can be incorporated into the moving member 14, according to an embodiment. According to various embodiments, the features of the attachment structure 160 discussed below may be incorporated in other attachment structures discussed herein. As illustrated, the attachment structure 160 includes two crimps 162. The crimps 162 are unitary with the plate 60 and include first portions 164 and second portions 166. The first portions 164 are configured to be folded substantially along an axis 168 in order to crimp the first and second portions 164, 166 together. When the first and second portions 164, 166 are crimped together, they are capable of holding an SMA wire 15 in place. As illustrated above in FIGS. 1A and 1B, the other ends of the SMA wire 15 is coupled to the support member 12.

As illustrated, the first portions 164 include a recess 170 and the second portions 166 include an elongate member 172. When the first and second portions 164, 166 are crimped together, the elongate member 172 extends into the recess 170. The SMA wire 15 is deformed into the recess 170 by the elongate member 172 when the first and second portions 164, 166 are crimped together. Due to this configuration, the SMA wire 15 may be held more securely by the crimps 162 than if the SMA wire 15 was held in place by two flat pieces of material. According to various embodiments, the edge 176 may include a portion 177 that extends beyond the edge 174, so that when the first and second portions 164, 166 are crimped together, the first portion 164 fits to the second portion 166, as shown in FIGS. 25B, 25C.

In addition, the first portion 164 includes an edge 174 and the second portion 166 includes an edge 176 that is offset from the edge 174. When the first and second portions 164, 166 are crimped together, the edges 174, 176 are configured to create a cutting edge capable of severing the SMA wire 15. FIG. 25B depicts the attachment structure 160 with both crimps 162 closed and FIG. 25C depicts the attachment structure 160 after the edges 174, 176 sever the end portion of the SMA wire 15.

Figure 26A:
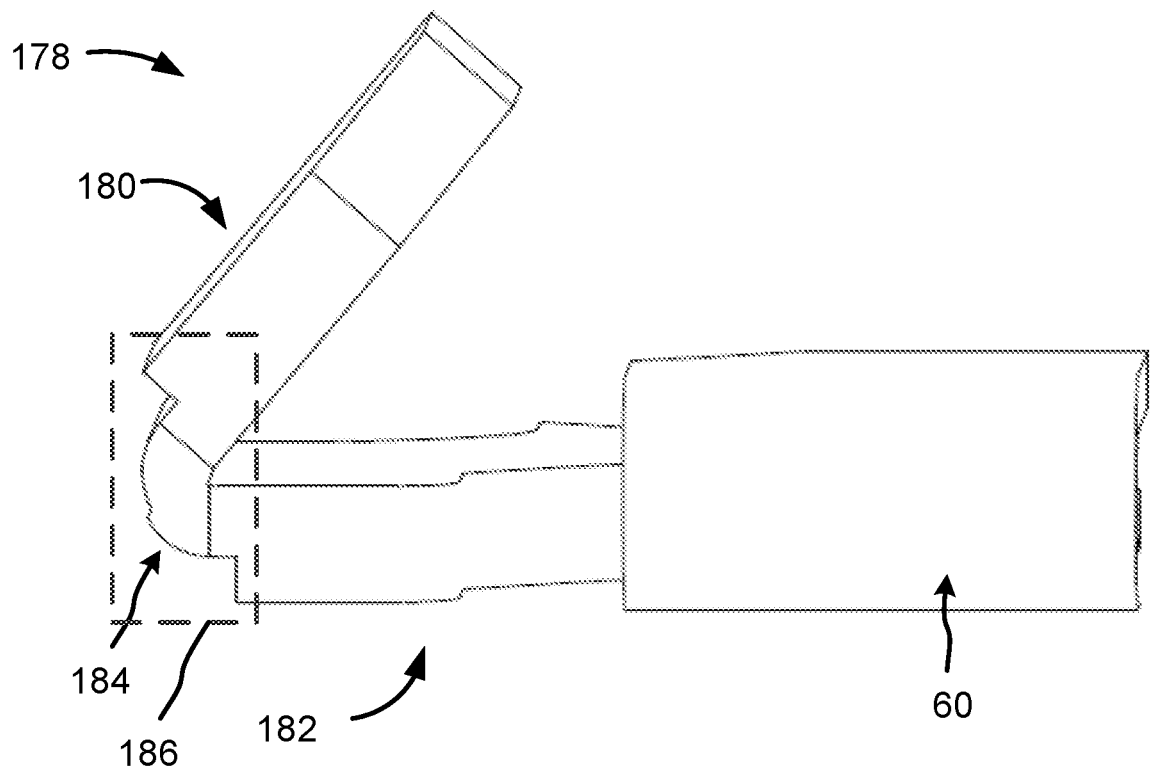
FIGS. 26A-26B illustrate another embodiment of a crimp that can be incorporated into the attachment structures disclosed herein.
Figure 26B:
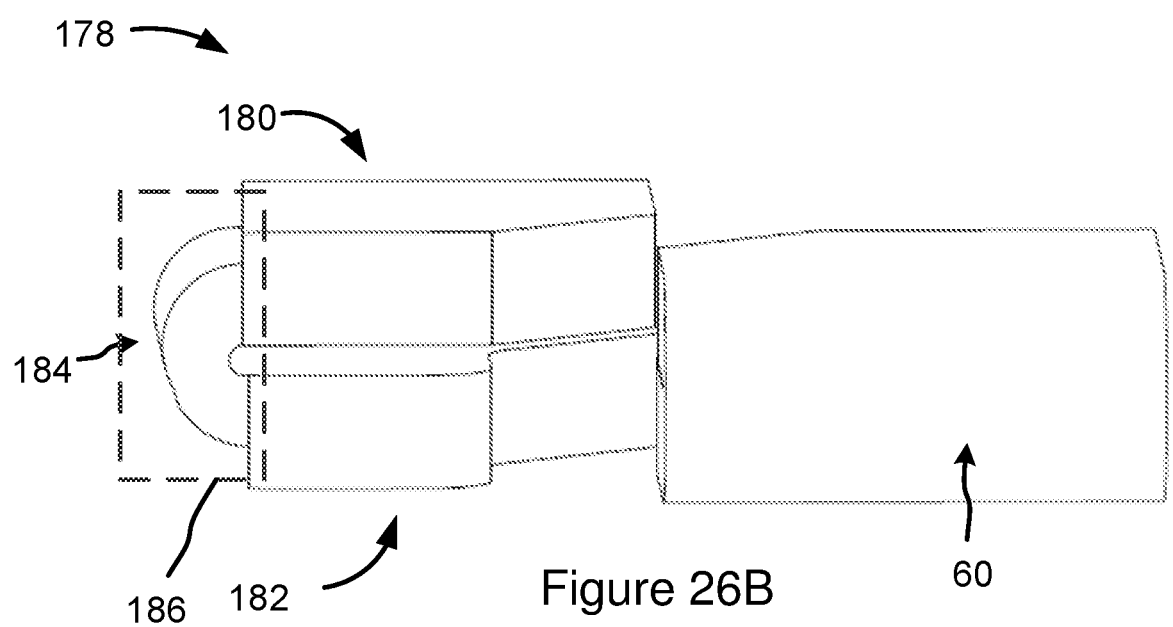

FIGS. 26A-26B illustrate another embodiment of a crimp 178, in accordance with the embodiments of the present disclosure. Similar to the crimps depicted above, the crimp 178 can be incorporated into the moving member 14 and/or the attachment structures depicted above. The crimp 178 is unitary with the plate 60 and includes first and second portions 180, 182 that are configured to be folded together. When the first and second portions 180, 182 are folded together, as illustrated in FIG. 26B, they are capable of crimping an SMA wire 15 in place.

As illustrated, the crimp 178 includes an etched recess 184. The recess 184 is located substantially where the crimp 178 bends 186 when the first and second portions 180, 182 are crimped together. Furthermore, the recess 184 is located on the exterior portion of the bend 186. The recess 184 may lower the stress on the bend 186, which can reduce the likelihood that the plate 60 will crack when the first and second portions 180, 182 are crimped together. According to various embodiments, this may be advantageous when the plate 60 is made of a thicker metal and/or when the plate 60 is made of a less ductile and/or less malleable metal. According to various embodiments, the recess 184 may be formed by etching, such as the etching methods described above in relation to FIGS. 8-14.

According to various embodiments, a similar etched recess as the etched recess 184 may be included in support member 12. That is, for example, an etched recess may located substantially where the crimps 92a, 92b bends when the first portions 94a, 94b and second portions 96a, 96b are crimped together.

Figure 27A:
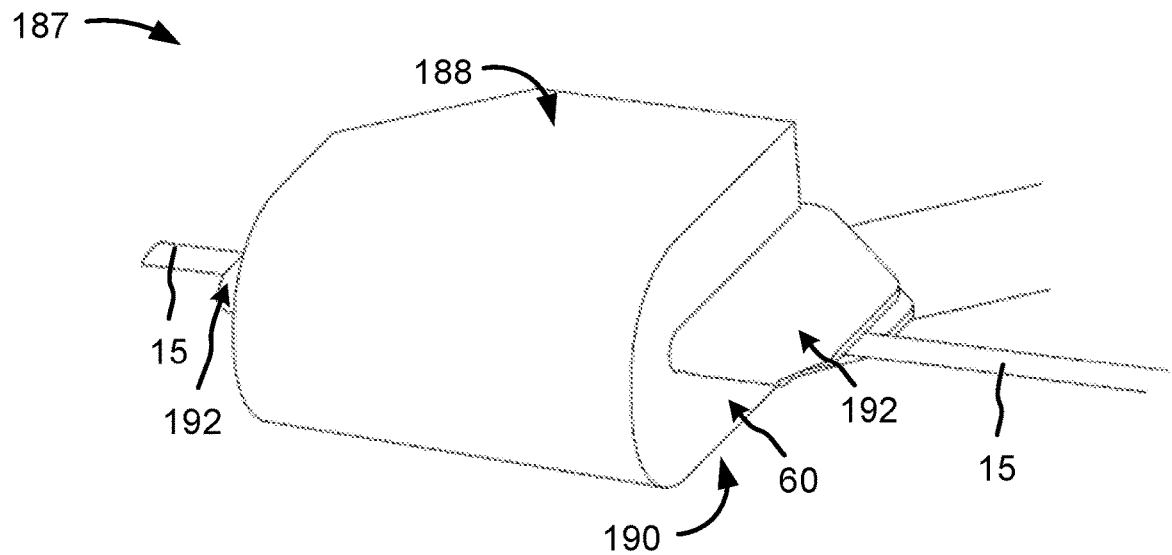
Figure 27B:
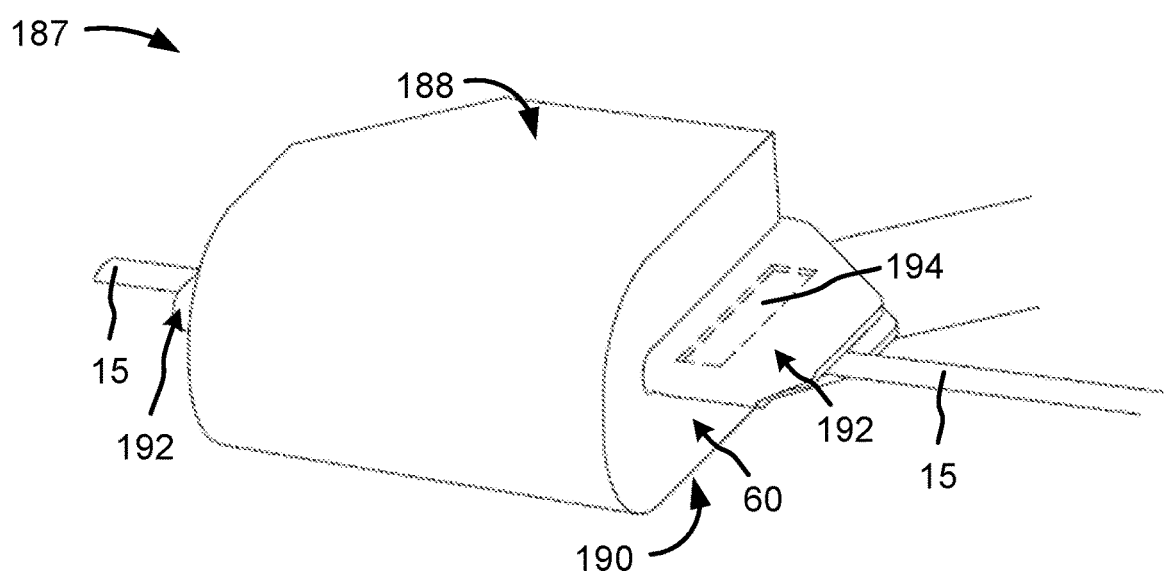

FIGS. 27A-27C illustrate another embodiment of a crimp 187, accordance to an embodiment. Similar to the crimps described herein, the crimp 187 can be incorporated into the support member 12, the moving member 14 and/or the attachment structures depicted herein in relation to the support and moving members 12, 14, respectively. According to the embodiment illustrated in FIGS. 27A-27C, the crimp 187 is unitary with the plate 60 and includes first and second portions 188, 190 that are configured to be folded together.

When the first and second portions 164, 166 are folded together, as illustrated, they are capable of crimping an SMA wire 15 in place.

The crimp 187 includes a strain relief member 192 that extends from at least one side of the crimp 187 and supports and/or provides a crimping force on the SMA wire 15. As illustrated, the strain relief member 192 extends from both sides of the crimp 187; however, according to other embodiments, the strain relief member 192 only extends from one side of the crimp 187.

In conventional embodiments, when the suspension assembly 10 is under stress, the SMA wire 15 may be damaged and/or broken proximal to where the SMA wire exits the side of a crimp since where the SMA exits the side of a crimp is an inherent high stress area. The strain relief member 192 decreases the stress on the SMA wire 15 because the strain relief member 192 may bend with the SMA wire 15, thereby increasing the bend radius of the SMA wire 15 when the suspension assembly 10 is under stress. That is, instead of a section of the SMA wire 15 that has, for example, a width x that may bend at an angle θ, the strain relief member 192 may increase the width of the section that bends at the angle θ to, for example, 2*x, 3*x, 4*x, etc. This distributes the stress on the SMA wire 15 over a greater portion of the SMA wire 15. According to various embodiments, the distance that the strain relief member 192 protrudes from the side of the crimp 187 may vary, depending on, for example, the type, the stiffness and/or the thickness of material used for the SMA wire 15.

According to various embodiments, the strain relief member 192 may be made of metal. For example, the strain relief member 192 may be made of the same material as the traces 18, such as copper, copper alloys or other conductors. As such, the strain relief member 192 may be coupled to the traces 18. According to various embodiments, an insulating covercoat can be applied over all or portions of the strain relief layer 192. Corrosion resistant metals such as gold (Au) and/or nickel (Ni) can be plated or otherwise applied to portions of the strain relief layer 192 to provide corrosion resistance. Additionally or alternatively, the strain relief member 192 may be made of a dielectric. For example, the strain relief member 192 may be made of the same material as the dielectric as described herein. Examples of dielectrics may include a polyimide or other insulating materials. Additionally or alternatively, the strain relief member 192 may include a metal pad 194, as illustrated in FIGS. 27B and 27C, on the interior of the strain relief. According to various embodiments, the metal pad 194 may help grip the SMA wire 15 and reduce the likelihood that the SMA wire 15 slips out of the strain relief member 192.

Figure 28A:
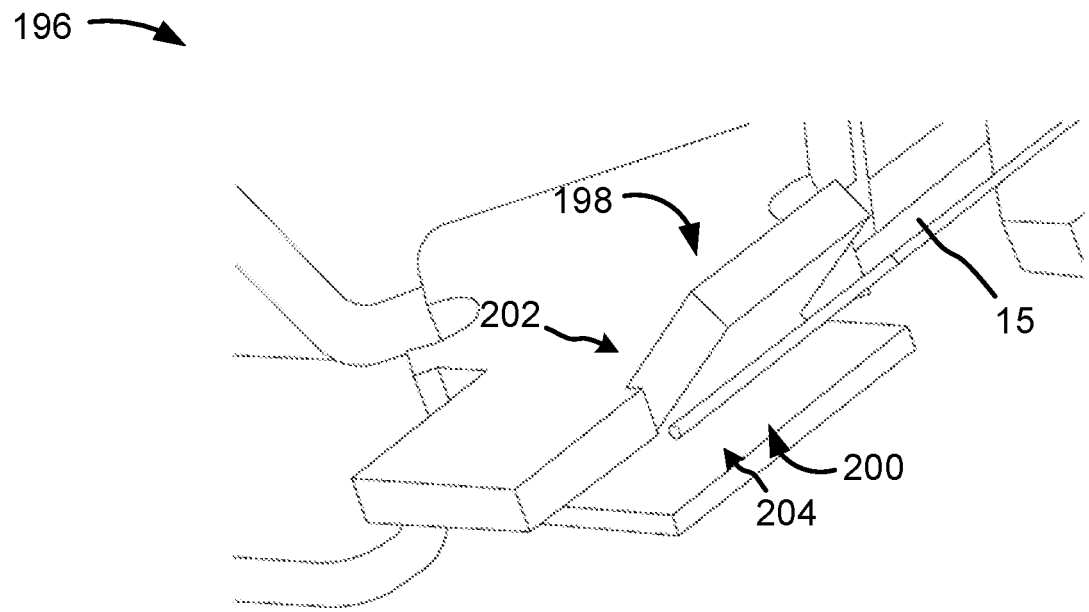
FIGS. 28A-28B illustrate another embodiment of a crimp that can be incorporated into the attachment structure disclosed herein.
Figure 28B:
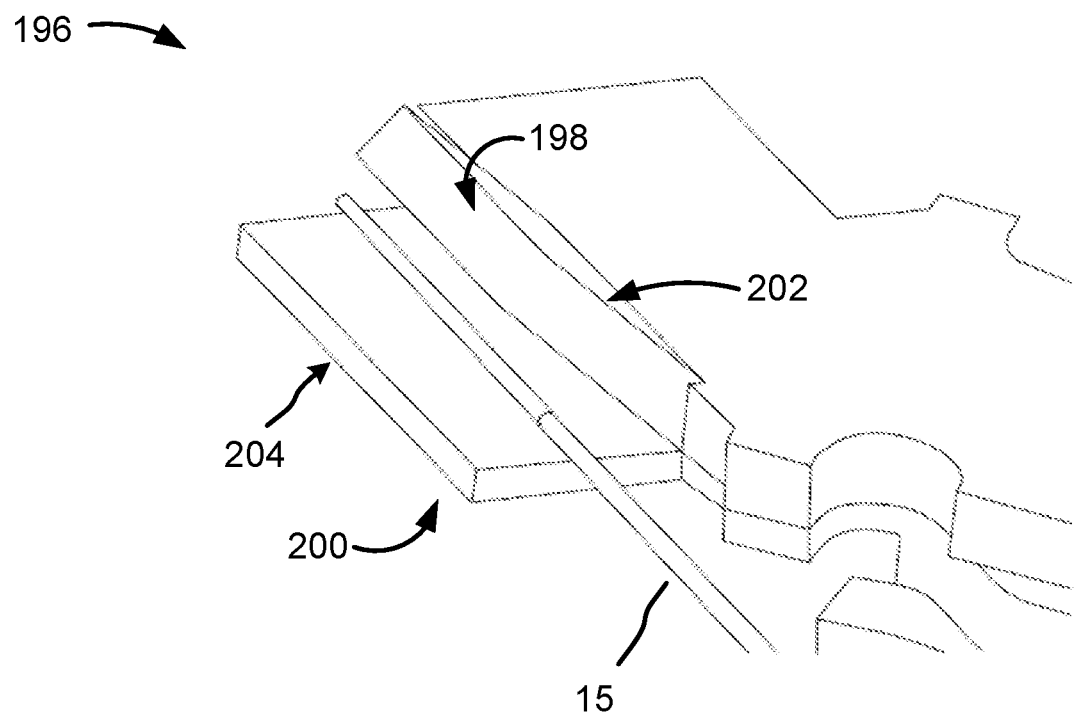

FIGS. 28A-28B illustrate another embodiment of a crimp 196. Similar to the crimps depicted above, the crimp 196 can be incorporated into the support member 12, the moving member 14 and/or the attachment structures depicted herein in relation the support and moving members 12, 14, respectively. The crimp 196 includes two portions, a first portion 198 and a second portion 200 that are configured to be folded together. When the first and second portions 198, 200 are folded together, they are capable of crimping an SMA wire 15 in place. One or more of the embodiments described above may be incorporated in the crimp 196 to increase the holding strength of the crimp 196 and/or reduce the strain on the SMA wire 15 when the support member 10 is under stress.

The second portion 200 may be unitary with the plate 60. The first portion 198 is non-unitary with the second portion 200, but may be coupled to the second portion 200 using an adhesive, a weld, a solder joint and/or the like. The first and second portions 198, 200 may be coupled together on either side of the SMA wire 15. That is, in embodiments, the first and second portions 198, 200 may be coupled on the interior side 202 of the crimp 196 or on the exterior side 204 of the crimp.

Figure 29:
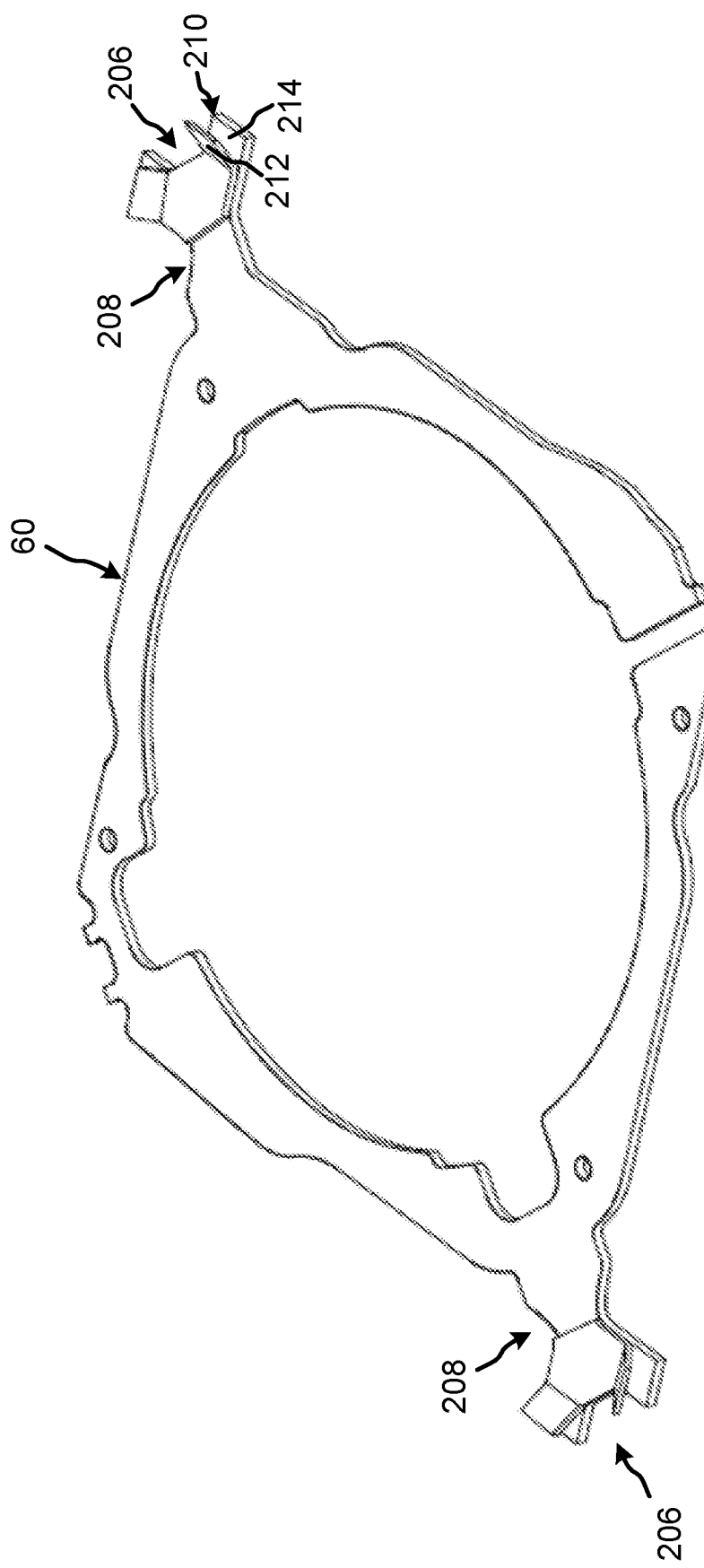
FIG. 29 depicts another base layer of a moving member, in accordance with the embodiments of the disclosure.

FIG. 29 depicts a base layer 60 of a moving member 14, in accordance with the embodiments of the disclosure. As illustrated, the base layer 60 may be substantially planar and include attachment structures 206. According to various embodiments, two diagonal corners 208 of the plate 60 may include two attachment structures 206. Each attachment structure 206 may include crimps 210, for example, the crimps 196, depicted in FIGS. 28A-28B. For example, the crimps 210 included in the attachment structure 206 may include a first portion 212 that is non-unitary with a second portion 214, but is coupled to the second portion 214 using an adhesive, a weld, a solder joint and/or the like. Additionally or alternatively, attachment structures 206 of the plate 60 may include etch patterns. The etch patterns included in the attachment structures 206 may hold the SMA wire 15 more securely than if the SMA wire 15 was held in place by two flat pieces of material. One or more of the etching methods described above in relation to FIGS. 8-14 may be used to create the etch patterns, such as embodiments described herein. According to various embodiments, a dielectric and conductive layer may be disposed over the etch patterns. After the etch patterns are made, the corners of the partial etch patterns may be rounded to reduce the likelihood of damaging an SMA wire 15.

Figure 30:
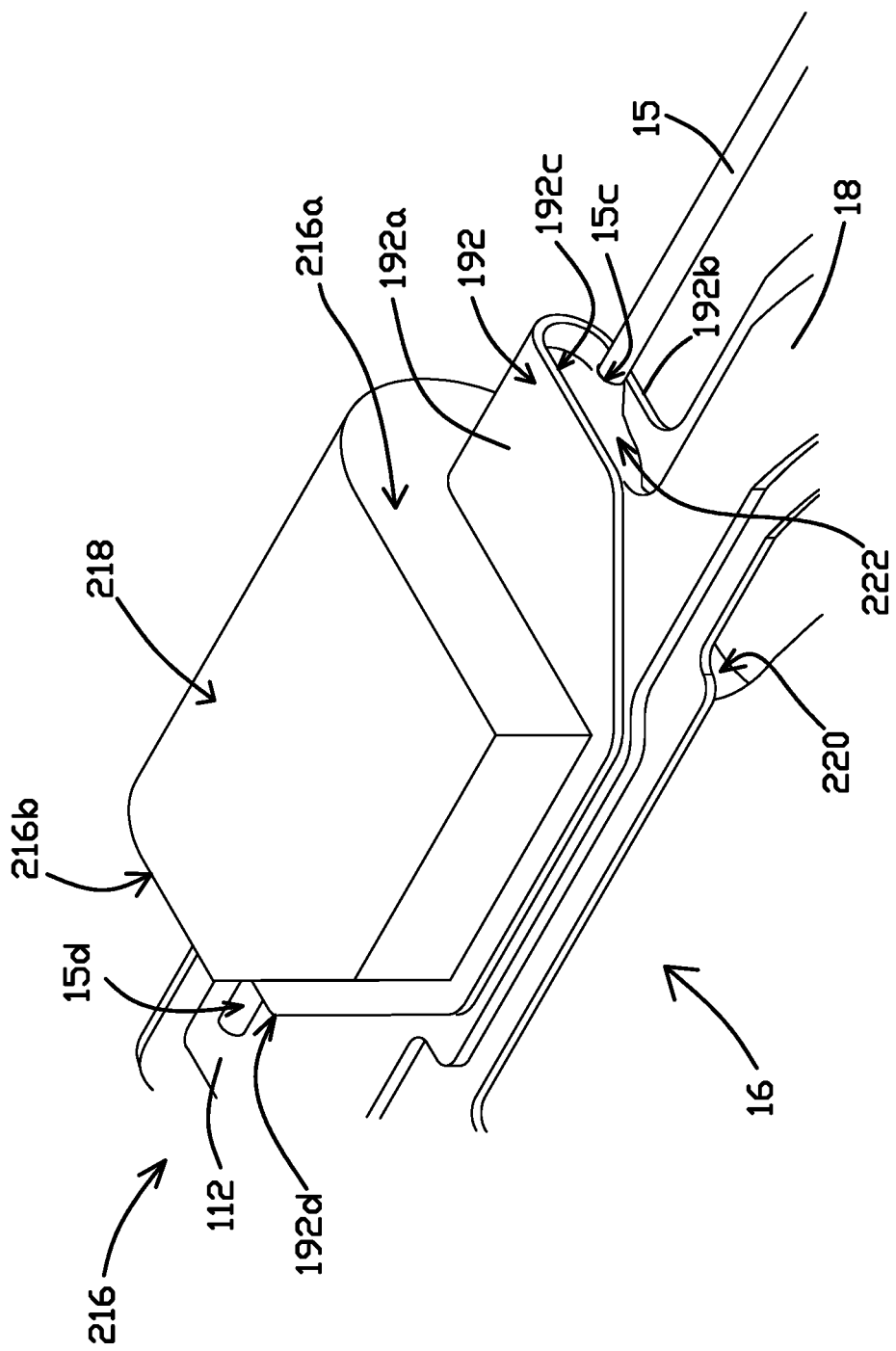
FIG. 30 illustrates a top isometric view of another embodiment of a crimp that can be incorporated into the attachment structures disclosed herein.
Figure 31:
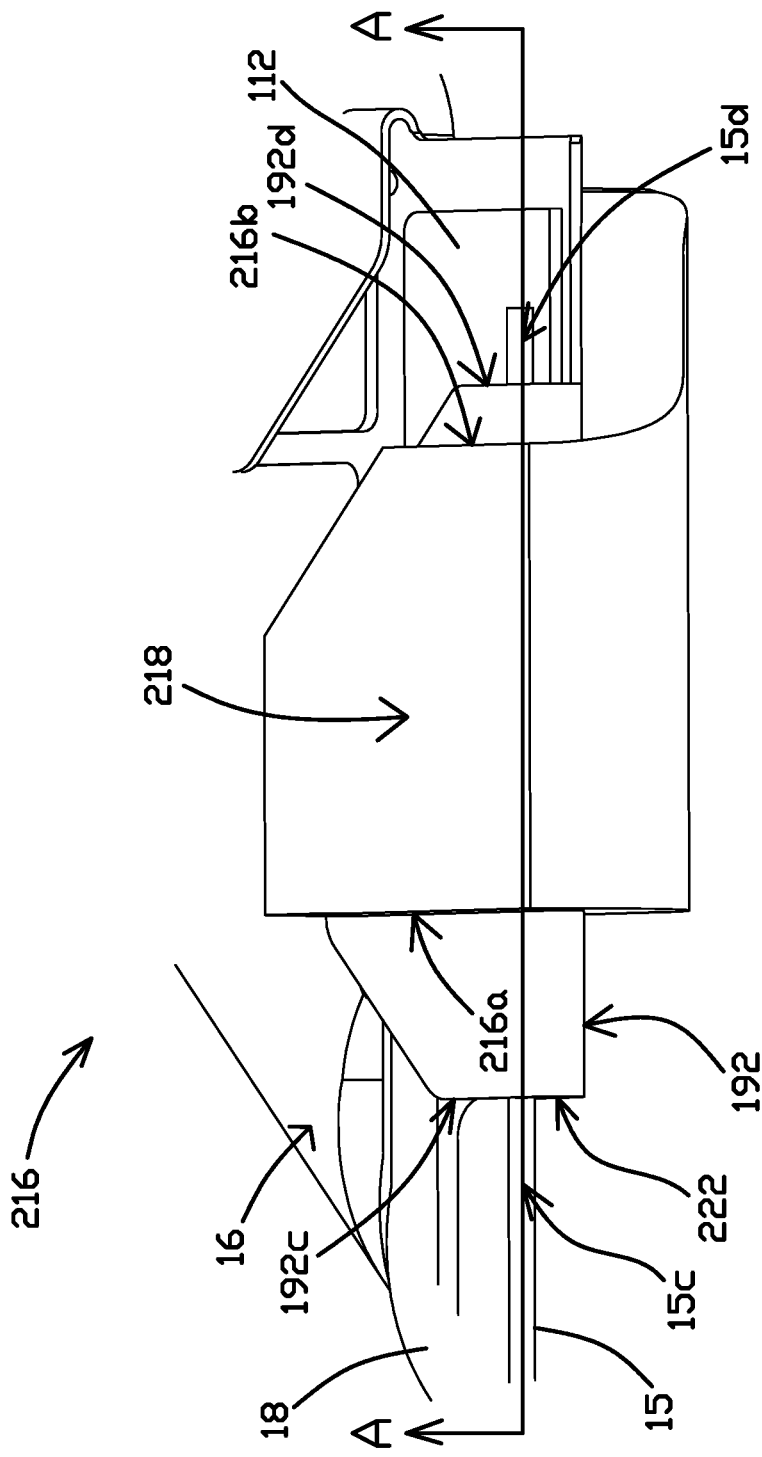
FIG. 31 illustrates a top-down view of the crimp depicted in FIG. 30.
Figure 32:
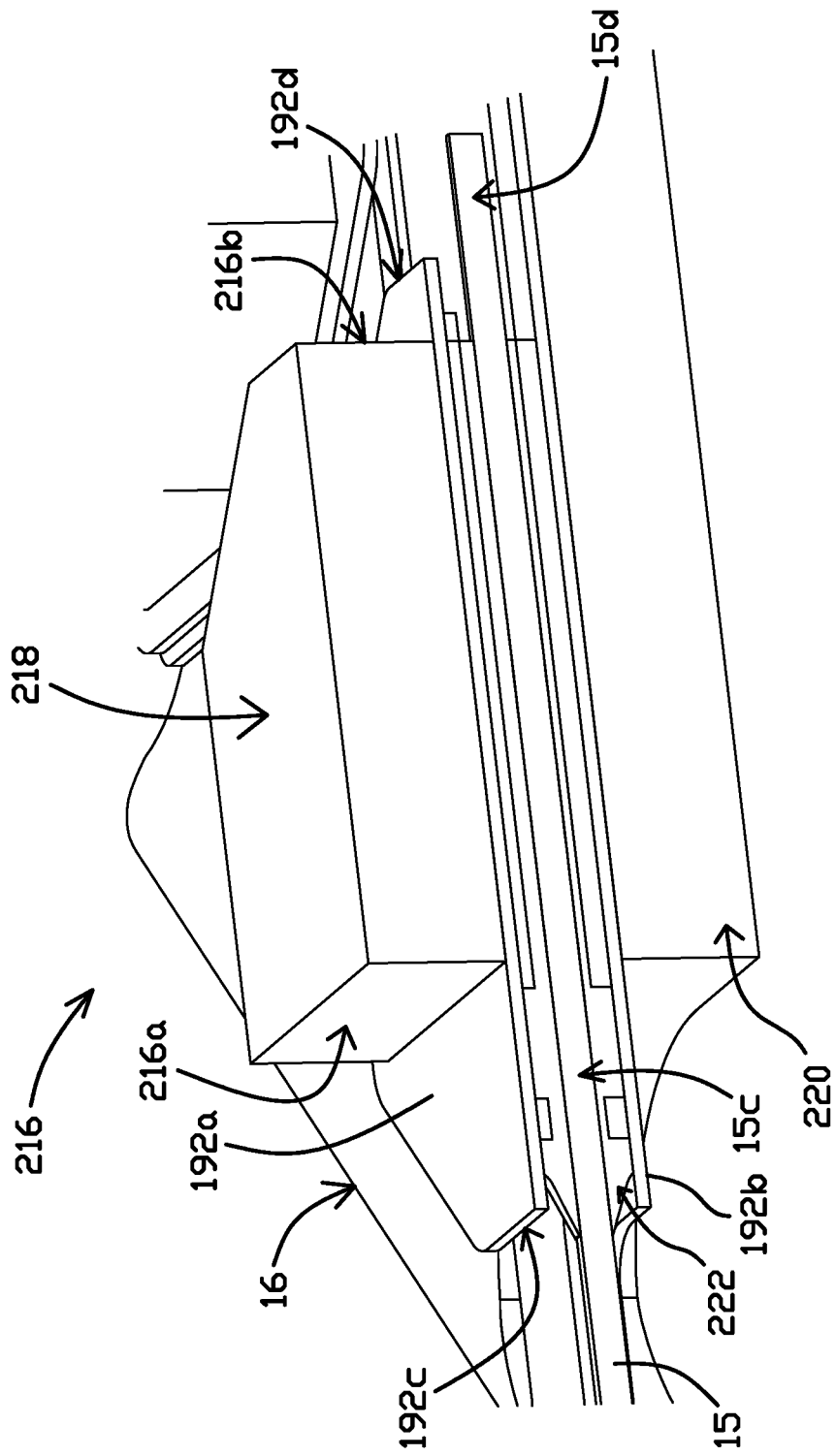
FIG. 32 illustrates a cross-sectional view along the A-A axis of FIG. 31 of the crimp depicted FIGS. 30 and 31.

FIGS. 30-32 illustrate another embodiment of a crimp 216 that can be incorporated into the attachment structures disclosed herein. In particular, FIG. 30 illustrates a top isometric view of the crimp 216; FIG. 31 illustrates a top-down view of the crimp 216; and, FIG. 32 illustrates a cross-sectional view along the A-A axis of FIG. 31 of the crimp 16.

Similar to the crimps depicted herein, the crimp 216 may be incorporated into the attachment structures of the support member 12 and/or the moving member 14 depicted above. According to various embodiments, the crimp 216 may be incorporated into the support member 12 and be unitary with the base layer 16. Additionally or alternatively, the crimp 216 may incorporated into the moving member 14 and be unitary with the plate 60.

The crimp 216 includes first and second portions 218, 220 that are configured to be folded together. When the first and second portions 218, 220 are folded together, as illustrated, they are capable of crimping an SMA wire 15 and holding the SMA 15 in place. As illustrated, the first and second portions 218, 220 are a unitary piece of material. However, in embodiments, the first and second portions 218, 220 may be non-unitary and coupled together using an adhesive, a weld, a solder joint and/or the like.

According to various embodiments, the crimp 216 may include a strain relief member 192 that extends from at least one side 216a, 216b of the crimp 216 and supports and/or provides a crimping force on the SMA wire 15. According to various embodiments, the strain relief member 192 may extend from both sides 216a, 216b of the crimp 216. In these embodiments, the strain relief member 192 may extend different distances from the sides 216a, 216b of the crimp 216, as illustrated. Alternatively, a strain relief member 192 may not be included in the crimp 216.

According to various embodiments, an adhesive 222 may disposed between the first and second portions 218, 220 of the crimp 216. According to some of these embodiments, the adhesive 222 may only be disposed between a portion of the first and second portions 218, 220. According to various embodiments that include a strain relief member 192, the adhesive 222 may be disposed between first and second portions 192a, 192b of the strain relief member 192. However, according to some of these embodiments, the adhesive 222 may only be disposed between a portion of the first and second portions 192a, 192b. Additionally or alternatively, in embodiments, the adhesive 222 may extend from (e.g., protrude from) at least one side 216a, 216b of the crimp 216 and/or at least one side 192c, 192d of the strain relief member 192. For example, when the adhesive 222 is disposed between the first and second portions 192a, 192b, a portion of the adhesive 222 may wick down the SMA 15 and extend beyond the side 216a of the crimp 216 and/or beyond a side 192c of the strain relief member 192.

According to various embodiments, to dispose the adhesive 222 between the first and second portions 218, 220 of the crimp 216 and/or between the first and second portions 192a, 192b of the strain relief member 192, the first and second portions 218, 220 of the crimp may be crimped together and the adhesive 222 may be applied to a side 216a, 216b of the crimp 216. According to various embodiments, the adhesive 222 may be applied to a side 216a, 216b of the crimp 216 that either the strain relief member 192 does not extend from or the side 216a, 216b of the crimp 216 that the strain relief member 192 extends a smaller distance from the side 216a, 216b crimp 216. For example, the strain relief member 192 extends a smaller distance from the side 216b of the crimp 216, compared to the side 216a of the crimp 216. As such, the adhesive 222 may be applied to the side 216b of the crimp 216. According to various embodiments, the adhesive 222 may be applied to within 50 microns of the side 192c, 192d of the strain relief member 192 on the SMA wire 15 and/or 100 microns from the side 192c, 192d of the strain relief member 192 on the inside of the strain relief member 192. After curing the adhesive 222, the adhesive may be located 100-250 microns from the edge 216a of the crimp 216.

According to various embodiments, enough adhesive 222 may be applied to a first side 216a, 216b (e.g., side 216b) of the crimp for the adhesive 222 to extend between the first and second portions 218, 220 and out a second side 216a, 216b (e.g., side 216a) of the crimp 216 that is opposite the first side 216a, 216b. According to various embodiments, enough adhesive 222 may also be applied, so that the adhesive 222 extends past the second side 216a, 216b of the crimp 216 and extends into the strain relief member 192 that is projecting from the second side 216a, 216b. Additionally or alternatively, the adhesive 222 may wick down the SMA wire 15, which may cause the adhesive 222 to extend past a side 192c, 192d (e.g., side 192c) of the strain relief element 119 and/or taper down the SMA wire 15, as shown in FIG. 32. For example, the adhesive 222 may extend past a side 192c, 192d of the strain relief member 192 by approximately 10-50 microns. The taper of the adhesive 222 may reduce the strain on the SMA wire 15 when the suspension assembly 10 is in use, as discussed below.

According to various embodiments, the adhesive 222 may be disposed on a portion 15c, 15d of the SMA wire 15 that is proximal and/or adjacent to a side 216a, 216b of the crimp 216. For example, the adhesive 222 may be disposed on a portion 15c of the SMA wire 15 that is proximal and/or adjacent to side 216a of the crimp 216. According to various embodiments, the portion 15c, 15d may also be proximal and/or adjacent to a side 192c, 192d of the strain relief member 192. For example, the portion 15c may be proximal and/or adjacent to side 192c of the strain relief member 192. According to various embodiments where the adhesive 222 is proximal and/or adjacent to a side 216a, 216b of the crimp 216 and/or proximal and/or adjacent to the to the strain relief member 192, the adhesive 222 may also be disposed between the first and second portions 218, 220 and/or disposed between the first and second portions 192a, 192b.

According to various embodiments, the adhesive 222 may be applied and/or cured to control the angle that the portion 15c of the SMA wire 15 exits from the side 216a of the crimp 216 and/or exits from the side 192c of the strain relief member 192. For example, control signals may be applied to the SMA wire 15, in order actuate the moving member 14 relative to the support member 12. After which, the adhesive 222 may be applied and/or cured to obtain an exit angle of the portion 15c of the SMA wire 15 that exits the side 216a of the crimp and the side 192c of the strain relief member 192 of approximately 0 degrees.

In another example, a fixture 340, according to an embodiment such as that illustrated in FIG. 34, is configured to receive a suspension assembly 10 including both a support member 12 and a moving member 14 of a type including those described herein. The fixture 340 includes a wire stop pin 342 configured to receive an SMA wire 15. A wire stop pin 342 may be any structure affixed to fixture 340 to receive and maintain an SMA wire 15 including, but not limited to, a rod, a hook, or other structure configured to receive and maintain a position of a wire with respect to a suspension assembly.

According to an embodiment, the fixture 340 is configured to receive the suspension assembly with the SMA wire 15 such that the wire stop pin 342 maintains the SMA wire 15 at angle that the portion 15c of the SMA wire 15 exits from the side 216a of the crimp 216 and/or exits from the side 192c of the strain relief member 192 as measured from an axis perpendicular to side 216a or side 192c of a strain relief member of a crimp, referred to herein as an exit angle 344, 346. For such an embodiment, the adhesive 222 is cured using techniques including those described herein. A specific example includes heating at least the uncured adhesive and the SMA wire 15 of the suspension assembly mounted in the fixture 340. The heating cures the adhesive and activates the SMA wire 15 to set the exit angle 344, 346 as the SMA wire 15 shrinks and goes straight due to the curing heat without the use of electrical signals. Thus, the fixture 340 with a wire stop pin 342 used to maintain the SMA wire 15 at an exit angle 344, 346 provides the ability to set an exit angle without the need to apply a control signal to one or more of the SMA wires 15. A particular example includes using a fixture 340 with a wire stop pin 342 to maintain the SMA wire 15 of a suspension assembly such that the SMA wire 15 has an exit angle 344 of 5 degrees from a crimp on the support member 12 and an exit angle 346 of 6 degrees from a crimp on the moving member 14. A fixture 340 with a wire stop pin 342, according to various embodiments, may be configured to maintain SMA wire 15 at any exit angle from one or more crimps and the exit angle 344, 346 from more than one crimp could be equivalent.

In conventional embodiments, when the suspension assembly 10 (of FIGS. 1A-1B) is under stress, the SMA wire 15 may be damaged and/or broken proximal to where the SMA wire 15 exits the side 216a of a crimp 216. The reason being is because the side 216a of a crimp 216 is an inherent high stress area for the SMA wire 15. According to various embodiments, the adhesive 222 may decrease the stress on the SMA wire 15. For example, by using an adhesive 222 disposed between the first and second portions 218, 220 of the crimp 216, less mechanical force may be used to close the crimp 216 because the adhesive 222 aids in keeping the SMA wire 15 in place. By using less mechanical force to close the crimp 216, less damage and/or less shorting risk may occur to the portion of the SMA wire 15 that is disposed between the first and second portions 218, 220. Additionally or alternatively, less damage and/or shorting risk may occur to the portion 15c of the SMA wire 15 proximate to a side 216a of the crimp 216. Shorting risk may occur from breaking the dielectric layer (e.g., the dielectric layer 100 of FIGS. 15A-15B) that insulates the SMA wire 15 from the base layer 16 when applying too much mechanical force when crimping the crimp 218.

As another example, the adhesive 222 may extend from a side 216a, 216b of the crimp 216 and/or a side 192c, 192d of the strain relief member 192. For example, the adhesive may extend from side 216a of the crimp 216 and/or side 192c of the strain relief member 192. Since the adhesive 222 has a stiffness that is lower than the crimp 216 and/or the strain relief member 192, the adhesive 222 may help distribute any bending stress that occurs near a side 216a, 216b of the crimp 216 and/or near a side 192c, 192d of the strain relief member 192 over a larger portion of the SMA 15 than the bending stress might otherwise be distributed. That is, since the adhesive 222 has a lower stiffness than the crimp 216 and/or strain relief member 192, the adhesive 222 may bend more with the SMA wire 15 than either the crimp 216 or strain relief member 192, thereby increasing the bend radius of the SMA wire 15 when the suspension assembly 10 (of FIG. 1) is under stress. For example, instead of a section of the SMA wire 15 that has a width x bending at an angle θ, the adhesive 222 may increase the width of the section that bends at angle θ by, for example, 2x, 3x, 4x, etc. This distributes the stress on the SMA wire 15 over a greater portion of the SMA wire 15. According to various embodiments, the distance that the adhesive 222 protrudes from the side 216a, 216b of the crimp 216 and/or a side 192c, 192d of the strain relief member 192 may vary, depending on, for example, the type, the stiffness, the thickness of the adhesive 222 and/or how the adhesive 222 is applied.

According to various embodiments, the adhesive 222 may be conductive or non-conductive. For example, the adhesive may be comprised of a cyanoacrylate. According to various embodiments where a conductive adhesive 222 is used, the adhesive 222 may not be applied to crimps incorporated into the support member 12 since the operation of the suspension assembly 10 (of FIG. 1) may be affected if the adhesive 222 shorts to the metal base layer 16 of the support member 12.

According to various embodiments, the adhesive 222 may be cured using one or more of the following: heat, ultraviolet light, a humidity level maintained of gas that is surrounding the adhesive 222, a chemical additive and/or the like. According to various embodiments that use heat as a curing mechanism, the entire crimp 216 and/or structure that the crimp 216 is integrated into may be heated. According to various embodiments, before the adhesive 222 is cured, control signals may be send the SMA wire 15, in order to actuate the moving member 14 relative to the support member 12, to control the angle that the portion 15c exits the side 216a of the crimp 216 and/or exits a side 192c of the strain relief member 192.

According to various embodiments, the adhesive 222 may be selected based on the adhesive's Young's Modulus. For example, an adhesive with a Young's Modulus between 20 megapascals and 2000 megapascals may be selected as the adhesive 222. Additionally or alternatively, the adhesive 222 may be selected based on the adhesive's strain elongation to failure ratio. For example, an adhesive with a strain elongation to failure between 100%-300% may be selected as the adhesive 222. As another example, an adhesive with a strain elongation to failure between 2%-4% may be selected as the adhesive 222.

According to various embodiments, more than one adhesive may be used as the adhesive 222. For example, a first adhesive may be disposed proximal and/or adjacent to the edge 216a of the crimp 216 and/or proximal and/or adjacent to a side 192c of the stress relief member 192; and, a second adhesive may be disposed between the first and second portions 218, 220 and/or between the first and second portions 192a, 192b. According to various embodiments, the first adhesive may cured before or after the second adhesive is disposed between the first and second portions 216a, 216b and/or between the first and second portions 192a, 192b. According to various embodiments, before or after the first adhesive is cured, the second adhesive of the adhesive 222 may be disposed between the first and second portions 216a, 216b and/or between the first and second portions 192a, 192b and cured. According to various embodiments, the first adhesive of the adhesive 222 may wick down the SMA wire 15. Additionally, by either curing the first adhesive of the adhesive 222 before the second adhesive is applied or using a first adhesive that has higher viscosity (e.g., having a viscosity of approximately 50,000 centipoise) than the second adhesive (e.g., having a viscosity of approximately 50 centipoise) the first adhesive may block the second adhesive from wicking down the SMA wire 15. As such, if the first adhesive of the adhesive 222 has a lower modulus (e.g., less than 1500 megapascals) than the second adhesive (e.g., greater than 1500 megapascals), the combination of adhesives that make of the adhesive 222 may decrease the stress on the SMA wire 15 when the suspension assembly 10 is in use.

Figure 33:
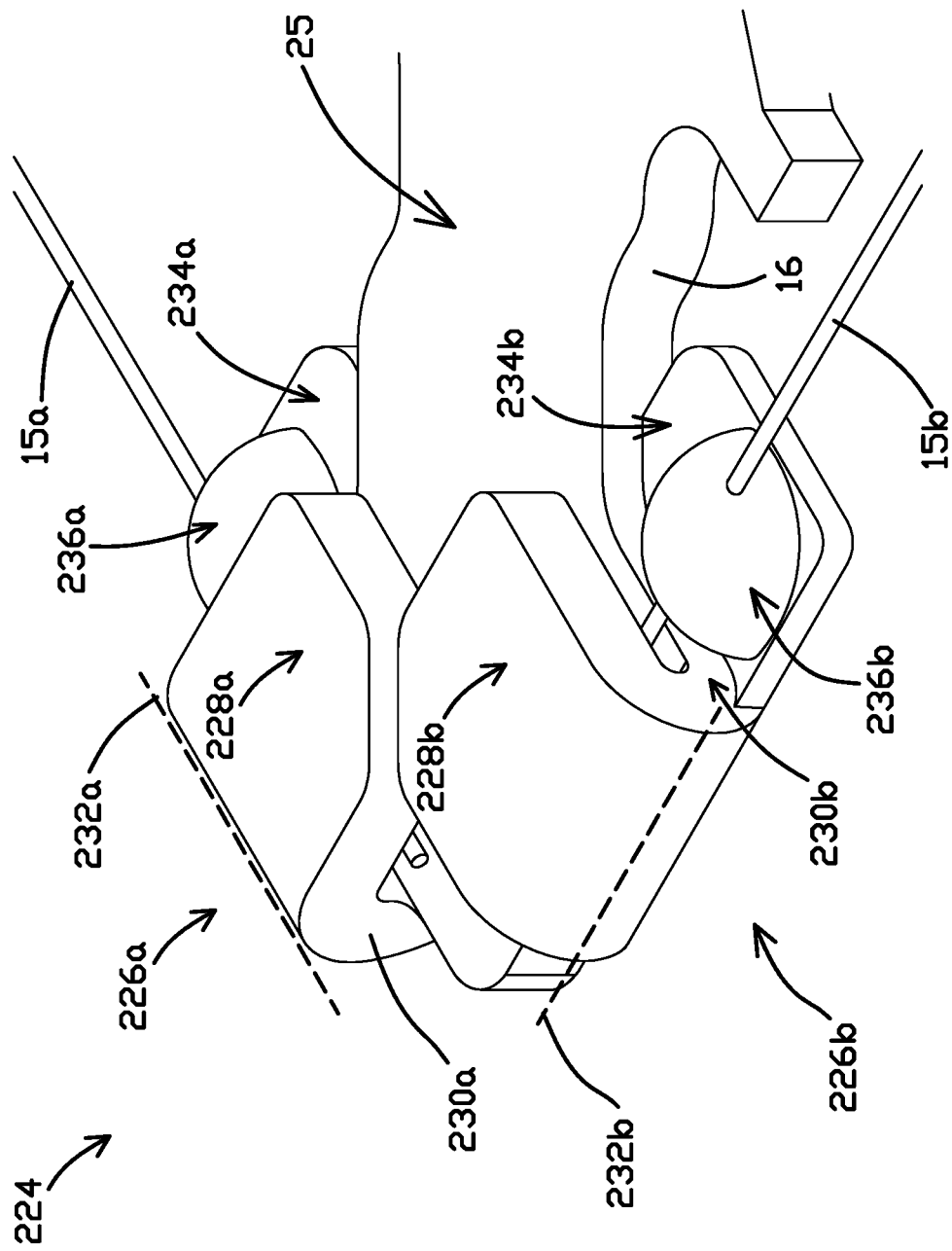
FIG. 33 illustrates an attachment structure that can be incorporated into the moving member depicted herein.

FIG. 33 illustrates another embodiment of an attachment structure 224. According to various embodiments, the attachment structure 224 is incorporated into one or more diagonal corners of the support member 12 and/or moving member 14. For example, the attachment structure 224 may be incorporated into two diagonal corners of the support member 12 and/or two diagonals of the moving member 14. Furthermore, the attachment structure 224 is configured to crimp one or more SMA wires 15 such as SMA wires 15a and 15b using one or more crimps 226a, 226b.

According to the embodiment depicted in FIG. 33, the attachment structure 224 is unitary with the base layer 16 and includes two crimps 226a, 226b. The two crimps 226a, 226b are formed on a ledge 25 in the base layer 16 at a level spaced (e.g., in a z-direction) from the major planar surface portion 26 (of FIGS. 2A-2B). As illustrated, each crimp 226a, 226b includes a first portion 228a, 228b and a second portion 230a, 230b. The first portions 228a, 228b are configured to be folded substantially along respective axes 232a, 232b, respectively, to crimp the first portions 228a, 228b and the second portions 230a, 230b together. Once crimped together, the first portions 228a, 228b and second portions 230a, 230b hold SMA wires 15a, 15b in place. As illustrated above in FIGS. 1A and 1B, the other ends of the SMA wires 15 are coupled to the moving member 14.

According to various embodiments, the first portions 228a, 228b and second portions 230a, 230b may be a unitary piece of material. However, in embodiments, the first portions 228a, 228b and second portions 230a, 230b may be non-unitary and coupled together using an adhesive, a weld, a solder joint and/or the like.

According to various embodiments, the first and second crimps 226a, 226b may include platforms 234a, 234b extending from at least one side of the crimps 226a, 226b of the attachment structure 224. According to various embodiments, the platforms 236a, 236b may be unitary with the second portions 230a, 230b. For example, a portion of the first portions 228a, 228b may be removed to expose a top portion of the second portions 230a, 230b. Alternatively, the platforms 236a, 236b may be non-unitary with the second portions 230a, 230b. For example, the platforms 236a, 236b may be a bottom portion (e.g., the second portion 192b of strain relief member 192 depicted in FIGS. 30-32) of a strain relief member, wherein the top portion (e.g., the first portion 192a of strain relief member 192 depicted in FIGS. 30-32) may be removed. However, this is only an example and not meant to be limiting.

An adhesive 236a, 236b may be disposed on each of the platforms 234a, 234b. According to various embodiments, the adhesives 236a, 236b may couple the SMA wires 15a, 15b to the platforms 234a, 234b. Similar to the adhesive 222 discussed above, the adhesives 236a, 236b may reduce the stress on the SMA wires 15a, 15b near the sides of the crimps 226a, 226b by either distributing the bending of the SMA wires 15a, 15b over a larger area or having the SMA wires 15a, 15b bend further away from the sides of the crimps 226a, 226b.

According to various embodiments, the adhesives 236a, 236b may have one or more properties that are the same or similar to the adhesive 222 describe above in relation to FIGS. 30-32. For example, the adhesives 236a, 236b may be conductive or non-conductive. For example, the adhesives 236a, 236b may be comprised of a cyanoacrylate. According to various embodiments when a conductive adhesive is used as the adhesives 236a, 236b, the adhesive 236a, 236b may not be applied to crimps incorporated into the support member 12 since the operation of the suspension assembly 10 may be more likely to be affected if the adhesive 236a, 236b shorts to the metal base layer 16 of the support member 12. According to various embodiments, the same type of adhesive may be used for the adhesive 236a and the adhesive 236b or different types of adhesives may be used for the adhesive 236a and the adhesive 236b.

According to various embodiments, the adhesive 236a, 236b may be cured using one or more of the following: heat, ultraviolet light, a humidity level maintained of gas that is surrounding the adhesive 236a, 236b, a chemical additive and/or the like. According to various embodiments that use heat as a curing mechanism, the crimps 226a, 226b and/or structure that the crimps 226a, 226b are integrated into may be heated. According to various embodiments, before the adhesive 236a, 236b is cured, control signals may be send the SMA wires 15a, 15b, in order to actuate the moving member 14 relative to the support member 12, to control the angle that the SMA wires 15a, 15b exit the sides of the crimps 226a, 226b and/or exits a side of a strain relief member.

Similar to the adhesive 222, the adhesives 236a, 236b may be selected based on the adhesive's Young's Modulus. For example, an adhesive with a Young's Modulus between 40 megapascals and 2000 megapascals may be used as the adhesive adhesives 236a, 236b. Additionally or alternatively, the adhesive adhesives 236a, 236b may be selected based on the adhesive's strain elongation to failure ratio. For example, an adhesive with a strain elongation to failure between 100%-300% may be used as the adhesives 236a, 236b. As another example, an adhesive with a strain elongation to failure between 2%-4% may be selected as the adhesives 236a, 236b.

Additionally or alternatively, the adhesives 236a, 236b may have approximately a low to medium durometer rating. For example, the adhesives 236a, 236b may have a Shore OO durometer of less than 90. However, this is only an example and not meant to be limiting.

According to various embodiments, the attachment structure 224 may also include adhesive, that is the same or similar to the adhesive 222 depicted in FIGS. 30-32. For example, an adhesive may be disposed between the first portions 228a, 228b and the second portions 230a, 230b of the crimps 226a, 226b and/or may extend from one or more sides of the crimps 226a, 226b. Additionally or alternatively, when a strain relief member (e.g., strain relief member 192) is incorporated into the crimps 226a, 226b, an adhesive may be disposed between first and second portions (e.g., portions 192a, 192b) of a strain relief member and/or may extend from sides (e.g., side 192c) of a strain relief member. Before or after the adhesive 236a, 236b is cured, an adhesive (e.g., adhesive 222) may be disposed between the first portions 228a, 228b and second portions 230a, 230b. After an adhesive (e.g., adhesive 222) is disposed between the first portions 228a, 228b and the second portions 230a, 230b and/or between first and second portions of a strain relief member, the adhesive may be cured concurrent or subsequent to curing the adhesive 236a, 236b.

Although the embodiments of the disclosure have been described with reference to preferred embodiments, those of skill in the art will recognize that changes can be made in form and detail without departing from the spirit and scope of the disclosure. For example, although the illustrated embodiments include the traces on the sides of the flexure arms opposite the support member (i.e., on the top side of the flexure arms), other embodiments can alternatively or in addition include traces on the sides of the flexure arms facing the static member (i.e., on the bottom side of the flexure arms). In addition to the traces being on the bottom side of the moving member, the wire attach structure can face toward the static member instead of away from it as shown in the figures (e.g., the first portion, 116 or FIG. 19 could be orientated on the bottom side of the of the wire attach structure instead of being on the top side as shown).

What is claimed is:

1. A suspension assembly, comprising:
   a support member including one or more first wire attach structures;
   a moving member including one or more second wire attach structures;
   an adhesive disposed on a portion of at least one of: the one or more first wire attach structures and the one or more second wire attach structures and extends from a side of at least one of the one or more first wire attach structures and the one or more second wire attach structures; and
   a shape-memory alloy wire extending between the one or more first wire attach structures and the one or more second wire attach structures,
   the shape-memory alloy wire is coupled to the one or more first wire attach structures, the one or more second wire attach structures and the adhesive, the adhesive is configured to maintain the shape-memory alloy wire at an exit angle greater than or less than 0.0 degrees with respect to a longitudinal axis of the support member or the moving member and distribute a bending stress at the side of the at least one of the one or more first wire attach structures and the one or more second wire attach structures to increase a bend radius of the shape-memory alloy wire.

2. The suspension assembly of claim 1, wherein the adhesive is a non-conductive adhesive.

3. The suspension assembly of claim 1, wherein the adhesive is not disposed between portions of the one or more first wire attach structures and wherein the adhesive is a conductive adhesive.

4. The suspension assembly of claim 1, wherein the adhesive is configured to fix the SMA wire and is coupled to the one or more wire attach structures.

5. The suspension assembly of claim 1, further comprising at least one strain relief member extending between and from at least one side of at least one of: the one or more first wire attach structures and the one or more second wire attach structures, wherein the shape-memory alloy wire extends between and is coupled to the at least one strain relief member and wherein the adhesive is disposed between portions of the at least one strain relieve member.

6. The suspension assembly of claim 5, wherein the adhesive extends from at least one side of the at least one strain relief member.

7. A suspension assembly, comprising:
a support member including a one or more first wire attach structures;
a moving member including one or more second wire attach structures;
a shape-memory alloy wire extending between and coupled to the one or more first wire attach structures and the one or more second wire attach structures; and
an adhesive disposed on a portion of the shape-memory alloy wire that is proximate to a side of at least one of: the one or more first wire attach structures and the one or more second wire attach structures, the adhesive configured to maintain the shape memory alloy wire at an exit angle greater than or less than 0.0 degrees with respect to a longitudinal axis of the support member or the moving member and to distribute a bending stress at the side of the at least one of the one or more first wire attach structures and the one or more second wire attach structures to increase a bend radius of the shape-memory alloy wire.

8. The suspension assembly of claim 7, wherein the adhesive is a non-conductive adhesive.

9. The suspension assembly of claim 7, wherein the adhesive is not disposed between portions of the one or more first wire attach structures and wherein the adhesive is a conductive adhesive.

10. The suspension assembly of claim 7, wherein the adhesive extends between at least one of: the one or more first wire attach structures and the one or more second wire attach structures.

11. The suspension assembly of claim 7, further comprising at least one strain relief member extending between and from at least one side of at least one of: the one or more first wire attach structures and the one or more second wire attach structures, wherein the shape-memory alloy wire extends between and is coupled to the at least one strain relief member and wherein the adhesive is disposed proximal to a side of the at least one strain relieve member.

12. The suspension assembly of claim 11, wherein the adhesive extends between the at least one strain relief member.

13. The suspension assembly of claim 7, wherein the adhesive has a Young's modulus between 40 megapascals and 2000 megapascals.

14. The suspension assembly of claim 7, wherein the adhesive is comprised of a cyanoacrylate.

15. The suspension assembly of claim 7, wherein the adhesive has a strain elongation to failure between 100 percent and 300 percent.

16. The suspension assembly of claim 7, wherein the adhesive is comprised of at least two adhesives, wherein a first adhesive of the at least two adhesives has a lower Young's modulus than a second adhesive of the at least two adhesives.

17. A suspension assembly, comprising:
a support member including one or more first wire attach structures;
a moving member including one or more second wire attach structures;
a platform portion extending from at least one side of: the one or more first wire attach structures and the one or more second wire attach structures;
an adhesive extending from the platform portion; and
a shape-memory alloy wire extending between the one or more first wire attach structures and the one or more second wire attach structures, and coupled to the one or more first wire attach structures, the one or more second wire attach structures and the adhesive, the adhesive configured to maintain the shape-memory alloy wire at an exit angle greater than or less than 0.0 degrees with respect to a longitudinal axis of the support member or the moving member and to distribute at least some bending stress that occurs near the platform to increase a bend radius of the shape-memory alloy wire.

18. The suspension assembly of claim 17, wherein the platform portion is unitary with at least one of: the one or more first wire attach structures and the one or more second wire attach structures.

19. The suspension assembly of claim 17, wherein the platform portion is non-unitary with at least one of: the one or more first wire attach structures and the one or more second wire attach structures.

20. The suspension assembly of claim 17, wherein the adhesive is a non-conductive adhesive.

21. The suspension assembly of claim 17, wherein the adhesive has a Shore OO durometer of less than 90.

22. The suspension assembly of claim 17, further comprising an adhesive disposed between portions of at least one of: the one or more first wire attach structures and the one or more second wire attach structures.

23. The suspension assembly of claim 22, wherein the adhesive disposed on the platform and the adhesive is disposed between portions of at least one of: the one or more first wire attach structures and the one or more second wire attach structures is the same adhesive.

24. The suspension assembly of claim 17, wherein the platform is a portion of a stress relief member.

25. The suspension assembly of claim 17, wherein the one or more first wire attach structures and the one or more second wire attach structures includes crimps.

26. A method of manufacturing a suspension assembly that includes an adhesive, the method comprising:
receiving the suspension assembly including:
a support member including one or more first wire attach structures;
a moving member including one or more second wire attach structures; and
a shape-memory alloy wire coupled to and extending between the one or more first wire attach structures and the one or more second wire attach structures;

disposing an adhesive proximate to a side of at least one of: the one or more first wire attach structures and the one or more second wire attach structures; and curing the adhesive to maintain the shape-memory alloy wire at an exit angle greater than or less than 0.0 degrees with respect to a longitudinal axis of the support member or the moving member and to distribute at least some bending stress that occurs near the side of the at least one of the one or more first wire attach structures and the one or more second wire attach structures to increase a bend radius of the shape-memory alloy wire.

27. The method of claim 26, wherein maintaining the shape-memory allow wire at an exit angle includes applying electrical drive signals to the shape-memory alloy wire.

28. The method of claim 27, wherein applying electrical drive signals to the shape-memory alloy wire further comprises heating the suspension assembly to a temperature and wherein curing the adhesive comprises maintaining the temperature for an amount of time.

29. The method of claim 26, wherein the adhesive extends between at least one of: the one or more first wire attach structures and the one or more second wire attach structures.

30. The method of claim 26, further comprising at least one strain relief member extending between and from at least one side of at least one of: the one or more first wire attach structures and the one or more second wire attach structures, wherein the shape-memory alloy wire extends between and is coupled to the at least one strain relief member and wherein the adhesive is disposed proximal to a side of the at least one strain relieve member.

31. The method of claim 30, wherein the adhesive extends between the at least one strain relief member.

32. The method of claim 26, wherein maintaining the shape-memory alloy wire at an exit angle includes using a fixture with a wire stop pin.

33. A method of manufacturing a suspension assembly that includes an adhesive, the method comprising:
receiving the suspension assembly including:
a support member including one or more first wire attach structures;
a moving member including one or more second wire attach structures;
an uncured adhesive disposed between portions at least one of: the one or more first wire attach structures and the one or more second wire attach structures to increase a bend radius of a shape-memory alloy wire; and
the shape-memory alloy wire extending between and coupled to the one or more first wire attach structures and the one or more second wire attach structures; and
curing the adhesive to maintain the shape-memory alloy wire at an exit angle greater than or less than 0.0 degrees with respect to a longitudinal axis of the support member or the moving member.

34. The method of claim 33, wherein maintaining the shape-memory allow wire at an exit angle includes applying electrical drive signals to the shape-memory alloy wire.

35. The method of claim 34, wherein applying electrical drive signals to the shape-memory alloy wire further comprises heating the suspension assembly to a temperature and wherein curing the adhesive comprises maintaining a level of humidity of gas that is surrounding the first uncured adhesive for an amount of time.

36. The method of claim 33, wherein the adhesive extends from a side of at least one of: the one or more first wire attach structures and the one or more second wire attach structures.

37. The method of claim 33, further comprising at least one strain relief member extending between and from at least one side of at least one of: the one or more first wire attach structures and the one or more second wire attach structures, wherein the shape-memory alloy wire extends between and is coupled to the at least one strain relief member and wherein the adhesive is disposed between portions of the at least one strain relieve member.

38. The method of claim 37, wherein the adhesive extends from at least one side of the at least one strain relief member.

39. The method of claim 33, wherein maintaining the shape-memory alloy wire at the exit angle includes using a fixture with a wire stop pin.

40. A method of manufacturing a suspension assembly that includes an adhesive, the method comprising:
receiving the suspension assembly including:
a support member including one or more first wire attach structures;
a moving member including one or more second wire attach structures;
a first uncured adhesive disposed between portions of at least one of: the one or more first wire attach structures and the one or more second wire attach structures to maintain a shape-memory alloy wire at an exit angle greater than or less than 0.0 degrees with respect to at least one of the one or more first wire attach structures and distribute at least some bending stress that occurs near a side of the at least one of the one or more first wire attach structures and the one or more second wire attach structures;
a second uncured adhesive disposed proximate to at least one of: the one or more first wire attach structures and the one or more second wire attach structures; and
the shape-memory alloy wire extending between and coupled to the one or more first wire attach structures and the one or more second wire attach structures;
curing the second uncured adhesive; and
curing the first uncured adhesive.

41. The method of claim 40, further comprising applying electrical drive signals to the shape-memory alloy wire.

42. The method of 40, further comprising at least one strain relief member extending between and from at least one side of at least one of: the one or more first wire attach structures and the one or more second wire attach structures, wherein the shape-memory alloy wire extends between and is coupled to the at least one strain relief member and wherein the first uncured adhesive is disposed between portions of the at least one strain relief member.

43. The method of claim 40, wherein the first uncured adhesive has a modulus between 1800 megapascals and 2200 megapascals.

44. The method of claim 40, wherein the second uncured adhesive has a modulus between 10 megapascals and 50 megapascals.

45. The method of claim 40, wherein curing the first uncured adhesive comprises maintaining a level of humidity of gas that is surrounding the first uncured adhesive for an amount of time.

46. The method of claims 40, wherein curing the second uncured adhesive comprises exposing the second uncured adhesive to ultra-violet light.

47. The method of claim 40, wherein the second adhesive is disposed proximate to at least one of: the one or more first wire attach structures and the one or more second wire attach structures before the first adhesive is disposed between portions of at least one of: the one or more first wire attach structures and the one or more second wire attach structures.

48. The method of claim 40, wherein the one or more first wire attach structures and the one or more second wire attach structures comprise crimps.

49. The method of claim 40 further comprising maintaining the shape-memory allow wire at an exit angle using a fixture with a wire stop pin.

50. A method of manufacturing a suspension assembly comprising:
- receiving the suspension assembly including one or more wire attach structures, at least one of the one or more wire attach structures including an uncured adhesive disposed between portions the at least one of the one or more wire attach structures to increase a bend radius of the shape-memory alloy wire, and the shape-memory alloy wire coupled to the one or more wire attach structures;
- maintaining the shape-memory allow wire at an exit angle with respect to at least one of the one or more wire attached structures using a fixture with a wire stop pin; and
- heating at least the uncured adhesive and the shape-memory alloy wire to cure the adhesive and set the exit angle.

* * * * *